(12) United States Patent
Nakase et al.

(10) Patent No.: US 8,208,040 B2
(45) Date of Patent: Jun. 26, 2012

(54) DISPLAY CONTROL APPARATUS, DISPLAY CONTROL METHOD, AND RECORDING MEDIUM

(75) Inventors: Yuichi Nakase, Tokyo (JP); Yousuke Takagi, Tokyo (JP); Masahiko Morita, Akiruno (JP); Hiroshi Kondo, Yokohama (JP); Yasuyuki Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 12/333,694

(22) Filed: Dec. 12, 2008

(65) Prior Publication Data

US 2009/0153676 A1 Jun. 18, 2009

(30) Foreign Application Priority Data

Dec. 18, 2007 (JP) ................. 2007-326582

(51) Int. Cl.
*H04N 5/76* (2006.01)
(52) U.S. Cl. .................................. 348/231.2
(58) Field of Classification Search ............ 348/333.11, 348/333.05, 231.2, 333.12, 231.3; 382/115
See application file for complete search history.

(56) References Cited

U.S. PATENT DOCUMENTS

| | | | |
|---|---|---|---|
| 7,818,689 B2 * | 10/2010 | Wada | 715/853 |
| 2002/0172502 A1 * | 11/2002 | Okamoto et al. | 386/95 |
| 2003/0035054 A1 * | 2/2003 | Ohmura | 348/231.2 |
| 2003/0227468 A1 | 12/2003 | Takeda | |
| 2005/0052550 A1 * | 3/2005 | Sato | 348/231.2 |
| 2005/0091596 A1 * | 4/2005 | Anthony et al. | 715/712 |
| 2006/0098105 A1 * | 5/2006 | Okisu et al. | 348/231.99 |
| 2008/0012954 A1 | 1/2008 | Sasaki et al. | |
| 2008/0043118 A1 * | 2/2008 | Morino | 348/231.2 |
| 2008/0068469 A1 * | 3/2008 | Takagi et al. | 348/231.2 |
| 2008/0068483 A1 * | 3/2008 | Yoshino et al. | 348/333.01 |
| 2008/0069540 A1 * | 3/2008 | Takagi et al. | 386/117 |
| 2009/0066838 A1 * | 3/2009 | Kasutani | 348/564 |
| 2009/0153676 A1 * | 6/2009 | Nakase et al. | 348/207.99 |

FOREIGN PATENT DOCUMENTS

| | | |
|---|---|---|
| CN | 101040519 A | 9/2007 |
| JP | 07-295873 | 11/1995 |
| JP | 2004-013575 | 1/2004 |
| WO | WO/2007/091587 | * 8/2007 |

OTHER PUBLICATIONS

Chinese Office Action, with English Translation, that issued in Chinese Patent Application No. 200810185867.3.

* cited by examiner

*Primary Examiner* — Aung S Moe
(74) *Attorney, Agent, or Firm* — Cowen, Liebowitz & Latman, P.C.

(57) ABSTRACT

The present invention provides a display control apparatus comprising a read out unit configured to read out an image from a recording medium, a classification unit configured to classify a plurality of images into a plurality of groups in accordance with attribute information of each image, a display control unit configured to control to display a representative image which represents each of the plurality of groups, a comparison unit configured to compare an image included in one of the plurality of groups classified by the classification unit with an image included in another group, and a determination unit configured to determine one of images included in the one group as a representative image of the one group based on comparison by the comparison unit, the image not overlapping a representative image of the other group.

7 Claims, 38 Drawing Sheets

FIG. 12

| | |
|---|---|
| Header | ~242 |
| *0 Sound | ~244 |
| #0 Frame | ~246 |
| #1 Frame | ~248 |
| #2 Frame | ~250 |
| ⋮ | |
| #Rate-1 Frame | ~252 |
| *1 Sound | |
| #0 Frame | |
| #1 Frame | |
| #2 Frame | |
| ⋮ | |
| #Rate-1 Frame | |
| ⋮ | |
| *N-1 Sound | |
| #0 Frame | |
| #1 Frame | |
| #2 Frame | |
| ⋮ | |
| #Rate-1 Frame | |
| Index | |

| PROCESSING | IMAGE FEED PROCESSING TARGET | SELECTION DISABLE CONDITION |
|---|---|---|
| "SLIDE SHOW" | ALL IMAGES | ·NO CONTENT |
| "ERASE" | IMAGES WITHOUT PROTECT ATTRIBUTE | ·NO PROTECT IMAGE<br>·NO CONTENT |
| "PROTECT" | ALL IMAGES | ·NO CONTENT |
| "PRINT" | STILL IMAGES | ·NO STILL IMAGE<br>·NO CONTENT |
| "TRANSFER ORDER" | UNTRANSFERRED IMAGES | ·NO UNTRANSFERRED IMAGE<br>·NO CONTENT |

FIG. 25
IMG_0001.JPG
CLASSIFICATION ATTRIBUTE : A, B, C
IMG_0002.JPG
CLASSIFICATION ATTRIBUTE : B, C
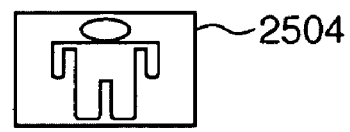
IMG_0003.JPG
CLASSIFICATION ATTRIBUTE : B
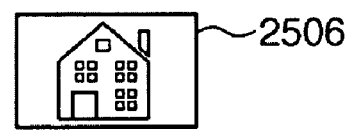
FIG. 26
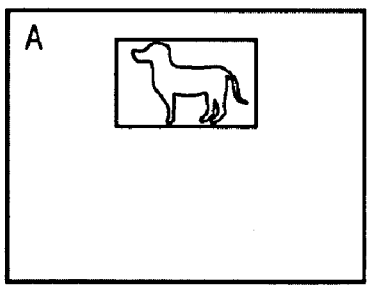
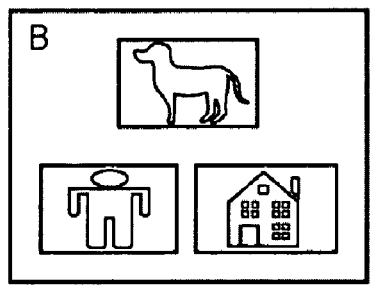
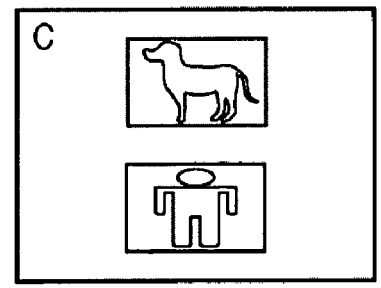

FIG. 27
Erase
☑ A ATTRIBUTE IMAGE 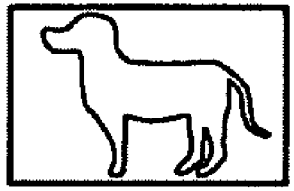
☐ B ATTRIBUTE IMAGE 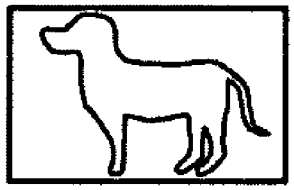
☐ C ATTRIBUTE IMAGE 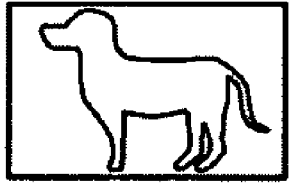

FIG. 29
Erase
☑ A ATTRIBUTE IMAGE 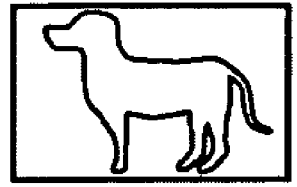
☐ B ATTRIBUTE IMAGE 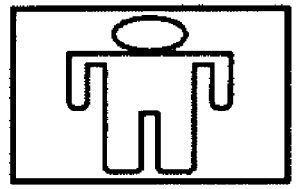
☐ C ATTRIBUTE IMAGE 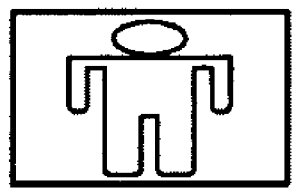

FIG. 31
Erase
- ☑ A ATTRIBUTE IMAGE 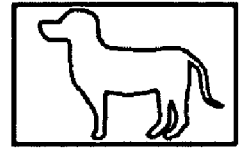
- ☐ B ATTRIBUTE IMAGE 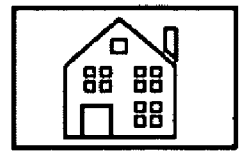
- ☐ C ATTRIBUTE IMAGE 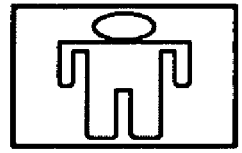
FIG. 32
Erase
- ☑ A ATTRIBUTE IMAGE 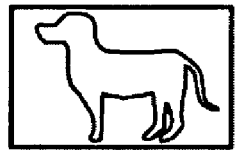
- ☐ B ATTRIBUTE IMAGE 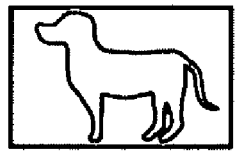 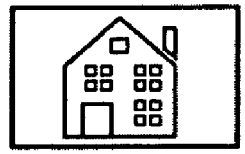
- ☐ C ATTRIBUTE IMAGE 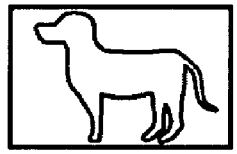 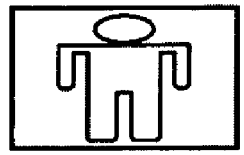

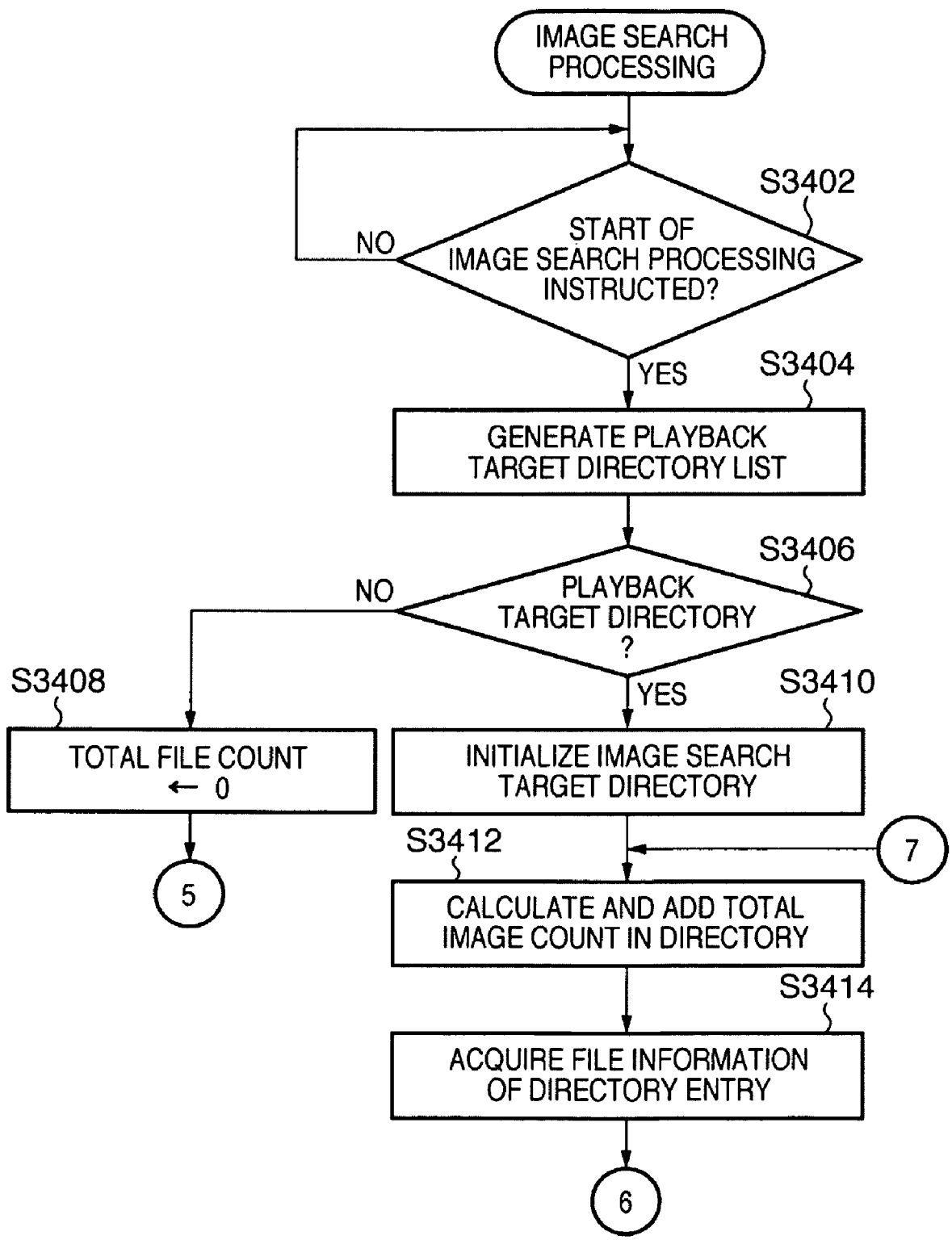

FIG. 37

[RELIABILITY CONFIRMATION INFORMATION]:
- MEDIA RELIABILITY INFORMATION
  - MINIMUM FILE NUMBER
  - MAXIMUM FILE NUMBER
  - SUM OF FILE NUMBERS
  - SUM OF TIME STAMPS
  - SUM OF FILE SIZES
  - TOTAL NUMBER OF FILES

- MANAGEMENT FILE RELIABILITY INFORMATION
  - MANAGEMENT FILE VERSION
  - MANAGEMENT FILE SIZE
  - MANAGEMENT FILE CHECKSUM

[MINIMUM FILE INFORMATION]:
- CLASSIFICATION INFORMATION
- IMAGE CAPTURING INFORMATION
- OBJECT INFORMATION

[MINIMUM FILE +1 INFORMATION]:
- CLASSIFICATION INFORMATION
- IMAGE CAPTURING INFORMATION
- OBJECT INFORMATION

⋮

[MAXIMUM FILE −1 INFORMATION]:
- CLASSIFICATION INFORMATION
- IMAGE CAPTURING INFORMATION
- OBJECT INFORMATION

[MAXIMUM FILE INFORMATION]:
- CLASSIFICATION INFORMATION
- IMAGE CAPTURING INFORMATION
- OBJECT INFORMATION

DISPLAY CONTROL APPARATUS, DISPLAY CONTROL METHOD, AND RECORDING MEDIUM

BACKGROUND OF THE INVENTION

1. Field of the Invention

The present invention relates to a display control apparatus, display control method, and recording medium.

2. Description of the Related Art

Recent image capturing apparatuses such as a digital camera for capturing still images and/or moving images are becoming able to record an enormous number of images as the recording media progress. Hence, there is a demand for a technique of efficiently classifying and searching for an enormous number of images.

Each of Japanese Patent Laid-Open Nos. 2004-013575 and 07-295873 has proposed an image capturing apparatus which adds information to classify captured images (image data) to them, thereby enabling efficient image classification and search. Each of Japanese Patent Laid-Open Nos. 2004-013575 and 07-295873 discloses a technique of forming groups by classifying images (image data) containing common associated information, and displaying a representative image for each group.

However, the technique disclosed in Japanese Patent Laid-Open Nos. 2004-013575 and 07-295873 aims at determining and displaying a representative image for a specific group. When an image is included in a plurality of groups, the same image may be displayed as the representative image for the plurality of groups. In this case, the advantage of a capability of easily searching for a group or an image included in a group by referring to a representative image is impaired. In other words, the technique disclosed in Japanese Patent Laid-Open Nos. 2004-013575 and 07-295873 may be unable to implement efficient image classification and search (improve convenience for a user (usability)).

SUMMARY OF THE INVENTION

The present invention provides a technique capable of displaying a representative image suitable for a group including a plurality of image data, thereby improving convenience for a user.

According to the first aspect of the present invention, there is provided a display control apparatus comprising a read out unit configured to read out an image from a recording medium, a classification unit configured to classify a plurality of images into a plurality of groups in accordance with attribute information of each image, a display control unit configured to control to display a representative image which represents each of the plurality of groups, a comparison unit configured to compare an image included in one of the plurality of groups classified by the classification unit with an image included in another group, and a determination unit configured to determine one of images included in the one group as a representative image of the one group based on comparison by the comparison unit, the image not overlapping a representative image of the other group.

According to the second aspect of the present invention, there is provided a display control apparatus comprising a read out unit configured to read out an image from a recording medium, a classification unit configured to classify a plurality of images into a plurality of groups in accordance with attribute information of each image, a display control unit configured to control to display a representative image which represents each of the plurality of groups, and a determination unit configured to determine one of images included in one of the plurality of groups classified by the classification unit as a representative image of the one group, the image having the minimum number of attribute information used for classification by the classification unit.

According to the third aspect of the present invention, there is provided a display control method comprising a read out step for reading out an image from a recording medium, a classification step for classifying a plurality of images into a plurality of groups in accordance with attribute information of each image, a display control step for controlling to display a representative image which represents each of the plurality of groups, a comparison step for comparing an image included in one of the plurality of groups classified in the classification step with an image included in another group, and a determination step for determining one of images included in the one group as a representative image of the one group based on comparison in the comparison step, the image not overlapping a representative image of the other group.

According to the fourth aspect of the present invention, there is provided a display control method comprising a read out step for reading out an image from a recording medium, a classification step for classifying a plurality of images into a plurality of groups in accordance with attribute information of each image, a display control step for controlling to display a representative image which represents each of the plurality of groups, and a determination step for determining one of images included in one of the plurality of groups classified in the classification step as a representative image of the one group, the image having the minimum number of attribute information used for classification in the classification step.

According to the fifth aspect of the present invention, there is provided a computer readable recording medium which records a program for causing a computer to execute a display control method, the program causing the computer to execute a read out step for reading out an image from a recording medium, a classification step for classifying a plurality of images into a plurality of groups in accordance with attribute information of each image, a display control step for controlling to display a representative image which represents each of the plurality of groups, a comparison step for comparing an image included in one of the plurality of groups classified in the classification step with an image included in another group, and a determination step for determining one of images included in the one group as a representative image of the one group based on comparison in the comparison step, the image not overlapping a representative image of the other group.

According to the sixth aspect of the present invention, there is provided a computer readable recording medium which records a program for causing a computer to execute a display control method, the program causing the computer to execute a read out step for reading out an image from a recording medium, a classification step for classifying a plurality of images into a plurality of groups in accordance with attribute information of each image, a display control step for controlling to display a representative image which represents each of the plurality of groups, and a determination step for determining one of images included in one of the plurality of groups classified in the classification step as a representative image of the one group, the image having the minimum number of attribute information used for classification in the classification step.

Further features of the present invention will become apparent from the following description of exemplary embodiments with reference to the attached drawings.

BRIEF DESCRIPTION OF THE DRAWINGS

FIG. 12 is a view showing an example of the structure of a moving image file recorded on a recording medium in step S1110 of FIG. 11.

FIG. 25 is a view showing examples of images recorded on a recording medium.

FIG. 26 is a view showing a result obtained by putting the images shown in FIG. 25 into groups based on classification attributes.

FIG. 27 is a view showing representative images determined using a conventional technique in the respective groups shown in FIG. 26.

FIG. 29 is a view showing representative images determined by executing the representative image determination processing shown in FIG. 28 in the respective groups shown in FIG. 26.

FIG. 31 is a view showing representative images determined by executing the representative image determination processing shown in FIG. 30 in the respective groups shown in FIG. 26.

FIG. 32 is a view showing a case in which representative images determined by executing the representative image determination processing shown in FIG. 30 and the first images of the respective groups are determined as representative images.

FIGS. 34A and 34B are flowcharts for explaining image search processing in step S3308 of FIG. 33.

FIG. 37 is a view showing an example of a search management file.

DESCRIPTION OF THE EMBODIMENTS

Figure 1:
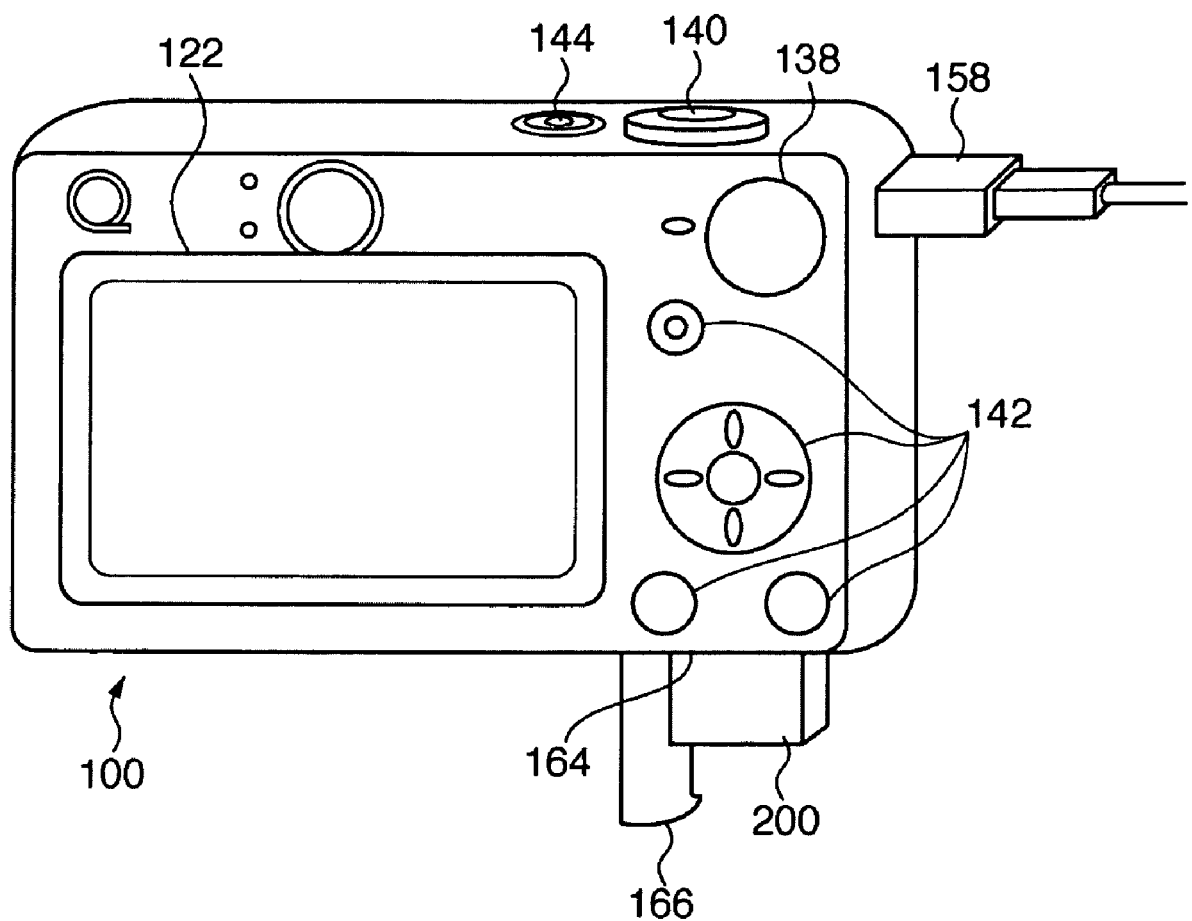
FIG. 1 is a schematic view showing the outer appearance of an image capturing apparatus according to one aspect of the present invention.

A preferred embodiment of the present invention will now be described with reference to the accompanying drawings. Note that the same reference numerals denote the same members throughout the drawings, and a repetitive description thereof will be omitted.

[Arrangement of Image Capturing Apparatus]

Figure 2:
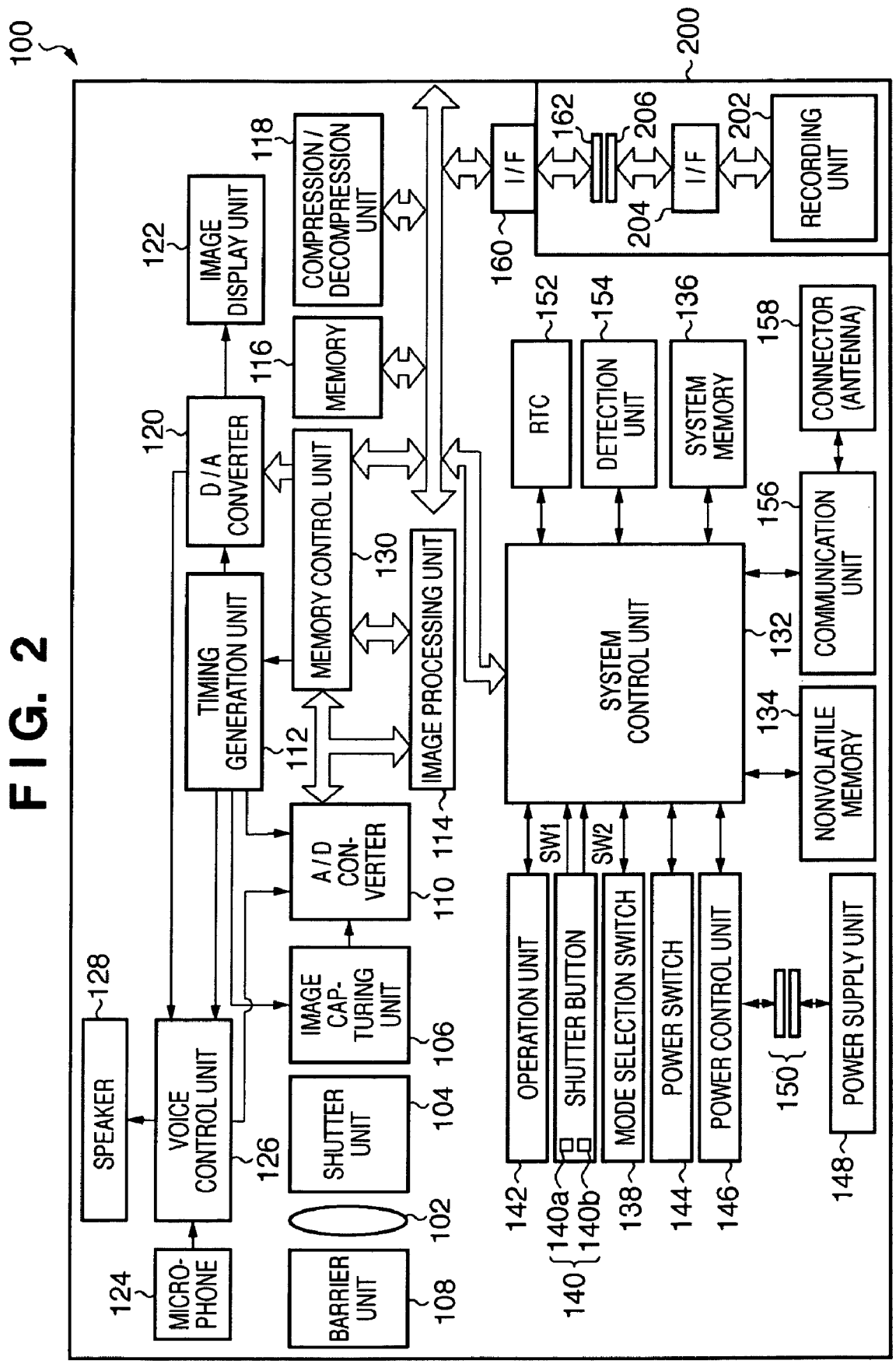
FIG. 2 is a schematic block diagram showing the arrangement of the image capturing apparatus shown in FIG. 1.

FIG. 1 is a schematic view showing the outer appearance of an image capturing apparatus 100 according to one aspect of the present invention. FIG. 2 is a schematic block diagram showing the arrangement of the image capturing apparatus 100. The image capturing apparatus 100 captures a still image or moving image of an object and is embodied as a digital camera in this embodiment. The image capturing apparatus 100 records the image data (image file) of a captured image on a recording medium 200 connected to the image capturing apparatus 100, and also displays (plays back) an image corresponding to image data (image file) recorded on the recording medium 200. In other words, the image capturing apparatus 100 functions as a display control apparatus for controlling image display. The image capturing apparatus 100 also functions as an image processing apparatus for processing captured image data.

As shown in FIGS. 1 and 2, the image capturing apparatus 100 includes an imaging lens 102, shutter unit 104, image capturing unit 106, barrier unit 108, A/D converter 110, timing generation unit 112, image processing unit 114, memory 116, and compression/decompression unit 118. The image capturing apparatus 100 also includes a D/A converter 120, image display unit 122, microphone 124, voice control unit 126, speaker 128, memory control unit 130, system control unit 132, nonvolatile memory 134, and system memory 136. The image capturing apparatus 100 also includes a mode selection switch 138, shutter button 140, operation unit 142, power switch 144, power control unit 146, power supply unit 148, and connector 150. The image capturing apparatus 100 also includes an RTC (Real Time Clock) 152, detection unit 154, communication unit 156, and connector 158. The image capturing apparatus 100 also includes an interface (I/F) 160, connector 162, slot 164, and slot cover 166.

The imaging lens 102 forms an image of light from an object on the image capturing unit 106 (i.e., forms an optical image on the image capturing unit 106).

In this embodiment, the shutter unit 104 has a stop function.

The image capturing unit 106 includes a CCD or a CMOS element (photoelectric conversion element), which converts an optical image formed by the imaging lens 102 into an electrical signal.

The barrier unit 108 covers an image capturing system including the imaging lens 102, shutter unit 104, and image capturing unit 106, thereby preventing the image capturing system from becoming dirty or being damaged.

The A/D converter 110 converts an analog signal (analog data) into a digital signal (digital data). In this embodiment, the A/D converter 110 converts an analog signal output from the image capturing unit 106 into a digital signal or an analog signal output from the voice control unit 126 into a digital signal.

The timing generation unit 112 supplies clock signals and control signals to the image capturing unit 106, A/D converter 110, voice control unit 126, and D/A converter 120 under the control of the memory control unit 130 and the system control unit 132.

The image processing unit 114 executes color conversion processing or resize processing such as pixel interpolation or reduction for data input from the A/D converter 110 or data input from the memory control unit 130.

The image processing unit 114 also executes predetermined arithmetic processing using a captured image and outputs the arithmetic result to the system control unit 132. The system control unit 132 executes exposure control and focus detection control based on the arithmetic result from the image processing unit 114. The system control unit 132 thus executes AF (Auto Focus) processing, AE (Auto Exposure) processing, and EF (Electronic Flash) processing of TTL (Through The Lens) scheme.

The image processing unit 114 also executes predetermined arithmetic processing using a captured image and executes AWB (Auto White Balance) processing of TTL scheme based on the arithmetic result.

The memory 116 stores data output from the A/D converter 110 via the image processing unit 114 and memory control unit 130 or via only the memory control unit 130. For example, the memory 116 stores image data (moving image data or still image data) which is output from the image capturing unit 106 and converted into digital data by the A/D converter 110, or image data to be displayed on the image display unit 122 (i.e., for image display). The memory 116 also stores voice data recorded using the microphone 124 or the file header of an image file. The memory 116 therefore has a (sufficient) memory capacity to allow storage of a predetermined number of still image data or moving image data and voice data in a predetermined time. The memory 116 also functions as a memory (video memory) for image display.

The compression/decompression unit 118 compresses or decompresses image data using, for example, adaptive discrete cosine transform (ADCT). Triggered by the shutter unit 104, the compression/decompression unit 118 reads out image data (captured image) from in the memory 116, compresses it, and stores the compressed image data in the memory 116. The compression/decompression unit 118 also decompresses image data (compressed image) read out from, for example, the recording medium 200 (recording unit 202) to the memory 116, and stores the decompressed image data in the memory 116. Note that the image data stored in the memory 116 by the compression/decompression unit 118 is converted into a file by the system control unit 132 (file unit) and recorded on the recording medium 200 via the interface (I/F) 160.

The D/A converter 120 converts image data for image display, which is stored in the memory 116, into an analog signal (analog data) and supplies it to the image display unit 122.

The image display unit 122 includes a display device such as an LCD and displays an image corresponding to an analog signal supplied from the D/A converter 120 or various kinds of information about the image capturing apparatus 100.

The microphone 124 records voice and generates voice data (voice signal).

The voice control unit 126 includes an amplifier and supplies voice data output from the microphone 124 to the A/D converter 110. The voice data supplied from the voice control unit 126 to the A/D converter 110 is converted into a digital signal and stored in the memory 116 via the memory control unit 130. Voice data recorded on the recording medium 200 is loaded to the memory 116, converted into an analog signal by the D/A converter 120, and supplied to the voice control unit 126. The voice control unit 126 controls the speaker 128 based on the analog signal supplied from the D/A converter 120.

The speaker 128 outputs voice corresponding to an analog signal supplied from the D/A converter 120 under the control of the voice control unit 126.

The memory control unit 130 controls data (image data and voice data) stored in the memory 116 and data (image data and voice data) read out from the memory.

The system control unit 132 controls the overall image capturing apparatus 100. The system control unit 132 implements each processing of this embodiment by executing programs stored (recorded) in the nonvolatile memory 134.

The nonvolatile memory 134 is an electrically erasable and recordable memory such as an EEPROM. The nonvolatile memory 134 stores (records) constants and programs (programs to execute various flowcharts to be described later) for the operation of the system control unit 132.

The system memory 136 includes, for example, a RAM on which constants and variables for the operation of the system control unit 132 or programs read out from the nonvolatile memory 134 are expanded.

The mode selection switch 138 changes the operation mode of the image capturing apparatus 100 (system control unit 132). In this embodiment, the operation mode can change to a still image capturing mode, a moving image capturing mode, or a playback mode.

The shutter button 140 includes a first shutter switch 140a and a second shutter switch 140b.

The first shutter switch 140a is turned on halfway through the operation of the shutter button 140 (press halfway) to generate a first shutter switch signal SW1 and supply it to the system control unit 132. Note that the system control unit 132 starts AF processing, AE processing, and EF processing in accordance with the first shutter switch signal SW1 supplied from the first shutter switch 140a.

The second shutter switch 140b is turned on at the end of the operation of the shutter button 140 (press fully) to generate a second shutter switch signal SW2 and supply it to the system control unit 132. Note that the system control unit 132 starts a series of image capturing processes from signal readout from the image capturing unit 106 to image data recording on the recording medium 200 in accordance with the second shutter switch signal SW2 supplied from the second shutter switch 140b.

The operation unit 142 includes various operation buttons and a touch panel provided on the image display unit 122 and receives a user operation (instruction). The operations buttons include, for example, an erase button, menu button, set button, 4-way selectors (up, down, right, and left buttons) arranged in cross, and a wheel. The user assigns appropriate functions to the touch panel by selecting (operating) various kinds of icons displayed on the image display unit 122. In other words, the touch panel functions as various function buttons such as an end button, return button, image feed button, jump button, narrow-down button, and attribute change button. For example, when the user presses the menu button, a menu window that enables various settings is displayed on the image display unit 122. The user can intuitively input various settings using the menu window displayed on the image display unit 122 and the 4-way selectors and set button.

In this embodiment, the mode selection switch 138 and the shutter button 140 (first shutter switch 140a and second shutter switch 140b) have an aspect as the operation unit 142 which inputs various kinds of instructions to the system control unit 132.

The power switch 144 switches the power state of the image capturing apparatus 100 between a power ON state and a power OFF state.

The power control unit 146 includes a battery detection circuit, DC-DC converter, and switch circuit to switch a block to be energized, and detects the presence/absence of a battery in the power supply unit 148, the battery type, and the battery level. The power control unit 146 controls the DC-DC converter based on the detection result in the power supply unit 148 under the control of the system control unit 132, and supplies a necessary voltage to the units of the image capturing apparatus 100, including the recording medium 200, for a necessary period.

The power supply unit 148 detachably holds a primary cell such as an alkaline cell or lithium cell, a secondary cell such as an NiCd cell, NiMH cell, or Li cell, or an AC adapter and outputs a voltage (DC voltage).

The connector 150 connects the power control unit 146 to the power supply unit 148.

The RTC 152 counts the date and time. The RTC 152 includes a power control unit and a power supply unit separated from the power control unit 146 and the power supply unit 148 and can therefore count the date and time even when the image capturing apparatus 100 is powered off, or the battery level of the power supply unit 148 is zero. Note that the system control unit 132 sets a system timer using the date and time acquired from the RTC 152 and executes timer control at the time of activation.

The detection unit 154 detects whether the recording medium 200 is connected (attached) to the image capturing apparatus 100.

The communication unit 156 executes various kinds of communication processing using RS232C, USB, IEEE1394, P1284, SCSI, modem, LAN, and wireless communication.

The connector 158 connects the image capturing apparatus 100 to an external device (another device) via the communication unit 156. When the communication unit 156 uses wireless communication, the connector 158 is replaced with an antenna.

The interface 160 is an interface to the recording medium 200.

The connector 162 connects the interface 160 to the recording medium 200.

The slot 164 stores the recording medium 200.

The slot cover 166 has a function of holding and fixing the recording medium 200 stored in the slot 164, thereby preventing the recording medium 200 from dropping from the slot 164.

The recording medium 200 is formed from a memory card or a hard disk to record various kinds of data. The recording medium 200 stored in the slot 164 can communicate with the image capturing apparatus 100. The recording medium 200 includes a recording unit 202 including, for example, a semiconductor memory or a magnetic disk, an interface (I/F) 204 to the image capturing apparatus 100, and a connector 206 which connects the interface 204 to the image capturing apparatus 100.

Note that the system control unit 132 of this embodiment functions as a classification unit which classifies a plurality of image data into a plurality of groups in accordance with attribute information, as will be described later in association with selection operation processing. The system control unit 132 also functions as a determination unit which determines a representative image representing each of the plurality of classified groups, as will be described later in association with representative image determination processing.

For example, when determining the representative image of one of a plurality of groups, the system control unit 132 determines, as the representative image of the group, an image which does not overlap the representative images of the remaining groups. More specifically, the system control unit 132 determines, as the representative image, an image corresponding to image data having the minimum number of attribute information out of images which do not overlap the representative images of the remaining groups. The system control unit 132 may determine, as the representative image, an image corresponding to image data having the minimum file number added in the generated order of image data from images which do not overlap the representative images of the remaining groups.

When determining the representative image of one of a plurality of groups, the system control unit 132 determines, as the representative image, an image corresponding to image data having minimum number of attribute information out of image data included on the group.

[Operation of Image Capturing Apparatus]

Figure 3:
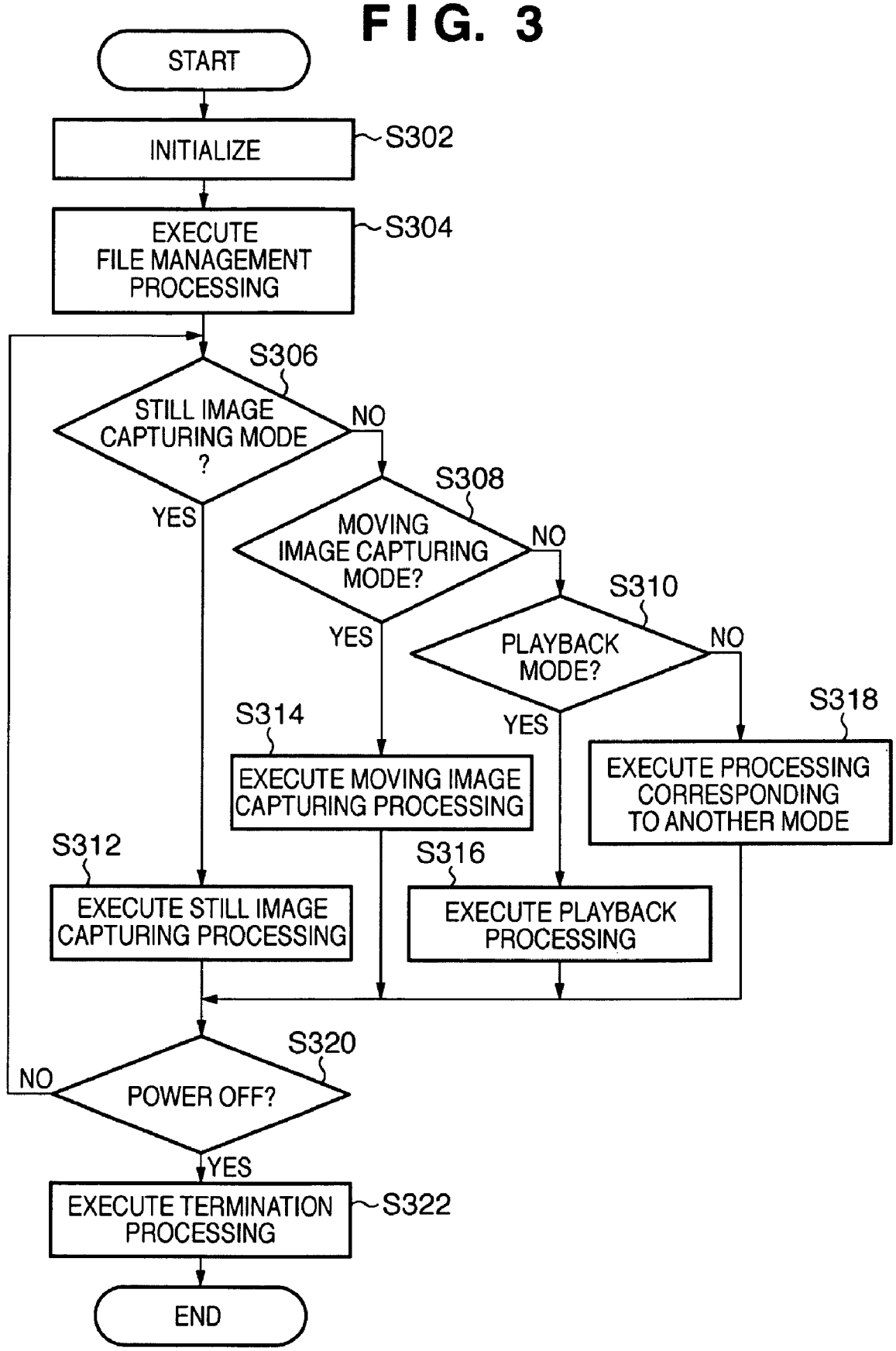
FIG. 3 is a flowchart for explaining the operation of the image capturing apparatus shown in FIG. 1.

The overall operation of the image capturing apparatus 100 will be described. FIG. 3 is a flowchart for explaining the operation of the image capturing apparatus 100. When the power switch 144 is operated to change the power state of the image capturing apparatus 100 from the power OFF state to the power ON state, the image capturing apparatus starts the operation.

In step S302, the system control unit 132 initializes flags, control variables, and the like.

In step S304, the system control unit 132 executes management processing (file management processing) associated with files recorded on the recording medium 200. The file management processing in step S304 will be described later in detail.

In steps S306 to S310, the system control unit 132 determines the operation mode (i.e., the operation mode set by the mode selection switch 138) of the image capturing apparatus 100.

For example, in step S306, the system control unit 132 determines whether the operation mode of the image capturing apparatus 100 is the still image capturing mode. If it is determined that the operation mode of the image capturing apparatus 100 is the still image capturing mode, the process advances to step S312 to execute still image capturing processing. The still image capturing processing in step S312 will be described later in detail. If it is determined that the operation mode of the image capturing apparatus 100 is not the still image capturing mode, the process advances to step S308.

In step S308, the system control unit 132 determines whether the operation mode of the image capturing apparatus 100 is the moving image capturing mode. If it is determined that the operation mode of the image capturing apparatus 100 is the moving image capturing mode, the process advances to step S314 to execute moving image capturing processing. The moving image capturing processing in step S314 will be described later in detail. If it is determined that the operation mode of the image capturing apparatus 100 is not the moving image capturing mode, the process advances to step S310.

In step S310, the system control unit 132 determines whether the operation mode of the image capturing apparatus 100 is the playback mode. If it is determined that the operation mode of the image capturing apparatus 100 is the playback mode, the process advances to step S316 to execute playback processing. The playback processing in step S316 will be described later in detail. If it is determined that the operation mode of the image capturing apparatus 100 is not the playback mode (i.e., the operation mode is another mode except the still image capturing mode, moving image capturing mode, and playback mode), the process advances to step S318 to execute processing corresponding to the other mode. Other modes include, for example, a transmission mode to transmit a file recorded on the recording medium 200, and a reception mode to receive a file from an external device and record it on the recording medium 200.

After processing (processing in step S312, S314, S316, or S318) corresponding to the operation mode set by the mode selection switch 138 is executed, the process advances to step S320.

In step S320, the system control unit 132 determines whether the power switch 144 is operated to change the power state of the image capturing apparatus 100 from the power ON state to the power OFF state. If it is determined that the power state of the image capturing apparatus 100 is not the power OFF state (the power ON state is maintained), the process returns to step S306 (i.e., determination of the operation mode of the image capturing apparatus 100 in steps S306 to S310). If it is determined that the power state of the image capturing apparatus 100 is the power OFF state, the process advances to step S322.

In step S322, the system control unit 132 executes termination processing. The termination processing includes, for example, processing of ending display on the image display unit 122, processing of causing the barrier unit 108 to protect the image capturing system, processing of recording parameters and set values including flags and control variables in the nonvolatile memory 134, and processing of stopping power supply to constituent elements which require no power supply.

When the termination processing in step S322 is completed, the image capturing apparatus 100 ends the operation.

[Still Image Capturing Processing]

Figure 4:
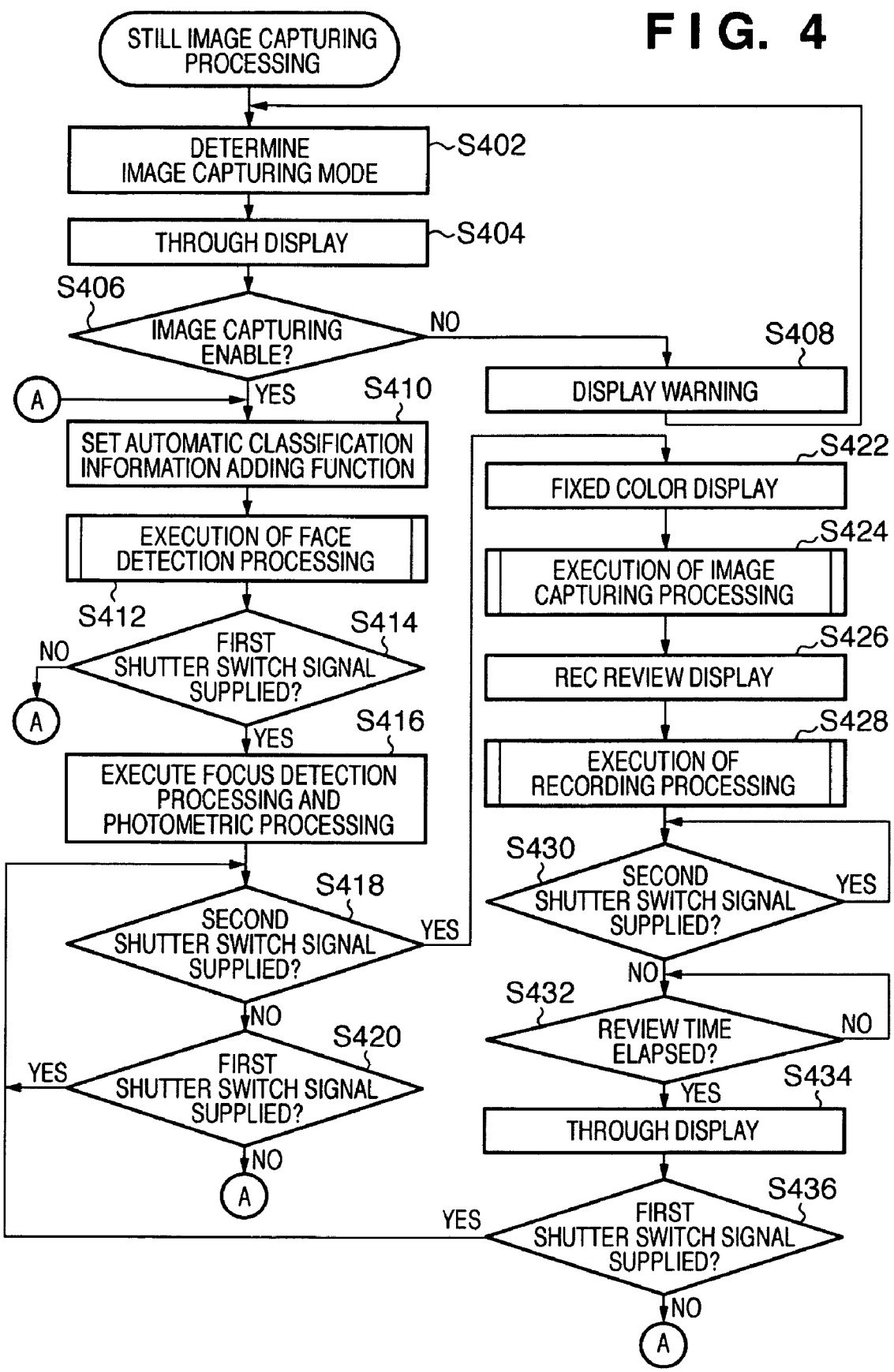
FIG. 4 is a flowchart for explaining still image capturing processing executed in step S312 of FIG. 3.

The still image capturing processing executed in step S312 of FIG. 3 will be described in detail with reference to FIG. 4. FIG. 4 is a flowchart for explaining the still image capturing processing executed in step S312 of FIG. 3. Note that the still image capturing processing is ended by, for example, interrupt processing when the user has operated the mode selection switch 138 to switch the operation mode from the still image capturing mode to another mode, or the power switch 144 to power off the image capturing apparatus 100.

When the still image capturing processing starts, the system control unit 132 determines the image capturing mode in step S402. The system control unit 132 determines the image capturing mode by, for example, acquiring the image capturing mode at the end of the still image capturing mode of last time, which is recorded in the nonvolatile memory 134, and storing the acquired mode in the system memory 136. When the user operates the operation unit 142 to input an image capturing mode, the system control unit 132 may determine the image capturing mode by storing the input image capturing mode in the system memory 136. The image capturing mode is implemented by combining a shutter speed, aperture value, electronic flash emission state, sensitivity setting, and the like suitable to an image capturing scene. In this embodiment, the image capturing apparatus 100 has following image capturing modes (A) to (C).

(A) Auto camera mode: A program installed in the image capturing apparatus 100 automatically determines its various parameters based on a measured exposure value.

(B) Manual mode: The user can feely change various parameters of the image capturing apparatus 100.

(C) Scene mode: A shutter speed, aperture value, electronic flash emission state, sensitivity setting, and the like suitable to an image capturing scene are automatically set.

Note that the scene mode includes following modes (C-1) to (C-12).

(C-1) Portrait mode: This mode is specialized to capture an image of a person who is enhanced on blurred background.

(C-2) Night view mode: This mode is specialized to capture an image of a night view in which a person is irradiated with an electronic flash light while the background image is captured at a low shutter speed.

(C-3) Landscape mode: This mode is specialized to capture an image of a wide-open landscape.

(C-4) Night & snapshot mode: This mode is suitable to capture a fine image of a night view and person without using a tripod.

(C-5) Kids & pet mode: This mode enables to capture an image of a child or a pet which moves lively without missing a shutter chance.

(C-6) Fresh green & autumn colors mode: This mode is suitable to capture an image of leaves in vibrant fresh green or autumn colors.

(C-7) Party mode: This mode is used to capture an object in faithful tints under a fluorescent lamp or an electric lamp while preventing camera shake.

(C-8) Snow mode: This mode is used to capture an image of a person without making it dark or bluish on a snow scene.

(C-9) Beach mode: This mode enables to capture an image of, for example, a person without making it dark on the sea surface or a beach with strong sunlight reflection.

(C-10) Fireworks mode: This mode is used to capture a clear image of a fireworks display in optimum exposure.

(C-11) Aquarium mode: This mode sets a sensitivity, white balance, and tint suitable to capture an image of fish in an indoor aquarium.

(C-12) Underwater mode: This mode is used to capture an image by setting a white balance suitable for underwater image capturing and reducing a bluish tint.

When the image capturing mode is determined, the system control unit 132 displays (through display), on the image display unit 122, an image corresponding to image data from the image capturing unit 106 in step S404.

In step S406, the system control unit 132 determines whether the image capturing apparatus 100 is capable of image capturing. Based on, for example, the battery level of the power supply unit 148 detected via the power control unit 146 and the connection state and remaining capacity of the recording medium 200 detected via the detection unit 154, the system control unit 132 determines whether image capturing is possible.

If it is determined that the image capturing apparatus 100 is not capable of image capturing, the system control unit 132 displays (warning display), on the image display unit 122, a warning image representing that the image capturing apparatus 100 is not capable of image capturing in step S408, and the process returns to step S402. The system control unit 132 may also cause the speaker 128 to output an alarm indicating that the image capturing apparatus 100 is not capable of image capturing.

If it is determined that the image capturing apparatus 100 is capable of image capturing, the system control unit 132 sets in step S410 whether to enable an automatic adding function of automatically adding classification information to classify captured images (image data). The user can arbitrarily set the automatic adding function by operating a menu window displayed on the image display unit 122 upon pressing a menu button included in the operation unit 142. Setting the automatic adding function indicates setting a flag about whether to automatically add classification information based on at least one of the image capturing mode and object information representing the features of an object. The set value (flag ON or OFF) is stored in the system memory 136. Setting whether to enable the automatic adding function makes it possible to disable the automatic adding function if the user does not want addition of classification information. The classification information will be described later in detail.

In step S412, the system control unit 132 executes face detection processing of detecting whether a human face exists in the image (image data) displayed (through display) on the image display unit 122. If a human face is detected by the face detection processing, face information including the number of faces detected in the image (image data), and the position coordinates, size (width and height), and reliability coefficient of each face is stored in the system memory 136. If no human face is detected by the face detection processing, face information including the number of faces detected in the image (image data), and the position coordinates, size (width and height), and reliability coefficient of each face is set to 0 ("no face detected"). The face detection processing in step S412 will be described later in detail.

In step S414, the system control unit 132 determines whether the first shutter switch signal SW1 is supplied from the first shutter switch 140a (i.e., whether the first shutter switch 140a is ON).

If it is determined in step S414 that the first shutter switch signal SW1 is not supplied, the process returns to step S410. If it is determined in step S414 that the first shutter switch signal SW1 is supplied, the process advances to step S416.

In step S416, the system control unit 132 executes focus detection processing to focus the imaging lens 102 on the object, and executes photometric processing to determine the aperture value and shutter speed (shutter time). Note that in the photometric processing, electronic flash setting is also executed as needed. If a human face has been detected by the face detection processing in step S412, the focus detection processing may be executed within the range of the detected face.

In step S418, the system control unit 132 determines whether the second shutter switch signal SW2 is supplied from the second shutter switch 140b (i.e., whether the second shutter switch 140b is ON).

If it is determined in step S418 that the second shutter switch signal SW2 is not supplied, the process returns to step S420. If it is determined in step S418 that the second shutter switch signal SW2 is supplied, the process advances to step S422.

In step S420, the system control unit 132 determines whether the first shutter switch signal SW1 is supplied from the first shutter switch 140a.

If it is determined in step S420 that the first shutter switch signal SW1 is not supplied, the process returns to step S410. If it is determined in step S420 that the first shutter switch signal SW1 is supplied, the process advances to step S418.

That is, if both the second shutter switch 140b and the first shutter switch 140a are OFF, the process returns to step S410. While the second shutter switch 140b is OFF, and the first shutter switch 140a is ON, steps S418 and S420 are repeated. If both the second shutter switch 140b and the first shutter switch 140a are ON, the process advances to step S422.

In step S422, the system control unit 132 changes the display state of the image display unit 122 from through display to fixed color display.

In step S424, the system control unit 132 executes image capturing processing including exposure processing and development processing. In the exposure processing, image data obtained via the image capturing unit 106 and the A/D converter 110 is stored in the memory 116 via the image processing unit 114 and the memory control unit 130 or via only the memory control unit 130. In the development processing, the system control unit 132 reads out, via the memory control unit 130 (and the image processing unit 114), the image data stored in the memory 116 and executes various kinds of processing. The image capturing processing in step S424 will be described later in detail.

In step S426, the system control unit 132 displays (rec review display), on the image display unit 122, the image (i.e., the image obtained by the image capturing processing in step S424) corresponding to the image data obtained by the image capturing processing in step S424. The rec review display indicates displaying the captured image on the image display unit 122 during a predetermined time (review time) to confirm the captured image before recording it on the recording medium 200.

In step S428, the system control unit 132 executes recording processing of recording, as an image file on a recording medium, the image data obtained by the image capturing processing in step S424. The recording processing in step S428 will be described later in detail.

In step S430, the system control unit 132 determines whether the second shutter switch signal SW2 is supplied from the second shutter switch 140b (i.e., whether the second shutter switch 140b is ON).

If it is determined in step S430 that the second shutter switch signal SW2 is supplied, the determination in step S430 is repeated until supply of the second shutter switch signal SW2 stops. During this time, the rec review display in step S426 continues. In other words, the rec review display on the image display unit 122 continues until the recording processing in step S428 is completed, and the second shutter switch 140b is turned off. This allows the user to carefully confirm the captured image by continuously fully pressing the shutter button 140.

It is determined in step S430 that the second shutter switch signal SW2 is not supplied, the system control unit 132 determines in step S432 whether the predetermined review time has elapsed.

If it is determined that the predetermined review time has not elapsed, the determination in step S432 is repeated until the predetermined review time elapses. If it is determined that the predetermined review time has elapsed, the process advances to step S434.

In step S434, the system control unit 132 changes the display state of the image display unit 122 from rec review display to through display. The display state of the image display unit 122 thus automatically changes from rec review display to confirm the captured image to through display to sequentially display images for the next image capturing.

In step S436, the system control unit 132 determines whether the first shutter switch signal SW1 is supplied from the first shutter switch 140a.

If it is determined in step S436 that the first shutter switch signal SW1 is supplied, the process returns to step S418. If it is determined in step S436 that the first shutter switch signal SW1 is not supplied, the process returns to step S410.

That is, while the shutter button 140 remains pressed halfway (the first shutter switch 140a is ON), the system control unit 132 prepares for the next image capturing. If the halfway press of the shutter button 140 is canceled (the first shutter switch 140a is OFF), the system control unit 132 ends the series of image capturing operations and returns to an image capturing standby state.

[Face Detection Processing]

Figure 5:
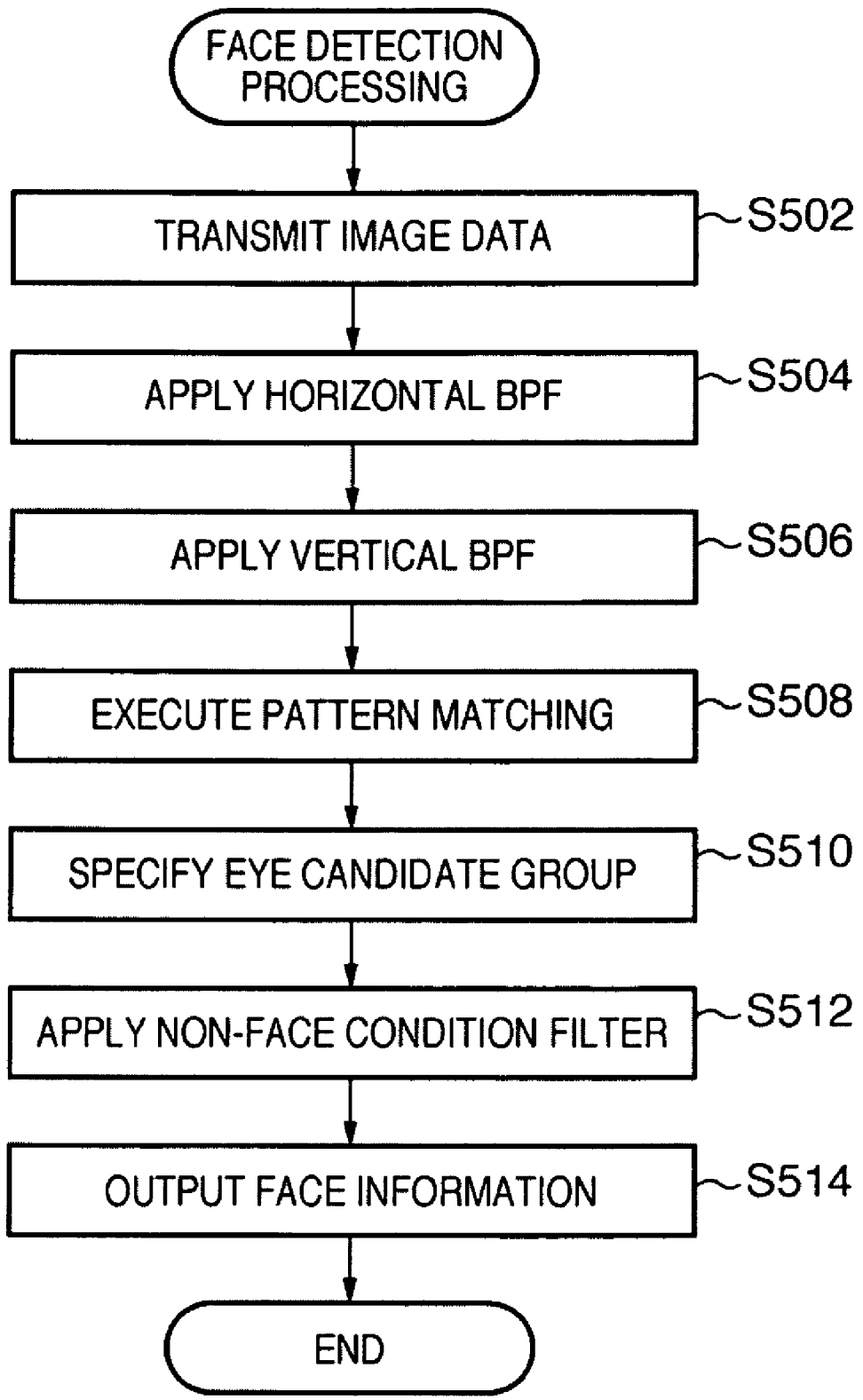
FIG. 5 is a flowchart for explaining face detection processing executed in step S412 of FIG. 4.

The face detection processing executed in step S412 of FIG. 4 will be described in detail with reference to FIG. 5. FIG. 5 is a flowchart for explaining the face detection processing executed in step S412 of FIG. 4.

In step S502, the system control unit 132 transmits image data as a target of face detection processing to the image processing unit 114.

In step S504, under the control of the system control unit 132, the image processing unit 114 applies a horizontal band-pass filter (BPF) to the image data transmitted from the system control unit 132 in step S502.

In step S506, under the control of the system control unit 132, the image processing unit 114 applies a vertical band-pass filter (BPF) to the image data that has undergone step S504.

When the horizontal and vertical BPFs are applied to the image data in steps S504 and S506, edge components are detected from the image data.

In step S508, the system control unit 132 executes pattern matching for the edge components detected in steps S504 and S506 to extract eye, nose, mouth, and ear candidate groups.

In step S510, the system control unit 132 specifies, out of the eye candidate groups extracted in step S508, one eye candidate group which satisfies predetermined conditions (e.g., the distance and tilt between two eyes).

In step S512, the system control unit 132 associates the eye candidate group specified in step S510 with other parts (nose, mouth, and ears) of a face and applies a preset non-face condition filter, thereby detecting a face.

In step S514, the system control unit 132 outputs face information corresponding to the detection result in step S512 and ends the face detection processing.

It is possible to detect face information as object information representing the features of an object by extracting feature amounts from the image data of an image displayed (through display) on the image display unit 122 in the above-described way. In this embodiment, an example in which face information is detected as object information has been described. However, the object information can be any other information such as red eye information if it represents the features of an object.

[Image Capturing Processing]

Figure 6:
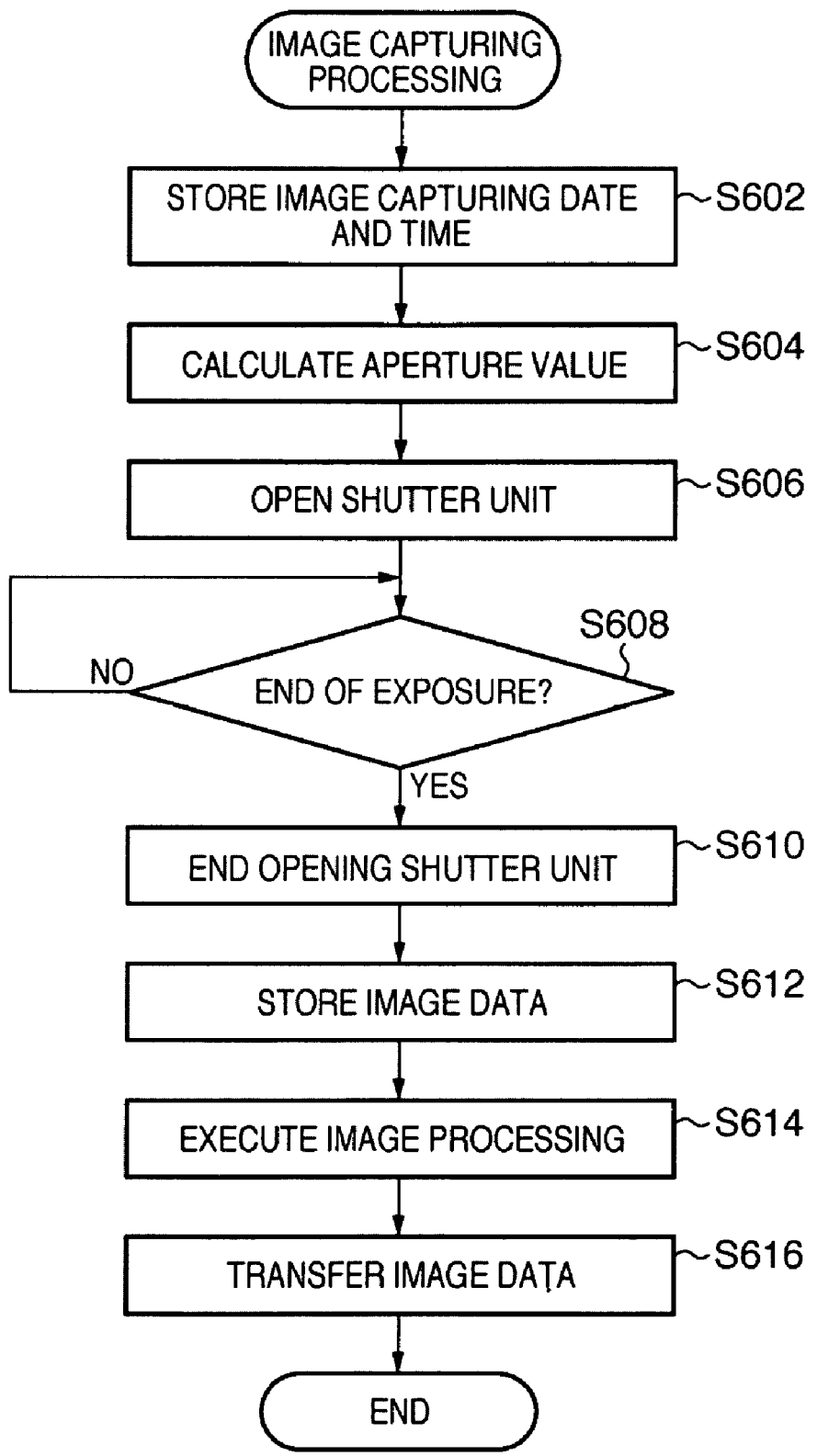
FIG. 6 is a flowchart for explaining image capturing processing executed in step S424 of FIG. 4.

The image capturing processing executed in step S424 of FIG. 4 will be described in detail with reference to FIG. 6. FIG. 6 is a flowchart for explaining the image capturing processing executed in step S424 of FIG. 4. In the image capturing processing shown in FIG. 6, steps S602 to S612 correspond to exposure processing, and steps S614 and S616 correspond to development processing.

In step S602, the system control unit 132 acquires the date and time (image capturing date and time) of the start of image capturing from the system timer and stores the date and time in the system memory 136.

In step S604, the system control unit 132 calculates the aperture value of the shutter unit 104 having a stop function based on photometric data stored in the system memory 136.

In step S606, the system control unit 132 opens the shutter unit 104 in accordance with the aperture value calculated in step S604. Exposure of the image capturing unit 106 thus starts.

In step S608, the system control unit 132 determines whether exposure of the image capturing unit 106 has ended.

If it is determined that exposure of the image capturing unit 106 has not ended, the determination in step S608 is repeated until exposure of the image capturing unit 106 ends.

If it is determined that exposure of the image capturing unit 106 has ended, the system control unit 132 ends opening the shutter unit 104 in step S610.

In step S612, the system control unit 132 reads out a charge signal from the image capturing unit 106 and stores image data in the memory 116 via the A/D converter 110, image processing unit 114, and memory control unit 130. The system control unit 132 may stores the image data in the memory 116 via the A/D converter 110 and the memory control unit 130 (i.e., without intervening the image processing unit 114).

In step S614, the system control unit 132 controls the memory control unit 130 and the image processing unit 114 to read out the image data stored in the memory 116 in step S612 and execute image processing. The image processing includes white balance processing and compression processing. The processed image data is stored in the memory 116.

In step S616, the system control unit 132 reads out the image data processed in step S614 from the memory 116, decompresses the image data, transfers it to the D/A converter 120, and ends the image capturing processing. More specifically, the system control unit 132 controls the compression/decompression unit 118 to resize (decompress) the image data for display on the image display unit 122. The resized image data is transferred to the D/A converter 120 to be displayed on the image display unit 122.

[Recording Processing]

Figure 7:
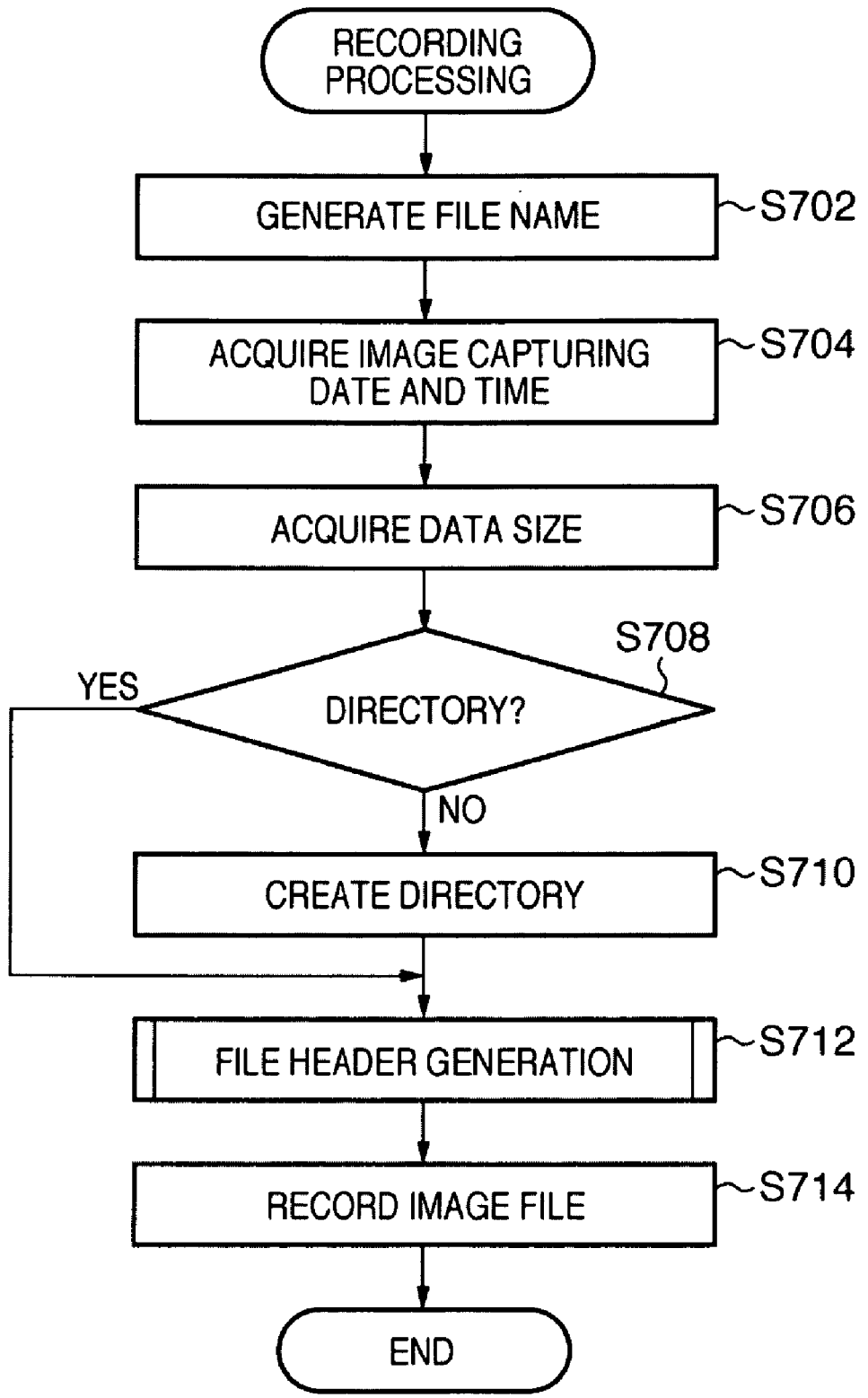
FIG. 7 is a flowchart for explaining recording processing executed in step S428 of FIG. 4.

The recording processing executed in step S428 of FIG. 4 will be described in detail with reference to FIG. 7. FIG. 7 is a flowchart for explaining the recording processing executed in step S428 of FIG. 4.

In step S702, the system control unit 132 generates, based on a file name generation rule to be described later, a file name for the image data to be recorded on the recording medium 200.

In step S704, the system control unit 132 acquires the image capturing date and time stored in the system memory 136 in step S602 of the image capturing processing shown in FIG. 6.

In step S706, the system control unit 132 acquires the data size of the image data to be recorded on the recording medium 200.

In step S708, the system control unit 132 determines whether a directory capable of storing an image file to be generated from the image data exists on the recording medium 200.

If it is determined that no directory capable of storing the image file exists, the process advances to step S710. If it is determined that a directory capable of storing the image file exists, the process advances to step S712.

In step S710, the system control unit 132 creates a directory to store the image file. The directory name of the directory created in step S710 is generated based on a directory name generation rule to be described later.

In step S712, the system control unit 132 generates a file header including the image capturing date and time and the image capturing conditions for the image data stored in the memory 116 in step S614 of the image capturing processing shown in FIG. 6 (i.e., executes file header generation processing). The file header generation processing in step S712 will be described later in detail.

In step S714, the system control unit 132 generates a directory entry based on the file name generated in step S702 and the image capturing date and time acquired in step S704, records the image file on the recording medium 200, and ends the recording processing.

[File Header Generation Processing]

Figure 8:
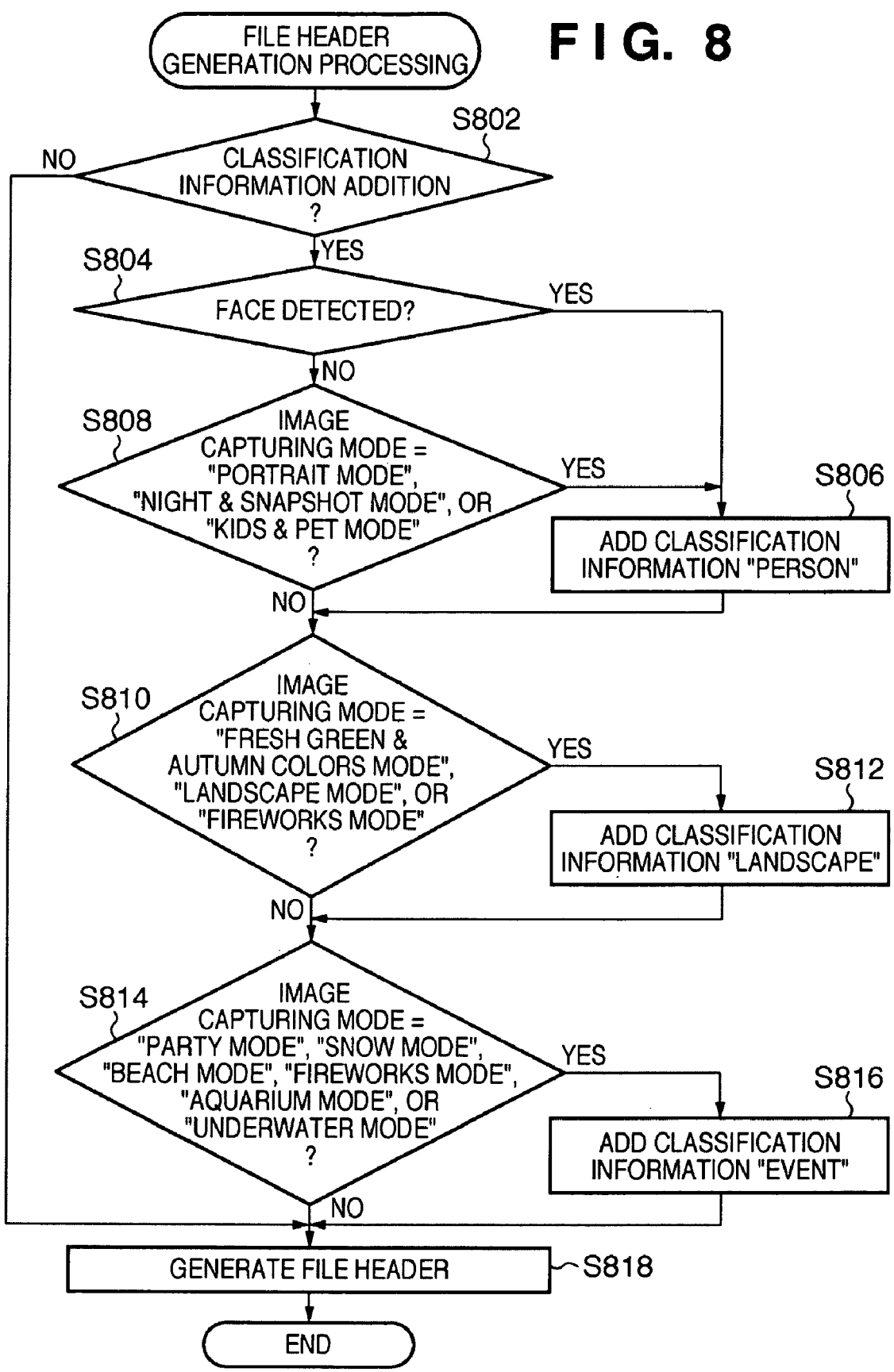
FIG. 8 is a flowchart for explaining file header generation processing executed in step S712 of FIG. 7.

The file header generation processing executed in step S712 of FIG. 7 will be described in detail with reference to FIG. 8. FIG. 8 is a flowchart for explaining the file header generation processing executed in step S712 of FIG. 7.

In step S802, the system control unit 132 acquires, from the system memory 136, the set value of the automatic classification information adding function set in step S410 of the still image capturing processing shown in FIG. 4, and determines whether to automatically add classification information to the image data.

If it is determined not to automatically add classification information to the image data (i.e., the set value (flag) of the automatic classification information adding function is OFF), the process advances to step S818. If it is determined to automatically add classification information to the image data (i.e., the set value (flag) of the automatic classification information adding function is ON), the process advances to step S804.

In step S804, the system control unit 132 reads out the face information stored in the system memory 136 by the face detection processing executed in step S412 of the still image capturing processing shown in FIG. 4, and determines whether a face has been detected in the object.

If it is determined that a face has been detected in the object, the system control unit 132 adds classification information "person" to the image data in step S806.

If it is determined that no face has been detected in the object, the process advances to step S808.

In step S808, the system control unit 132 acquires the image capturing mode stored in the system memory 136, and determines whether the image capturing mode is "portrait mode", "night & snapshot mode", or "kids & pet mode". "Portrait mode", "night & snapshot mode", and "kids & pet mode" are image capturing modes in which the object is expected to include a person.

If it is determined that the image capturing mode is "portrait mode", "night & snapshot mode", or "kids & pet mode", the system control unit 132 adds classification information "person" to the image data in step S806.

If it is determined that the image capturing mode is none of "portrait mode", "night & snapshot mode", and "kids & pet mode", the process advances to step S810.

As described above, in steps S802 to S808, the same classification information "person" is added to the image data based on the object information (face information in this embodiment) representing the features of the object and the image capturing mode upon capturing the object. When capturing an object, the object information and the image capturing mode are different parameters. However, they sometimes have the same context after capturing the object. In this embodiment, face information serving as object information and the image capturing modes "portrait mode", "night & snapshot mode", and "kids & pet mode" have the same context "the object is expected to include a person". It is therefore possible to efficiently classify and search for image data by adding the same classification information to image data in which face information is detected and image data obtained in the image capturing modes "portrait mode", "night & snapshot mode", and "kids & pet mode". In other words, when classification information is added based on at least one of object information representing the features of an object and the image capturing mode upon capturing the object, it is possible to add, to the image data, classification information suitable for operations (classification and search) after image capturing and improve convenience for the user.

In this embodiment, the same classification information is added to the image data even in different image capturing modes such as "portrait mode", "night & snapshot mode", and "kids & pet mode". The set conditions such as the shutter speed and the aperture value of the image capturing apparatus 100 change between the different image capturing modes. However, they sometimes have the same context after capturing the object. As described above, the image capturing modes "portrait mode", "night & snapshot mode", and "kids & pet mode" have the same context "the object is expected to include a person". Hence, when same classification information is added to image data obtained in, of the plurality of image capturing modes, specific image capturing modes having the same context, it is possible to efficiently classify and search for image data and improve convenience for the user.

In step S810, the system control unit 132 determines whether the image capturing mode is "fresh green & autumn colors mode", "landscape mode", or "fireworks mode". "Fresh green & autumn colors mode", "landscape mode", and "fireworks mode" are image capturing modes in which the object is expected to include a landscape.

If it is determined that the image capturing mode is "fresh green & autumn colors mode", "landscape mode", or "fireworks mode", the system control unit 132 adds classification information "landscape" to the image data in step S812.

If it is determined that the image capturing mode is none of "fresh green & autumn colors mode", "landscape mode", and "fireworks mode", the process advances to step S814.

In step S814, the system control unit 132 determines whether the image capturing mode is "party mode", "snow mode", "beach mode", "fireworks mode", "aquarium mode", or "underwater mode". "Party mode", "snow mode", "beach mode", "fireworks mode", "aquarium mode", and "underwater mode" are image capturing modes in which the object is expected to include an event.

If it is determined that the image capturing mode is "party mode", "snow mode", "beach mode", "fireworks mode", "aquarium mode", or "underwater mode", the process advances to step S816.

In step S816, the system control unit 132 adds classification information "event" to the image data.

In steps S810 to S816, image data obtained in "fireworks mode" is added with two piece of classification information "landscape" and "event". In other words, a plurality of pieces of classification information are added based on one image capturing scene. The image capturing mode (image capturing scene) set upon capturing an object may have a plurality of contexts after capturing the object. In this case (for example, the fireworks mode), the system control unit 132 adds a plurality of classification information in accordance with the contexts after capturing the object. This makes it possible to add, to the image data, classification information suitable for operations (classification and search) after image capturing and improve convenience for the user.

If it is determined that the image capturing mode is none of "party mode", "snow mode", "beach mode", "fireworks mode", "aquarium mode", and "underwater mode", the process advances to step S818. Note that no classification information is added in the remaining image capturing modes such as "auto camera mode" and "manual mode" which are negated in all determinations in steps S808, S810, and S814.

In step S818, the system control unit 132 generates a file header using the image capturing date and time and the classification information added in steps S806, S812, and S816 and ends the file header generation processing. However, if it is determined in step S802 not to automatically add classification information to the image data, or the image capturing mode is negated in all determinations in steps S808, S810, and S814, a file header containing no classification information is generated.

As described above, in this embodiment, when an object is captured, classification information to classify image data is automatically added to image data based on at least one of the image capturing mode and object information representing the features of the object. This makes it unnecessary to classify and search for image data while displaying the captured image data (images) in the playback mode. Since the classification information added to the image data is suitable for operations (classification and search) after image capturing, it is possible to efficiently classify and search for the image data.

In this embodiment, the conditions for classification information addition have been described using several image capturing modes as an example. However, the present invention is not limited to this. For example, even when an object is captured in "manual mode", classification information "landscape" may be added if the object is a distant view. When an object is captured using a self timer, at least one of "person" and "event" may be added as classification information. The classification information needs only to be suitable for operations (classification and search) after image capturing and is not limited to "person", "landscape", and "event".

[Directory Structure]

Figure 9:
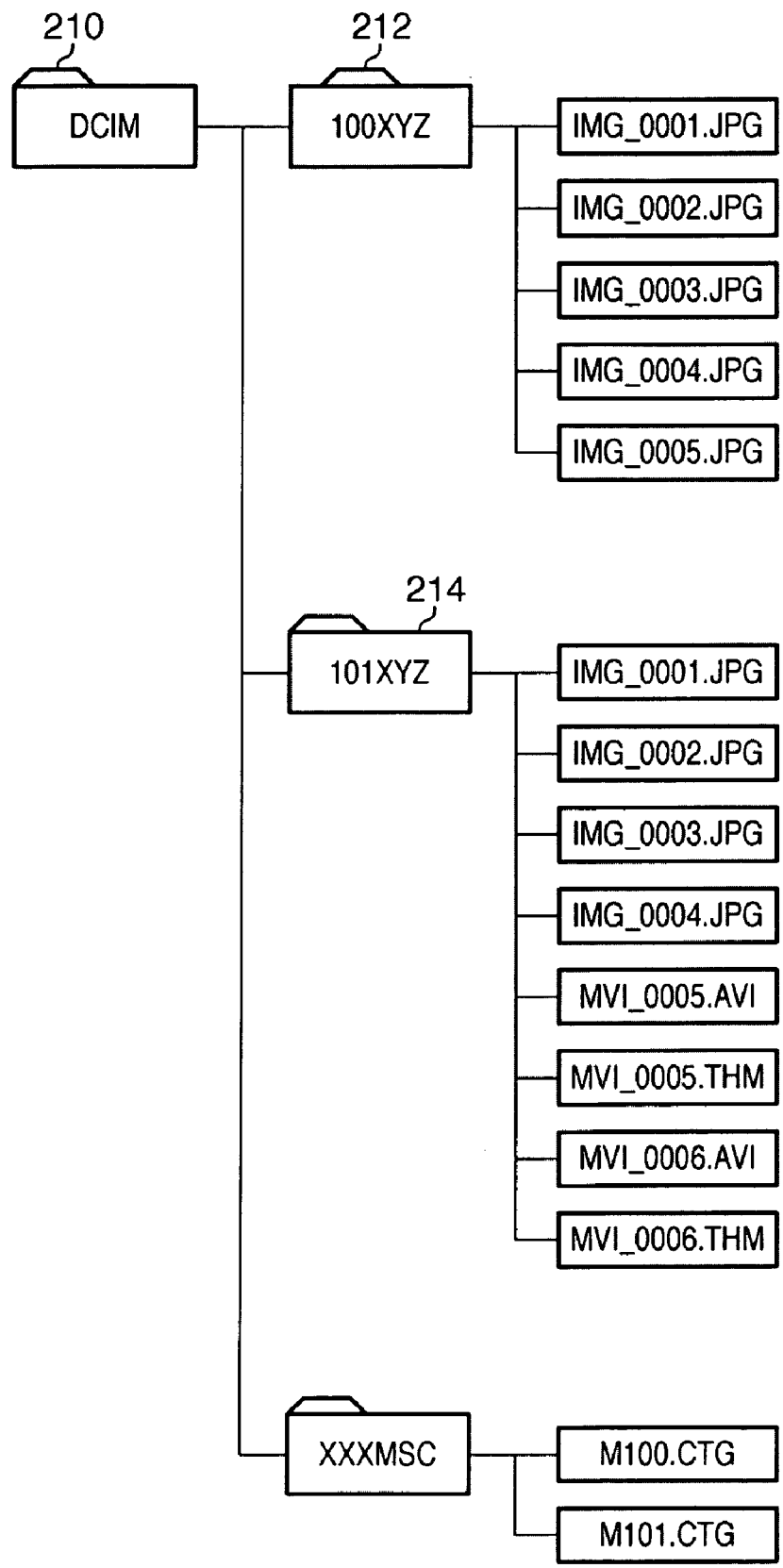
FIG. 9 is a view showing an example of the structure of a directory recorded on a recording medium by executing the recording processing shown in FIG. 7.

FIG. 9 is a view showing an example of the structure of a directory recorded on the recording medium 200 by executing the recording processing shown in FIG. 7. The file name generation rule and the directory name generation rule will be described below with reference to FIG. 9.

As shown in FIG. 9, a DCIM directory 210 is recorded as the root directory. Subdirectories each having six characters are generated under the DCIM directory 210. The first three characters of the subdirectory name held by each subdirectory form a numeral. The numeral formed from the first three characters starts from "100" and is incremented by one every time a subdirectory is generated. FIG. 9 shows subdirectories (subdirectory names) "100XYZ" 212 and "101XYZ" 214.

The subdirectories "100XYZ" 212 and "101XYZ" 214 store files created by the image capturing apparatus 100. The file name of each file includes an 8-character name and a 3-character extension representing a file type. The latter four of the eight characters of the name form a numeral which starts from "0001" and is incremented in every image capturing in the still image capturing mode. In the still image capturing mode, "JPG" is added as the extension.

On the other hand, in the moving image capturing mode, "AVI" is added as the extension. A thumbnail file which records management information is added with "THM" as the extension.

[File Structure]

Figure 10:
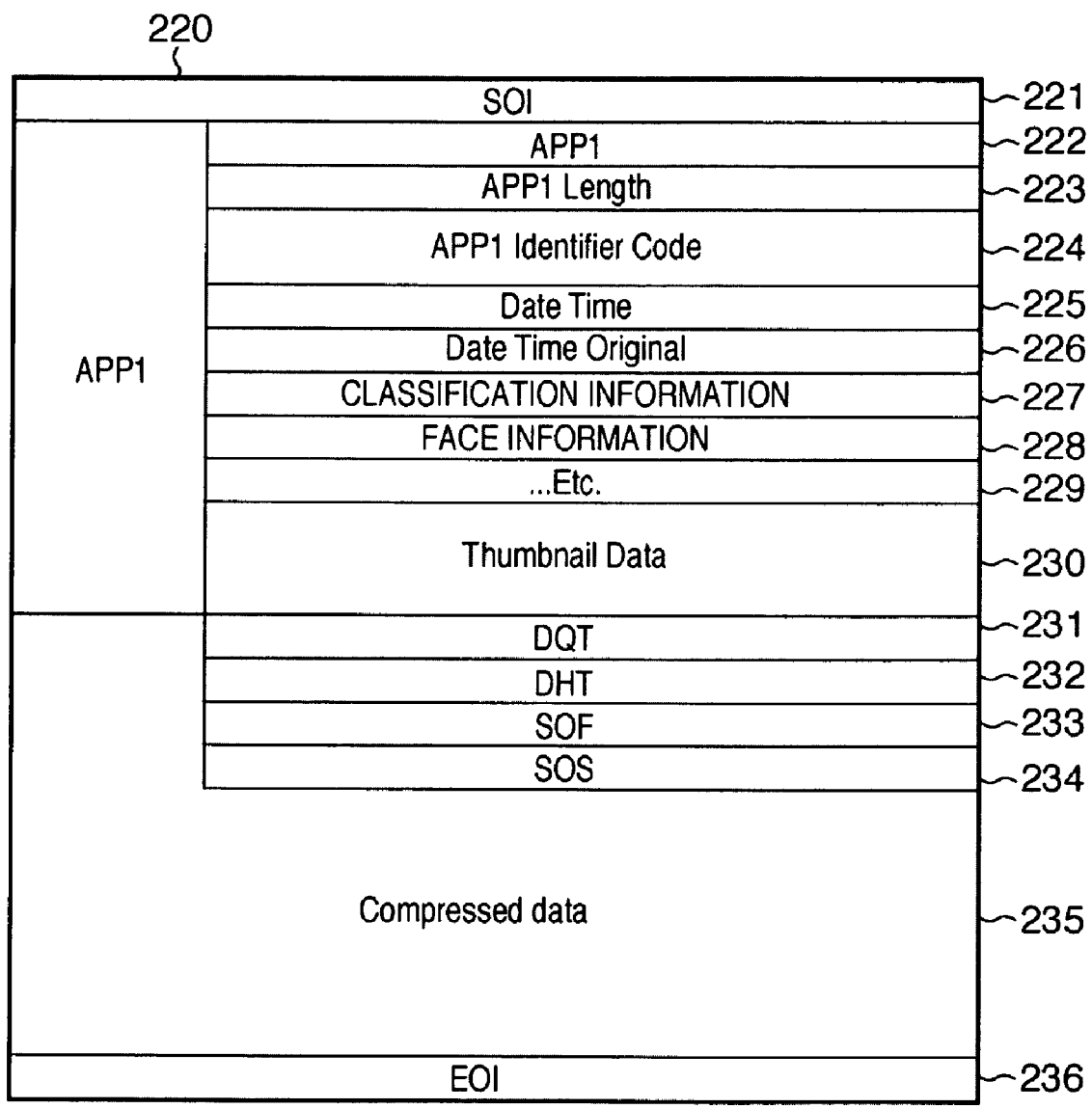
FIG. 10 is a view showing an example of the structure of an image file (still image file) recorded on a recording medium by executing the recording processing shown in FIG. 7.

FIG. 10 is a view showing an example of the structure of an image file (still image file) recorded on the recording medium 200 by executing the recording processing shown in FIG. 7.

Referring to FIG. 10, an image file 220 has, at the top, a marker (SOI) 221 representing the start of the image file, and an application marker (APP1) 222 corresponding to the header next to the marker 221. The image file 220 also has a marker (EOI) 236 representing the end of the image file.

The application marker 222 includes a size (APP1 Length) 223, and an application marker identification code (APP1 Identifier Code) 224. The application marker 222 also includes an image data creation date and time (Date Time) 225, a date and time (Date Time Original) 226 at which the image data has been generated, image data classification information 227, and face information 228. The application marker 222 further includes other image capturing information (. . . Etc.) 229, and thumbnail data (Thumbnail Data) 230.

As described above, the classification information 227 is suitable for operations (classification and search) after image capturing and different from the parameters upon capturing an object. The classification information 227 can be "person", "landscape", "event", or the like, as described above, or general-purpose classification information such as "category 1", "category 2", or "category 3". As the classification information 227, single or a plurality of pieces of classification information can be set. Note that the classification information 227 can be set or changed in the playback mode (playback processing), as will be described later. For example, when image data is to be transferred to an external device (e.g., PC) via the communication unit 156, classification information such as "for work" can be set in the playback mode to prompt the image data transfer destination to perform special processing such as mail sending. That is, the classification information 227 can not only be automatically added (set) to image data upon capturing an object but also set or changed while observing an image corresponding to image data in the playback mode. This makes it possible to set classification information more suitable for operations (classification and search) after image capturing and improve convenience for the user.

The face information 228 is generated by the face detection processing executed in step S412 of the still image capturing processing shown in FIG. 4 and includes the number of faces detected in the image (image data), and the position coordinates, size (width and height), and reliability coefficient of each face, as described above.

The image data recorded in the image file 220 includes a quantization table (DQT) 231, Huffman table (DHT) 232, and frame start marker (SOF) 233. The image data recorded in the image file 220 also includes a scan start marker (SOS) 234, and compressed data (Compressed Data) 235.

[Moving Image Capturing Processing]

Figure 11:
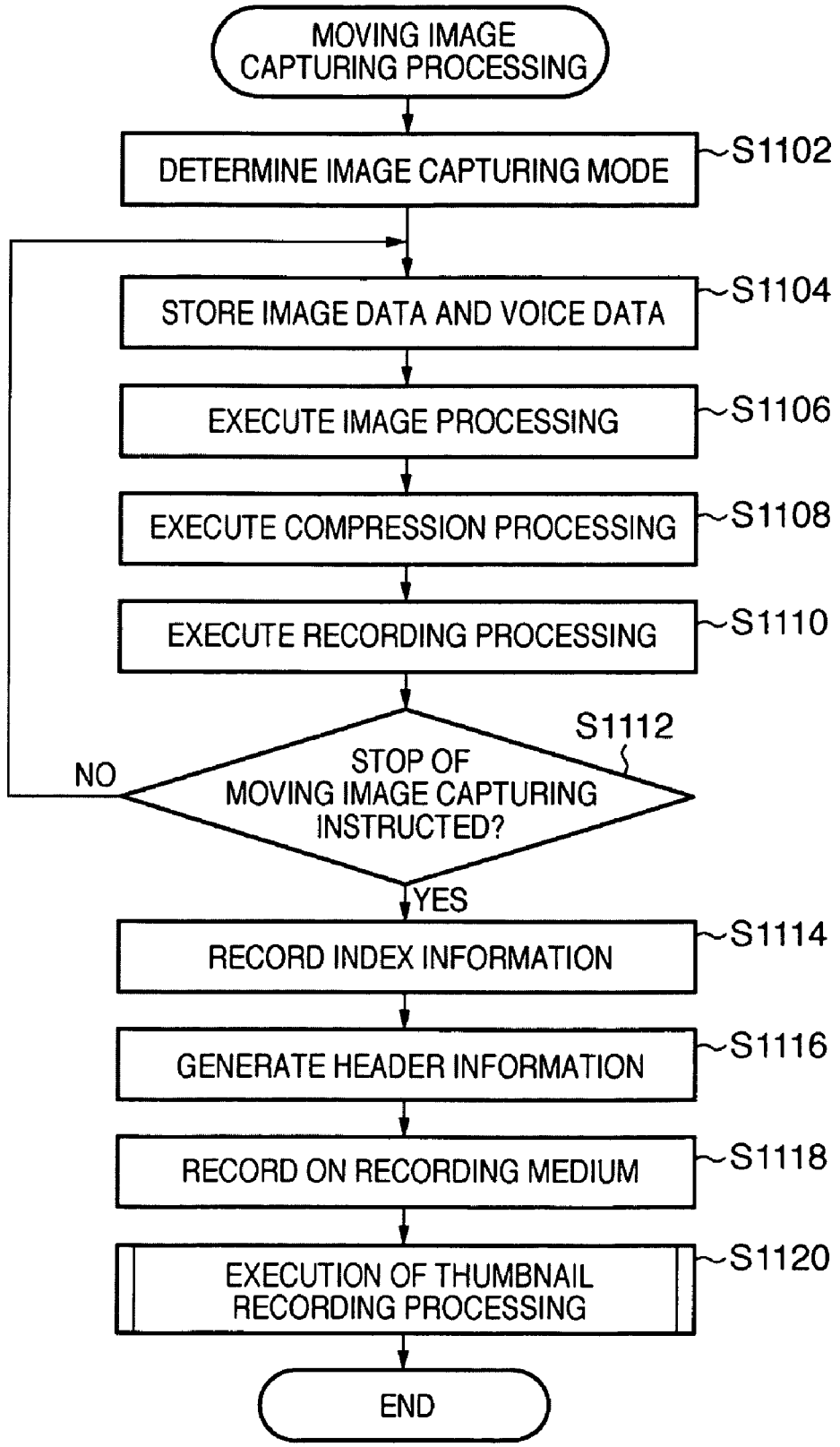
FIG. 11 is a flowchart for explaining moving image capturing processing executed in step S314 of FIG. 3.

The moving image capturing processing executed in step S314 of FIG. 3 will be described next in detail with reference to FIG. 11. FIG. 11 is a flowchart for explaining the moving image capturing processing executed in step S314 of FIG. 3.

In step S1102, the system control unit 132 determines the image capturing mode. In this embodiment, an explanation will be made assuming that the image capturing modes in the moving image capturing mode are the same as those in the still image capturing mode (i.e., the image capturing modes (A) to (C-12)). However, the image capturing apparatus 100 can also have image capturing modes specialized to moving image capturing.

In step S1104, the system control unit 132 sequentially stores image data from the image capturing unit 106 in the memory 116 at a predetermined frame rate. The system control unit 132 also stores, in the memory 116, voice data acquired via the voice control unit 126 and the A/D converter 110. In this embodiment, the voice data is PCM digital data.

In step S1106, the system control unit 132 controls the image processing unit 114 to execute image processing such as image size conversion for the image data stored in the in step S1104.

In step S1108, the system control unit 132 controls the compression/decompression unit 118 to compress the image data, and stores it in the memory 116.

In step S1110, the system control unit 132 executes recording processing of recording, on the recording medium 200, the image data stored in the memory 116 as a moving image file.

FIG. 12 shows an example of the structure of a moving image file recorded on the recording medium 200 in step S1110. Referring to FIG. 12, a header field 242 having a fixed length and containing an image frame rate and a voice sampling rate is arranged at the top of the moving image file. A voice data field 244 having a fixed length and storing voice data of a predetermined recording unit (1 sec in this embodiment) is arranged immediately after the header field 242. The voice data is acquired by sampling voice input to the microphone 124 into digital data via the voice control unit 126 and the A/D converter 110 and stored in the memory 116, as described above. Data fields 246 to 252 storing frame data recorded at a predetermined frame rate are arranged immediately after the voice data field 244. In this way, the voice data and frame data of a predetermined recording unit are sequentially generated and stored.

Referring back to FIG. 11, in step S1112, the system control unit 132 determines whether stop of moving image capturing is instructed. Stop of moving image capturing is instructed, for example, by operating an image capturing stop switch in the operation unit 142 or in accordance with shortage of the remaining capacity of the memory 116 or the recording medium 200.

If it is determined that stop of moving image capturing is not instructed, the process returns to step S1104.

If it is determined that stop of moving image capturing is instructed, the process advances to step S1114.

In step S1114, the system control unit 132 records, on the recording medium 200, the image data and voice data stored (remaining) in the memory 116, and records index information which stores the offsets or sizes of the image data and voice data.

In step S1116, the system control unit 132 generates header information containing, for example, the total number of frames.

In step S1118, the system control unit 132 describes the total data size in a directory entry and records the information on the recording medium 200.

In step S1120, the system control unit 132 executes thumbnail recording processing and ends the moving image capturing processing. For example, the system control unit 132 records the management information of the moving image file in a thumbnail file (for example, MVI_0005.THM shown in FIG. 9) which has the same number as the file name of the moving image and "THM" as the extension. The thumbnail recording processing in step S1120 will be described later in detail.

[Thumbnail Recording Processing]

Figure 13:
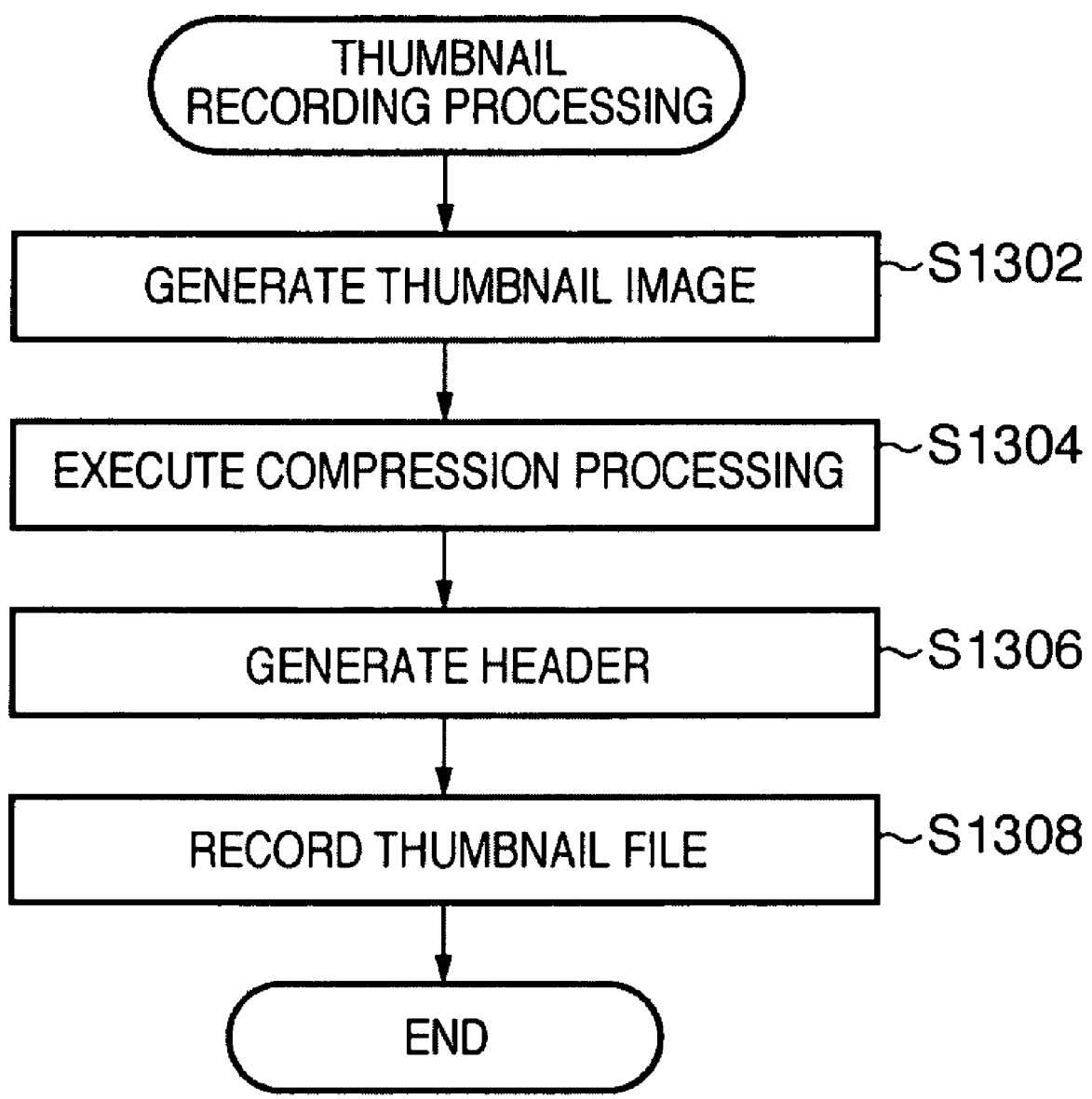
FIG. 13 is a flowchart for explaining thumbnail recording processing executed in step S1120 of FIG. 11.

The thumbnail recording processing executed in step S1120 of FIG. 11 will be described in detail with reference to FIG. 13. FIG. 13 is a flowchart for explaining thumbnail recording processing executed in step S1120 of FIG. 11. A thumbnail file has the same structure as the image file (still image file) shown in FIG. 10 except the thumbnail data 230. Note that a thumbnail image is recorded in the compressed data 235.

In step S1302, the system control unit 132 controls the image processing unit 114 to generate a thumbnail image. In this embodiment, a thumbnail image is generated by executing image processing of, for example, converting the first frame of the moving image data stored in the memory 116 into a predetermined image size.

In step S1304, the system control unit 132 controls the compression/decompression unit 118 to compress the thumbnail image generated in step S1302.

In step S1306, the system control unit 132 generates a header including an application marker (FIG. 10).

In step S1308, the system control unit 132 records a thumbnail file including the thumbnail image and the header on the recording medium 200, and ends the thumbnail recording processing.

[Reception Processing]

Figure 14:
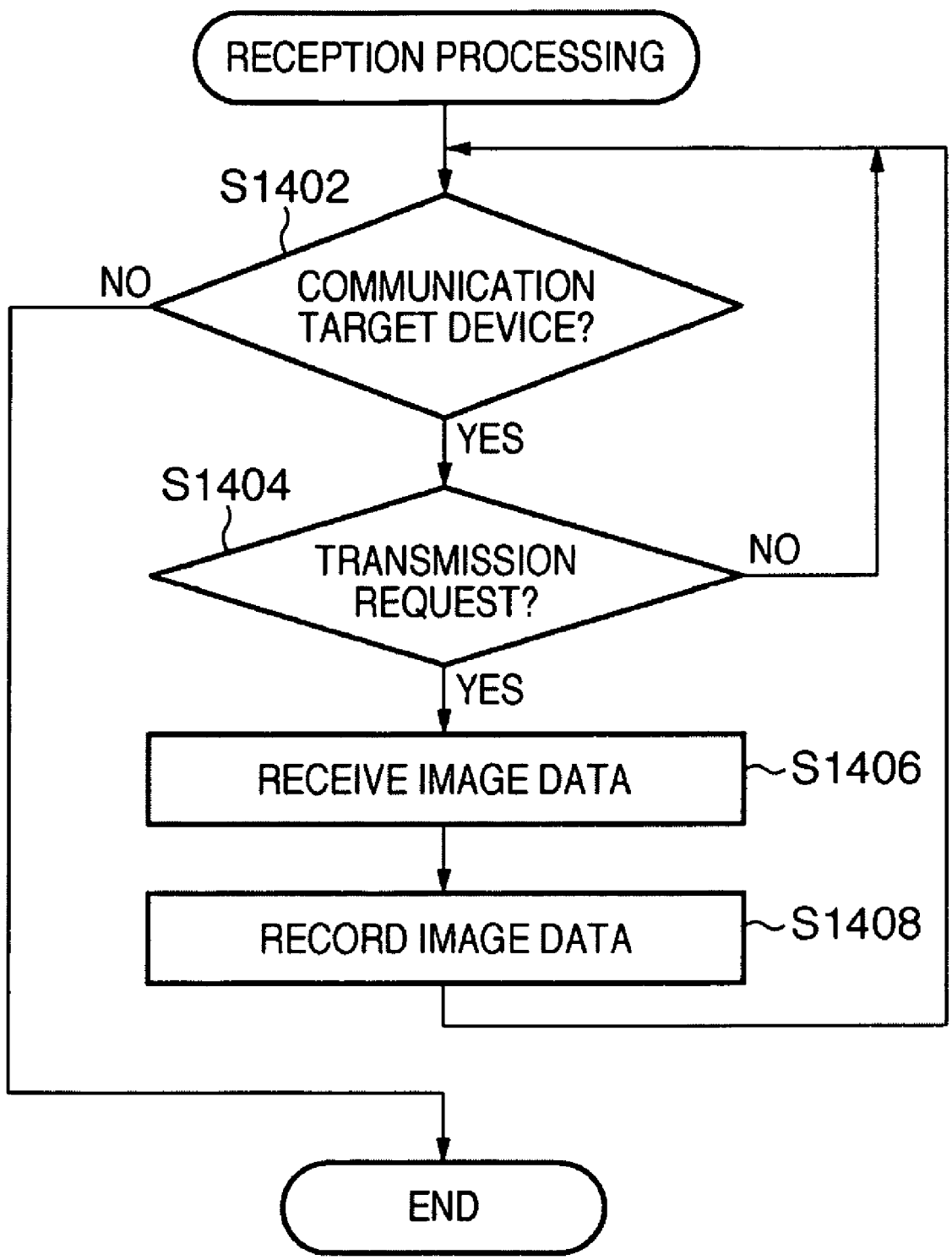
FIG. 14 is a flowchart for explaining reception processing executed in step S318 of FIG. 3.

Reception processing will be explained with reference to FIG. 14 as an example of processing executed in step S318 of FIG. 3 in correspondence with another mode. FIG. 14 is a flowchart for explaining reception processing executed in step S318 of FIG. 3. Reception processing is executed when the user has changed (set) the operation mode of the image capturing apparatus 100 to a reception mode by operating the mode selection switch 138. In this embodiment, an example will be described in which image data (image file) is received from an external device (to be referred to as a "communication target device" hereinafter) and recorded on the recording medium 200.

In step S1402, the system control unit 132 determines whether a communication target device exists.

If it is determined that no communication target device exists, the reception processing is ended.

If it is determined that a communication target device exists, the system control unit 132 determines in step S1404 whether an image data transmission request is received from the communication target device.

If it is determined that no image data transmission request is received from the communication target device, the process returns to step S1402.

If it is determined that an image data transmission request is received from the communication target device, the system control unit 132 receives image data from the communication target device via the communication unit 156 in step S1406. Note that the image data received from the communication target device is temporarily stored in the memory 116.

In step S1408, the system control unit 132 records the image data received in step S1406 on the recording medium 200. If the header of the image data received from the communication target device includes classification information, the image data is directly recorded on the recording medium 200. If the header of the image data received from the communication target device includes no classification information, the image data may be recorded on the recording medium 200 after executing the file header generation processing shown in FIG. 8 and adding classification information. In this case, object information or the image capturing mode of the image capturing apparatus upon capturing the object is acquired by referring to the header of the image data received from the communication target device. For example, face information included in the header of the image data received from the communication target device or an image capturing mode (image capturing scene) included in another image capturing information (FIG. 10) is acquired. Note that the object information may newly be detected by analyzing the image data received from the communication target device.

When the image data received from the communication target device is recorded on the recording medium 200, the process returns to step S1402 to determine again whether a communication target device exists.

[Playback Processing]

Figure 15:
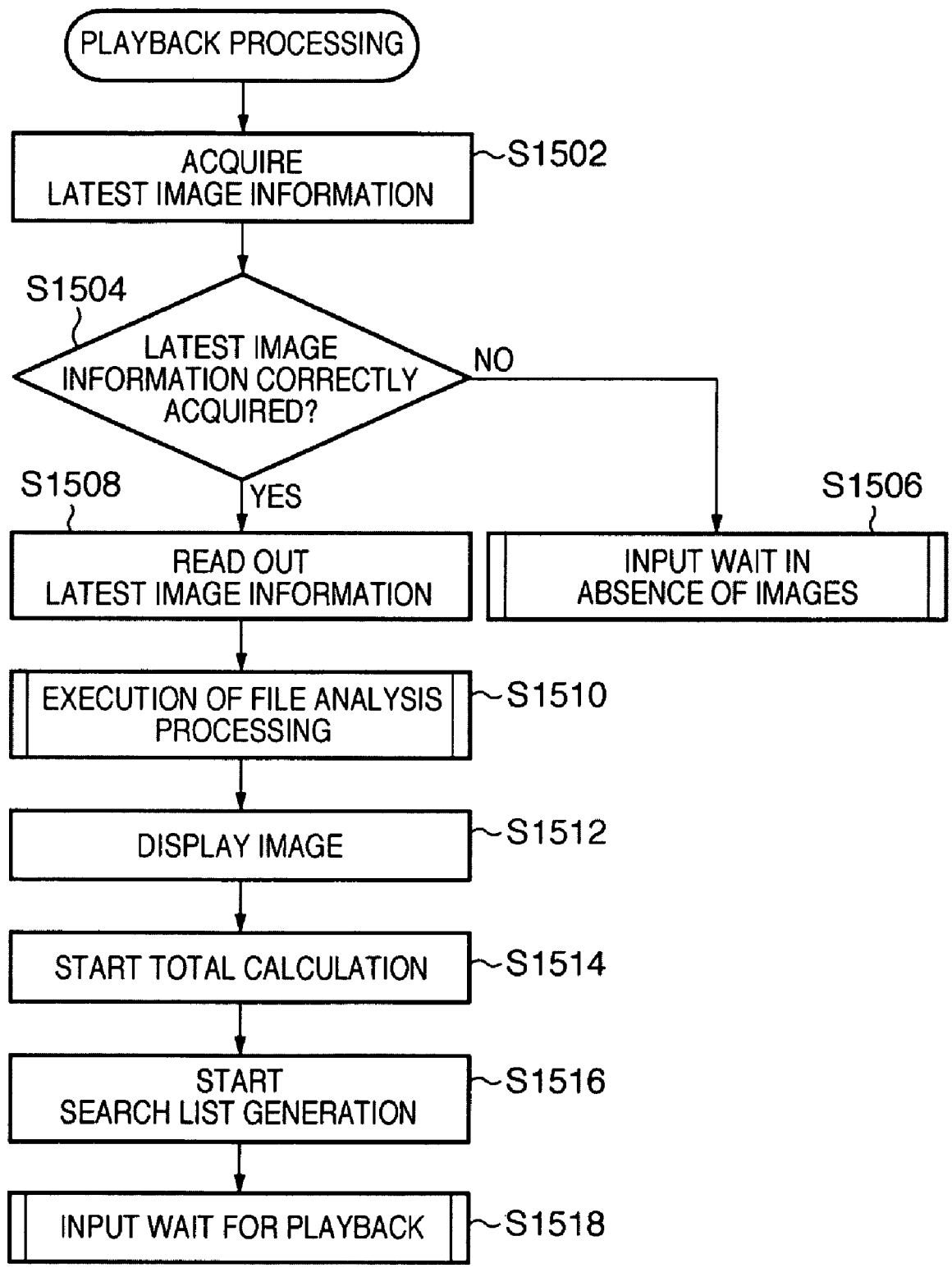
FIG. 15 is a flowchart for explaining playback processing executed in step S316 of FIG. 3.

The playback processing executed in step S316 of FIG. 3 will be described in detail with reference to FIG. 15. FIG. 15 is a flowchart for explaining the playback processing executed in step S316 of FIG. 3.

In step S1502, the system control unit 132 acquires latest image information from the recording medium 200. Executing latest image information acquisition (step S1502) before total calculation (step S1514) and search list generation (step S1516) makes it possible to quickly display an image on the image display unit 122 at the start of playback processing.

In step S1504, the system control unit 132 determines whether the latest image information is correctly acquired from the recording medium 200.

If it is determined that the latest image information is not correctly acquired, the system control unit 132 shifts to an input wait state in the absence of images in step S1506. The latest image information cannot correctly be acquired when, for example, no image is recorded on the recording medium 200, or no image information is acquired because of a failure in the recording medium 200. On the other hand, if the latest image information is correctly acquired, the system control unit 132 determines that at least one image is recorded on the recording medium 200. The input wait operation in the absence of images in step S1506 will be described later in detail.

If it is determined that the latest image information is correctly acquired, the system control unit 132 reads out latest image data (image file) from the recording medium 200 based on the latest image information acquired in step S1502.

In step S1510, the system control unit 132 executes file analysis processing to acquire attribute information including the image capturing information and classification information of the image in the readout latest image data. The file analysis processing in step S1510 will be described later in detail.

In step S1512, the system control unit 132 displays, on the image display unit 122, an image corresponding to the latest image data read out in step S1508. At this time, the attribute information acquired in step S1510 is also displayed on the image display unit 122. If a failure in image data such as partial corruption of image data is detected by the file analysis processing in step S1510, it (error) is displayed.

In step S1514, the system control unit 132 starts calculating the total number of image data recorded on the recording medium 200. The total calculation in step S1514 is executed in the background so that the process can advance to the next step without waiting for completion of the calculation. This allows browsing images without waiting for completion of the total calculation even when a number of image data are recorded on the recording medium 200, and the total calculation takes a long time. The total calculation of image data is particularly enabled when the total number of image data has changed because of recording or deletion of image data newly captured in the still image capturing mode or moving image capturing mode upon changing the still image capturing mode or moving image capturing mode to the playback mode. However, if no new image data is recorded or deleted in the still image capturing mode or moving image capturing mode, the total calculation (step S1514) need not be performed because the already calculated total image data count is used.

In step S1516, the system control unit 132 starts generating a search list (search list generation processing). The search list is used to acquire in advance attribute information added to image data and manage it. Search list generation enables to quickly play back or erase image data corresponding to each attribute information. The search list generation in step S1516 is also executed in the background, like the total calculation in step S1514, so that the process can advance to the next step without waiting for completion of the processing. The search list generation processing in step S1516 will be described later in detail.

In step S1518, the system control unit 132 shifts to an input wait state for playback. The input wait operation for playback in step S1518 will be described later in detail.

[Input Wait Operation in Absence of Images]

Figure 16:
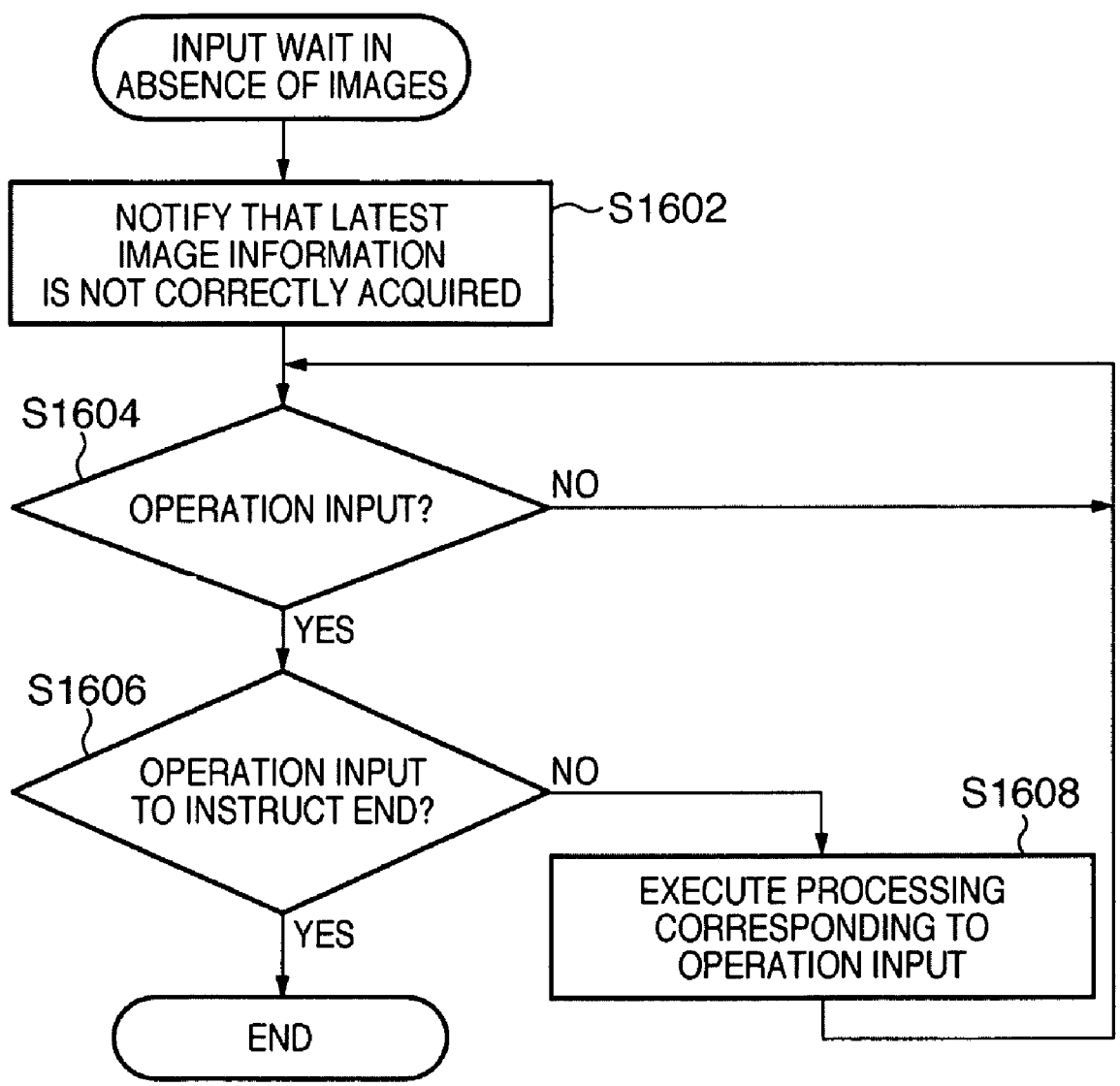
FIG. 16 is a flowchart for explaining an input wait operation in the absence of images in step S1506 of FIG. 15.

The input wait operation in the absence of images in step S1506 of FIG. 15 will be described with reference to FIG. 16. FIG. 16 is a flowchart for explaining the input wait operation in the absence of images in step S1506 of FIG. 15.

In step S1602, the system control unit 132 notifies the user that the latest image information is not correctly acquired (i.e., no image data exists). For example, the system control unit 132 displays a message "there is no image" on the image display unit 122.

In step S1604, the system control unit 132 determines whether an operation input is received. Operation inputs include, e.g., a user operation on the operation unit 142 and an event to notify a drop in the voltage of the power supply unit 148.

If it is determined that no operation input is received, step S1604 is repeated until an operation input is received.

If it is determined that an operation input is received, the system control unit 132 determines in step S1606 whether the operation input instructs an end.

If it is determined that the operation input instructs an end, the playback processing is ended.

If it is determined that the operation input does not instruct an end, the system control unit 132 executes processing corresponding to the operation input in step S1608. For example, if a menu button operation is input without image data, the system control unit 132 displays a menu window on the image display unit 122 to allow the user to, for example, change the settings.

[Input Wait Operation for Playback]

Figure 17A:
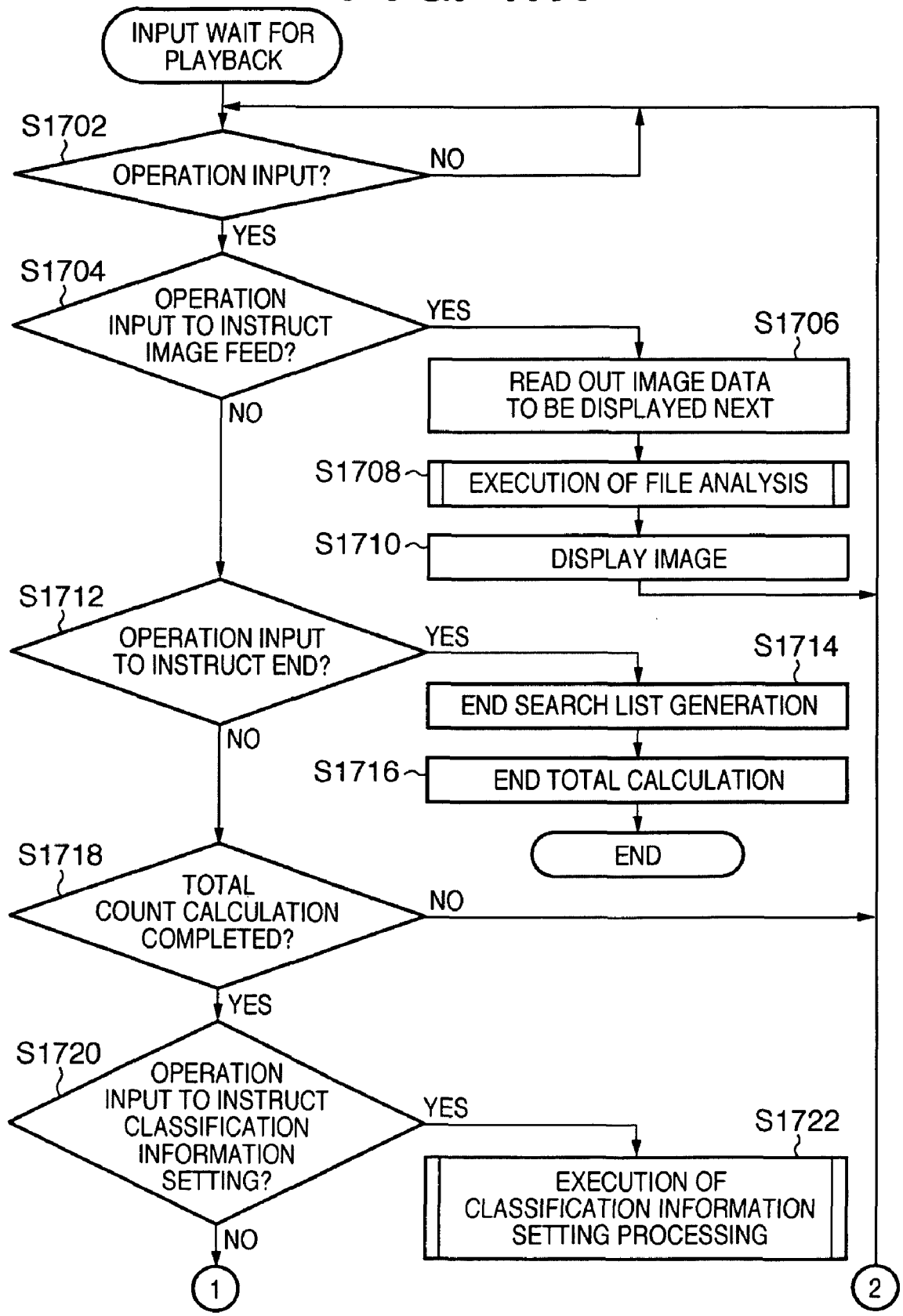
FIGS. 17A and 17B are flowcharts for explaining an input wait operation for playback in step S1518 of FIG. 15.
Figure 17B:
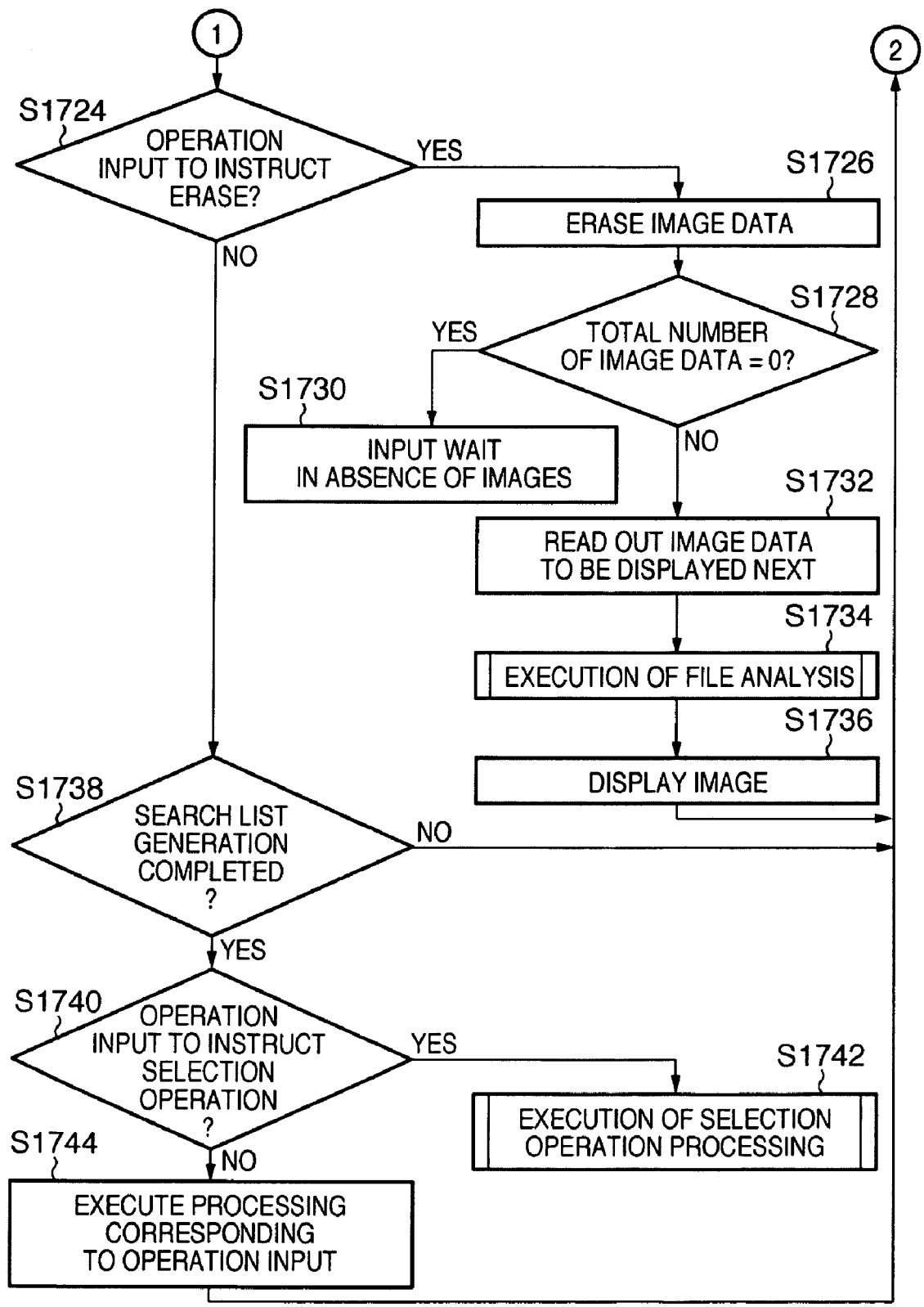

The input wait operation for playback in step S1518 of FIG. 15 will be described with reference to FIGS. 17A and 17B. FIGS. 17A and 17B are flowcharts for explaining the input wait operation for playback in step S1518 of FIG. 15.

In step S1702, the system control unit 132 determines whether an operation input is received. Operation inputs include, e.g., a user operation on the operation unit 142 and an event to notify a drop in the voltage of the power supply unit 148.

If it is determined that no operation input is received, step S1702 is repeated until an operation input is received.

If it is determined that an operation input is received, the system control unit 132 determines in step S1704 whether the operation input instructs image feed. Operation inputs to instruct image feed include user's pressing of the image feed button via the operation unit 142.

If it is determined that the operation input instructs image feed, the system control unit 132 reads out image data to be displayed next on the image display unit 122 in step S1706. The image feed button includes, e.g., a pair of buttons corresponding to feed directions. Image data to be displayed next is read out in accordance with the feed direction corresponding to the operated button.

In step S1708, the system control unit 132 executes file analysis processing for the image data read out in step S1706 to acquire attribute information including the image capturing information and classification information in the readout latest image data.

In step S1710, the system control unit 132 displays, on the image display unit 122, an image corresponding to the image data read out in step S1706, and the process returns to step S1702. At this time, the attribute information acquired by the file analysis processing in step S1708 is also displayed. If a failure in image data such as partial corruption of image data is detected by the file analysis processing in step S1708, it (error) is displayed.

If it is determined that the operation input does not instruct image feed, the system control unit 132 determines in step S1712 whether the operation input instructs an end.

If it is determined that the operation input instructs an end, the system control unit 132 ends the search list generation processing (step S1516) in step S1714. For example, if the search list generation is progressing, the search list generation is interrupted. If the search list generation has been completed, no processing is performed.

In step S1716, the system control unit 132 ends total calculation (step S1514), thereby ending the input wait operation for playback. For example, if the total calculation is progressing, the total calculation is interrupted. If the total calculation has been completed, no processing is performed.

If it is determined that the operation input does not instruct an end, the system control unit 132 determines in step S1718 whether the total calculation of image data is completed.

If it is determined that the total calculation of image data is not completed, the process returns to step S1702. At this time, a message or an icon representing that the total calculation of image data is not completed may be displayed on the image display unit 122.

In this embodiment, the operation input to instruct image feed and the operation input to instruct an end are executed without waiting for completion of the total calculation of image data. However, other operation inputs are neglected until the total calculation of image data is completed.

If it is determined that the total calculation of image data is completed, the system control unit 132 determines in step S1720 whether the operation input instructs classification information setting. Operation inputs to instruct classification information setting include user's pressing of the classification information setting button via the operation unit 142.

If it is determined that the operation input instructs classification information setting, the system control unit 132 executes classification information setting processing in step S1722. The classification information setting processing in step S1722 will be described later in detail.

If it is determined that the operation input does not instruct classification information setting, the system control unit 132 determines in step S1724 whether the operation input instructs image data erase. Operation inputs to instruct image data erase include user's pressing of the erase button via the operation unit 142.

If it is determined that the operation input instructs image data erase, the system control unit 132 erases the image data of the image currently displayed on the image display unit 122 in step S1726.

In step S1728, the system control unit 132 determines whether the total number of image data recorded on the recording medium 200 is 0.

If it is determined that the total number of image data recorded on the recording medium 200 is 0, the system control unit 132 shifts to the input wait state in the absence of images in step S1730.

If it is determined that the total number of image data recorded on the recording medium 200 is not 0, the system control unit 132 reads out image data to be displayed next on the image display unit 122 in step S1732. Note that the image data to be displayed next on the image display unit 122 has a file number smaller than that of the image data erased in step S1726 by one in this embodiment.

In step S1734, the system control unit 132 executes file analysis processing for the image data read out in step S1732 to acquire attribute information in the readout latest image data.

In step S1736, the system control unit 132 displays, on the image display unit 122, an image corresponding to the image data read out in step S1732, and the process returns to step S1702. At this time, the attribute information acquired by the file analysis processing in step S1734 is also displayed. If a failure in image data such as partial corruption of image data is detected by the file analysis processing in step S1734, it (error) is displayed.

If it is determined that the operation input does not instruct image data erase, the system control unit 132 determines in step S1738 whether the search list generation is completed.

If the search list generation is not completed, the process returns to step S1702. At this time, a message or an icon representing that the search list generation is not completed may be displayed on the image display unit 122.

In this embodiment, the operation input to instruct image feed, the operation input to instruct an end, the operation input to instruct classification information setting, and the operation input to instruct image data erase are executed without waiting for completion of the search list generation. However, other operation inputs are neglected until the search list generation is completed.

If it is determined that the search list generation is completed, the system control unit 132 determines in step S1740 whether the operation input instructs a selection operation. Operation inputs to instruct a selection operation include user's pressing of the selection operation button via the operation unit 142.

If it is determined that the operation input instructs a selection operation, the system control unit 132 executes selection operation processing in step S1742. The selection operation processing in step S1742 will be described later in detail.

If it is determined that the operation input does not instruct a selection operation, the system control unit 132 executes processing corresponding to the operation input in step S1744. Examples of the processing corresponding to the operation input are image data (image) editing processing, switch processing to multi-playback (multi-image display), and menu window display processing by the menu button. Note that the multi-playback is a playback mode in which an array of a plurality of thumbnail images corresponding to image data is displayed in one window of the image display unit 122.

[Classification Information Setting Processing]

Figure 18:
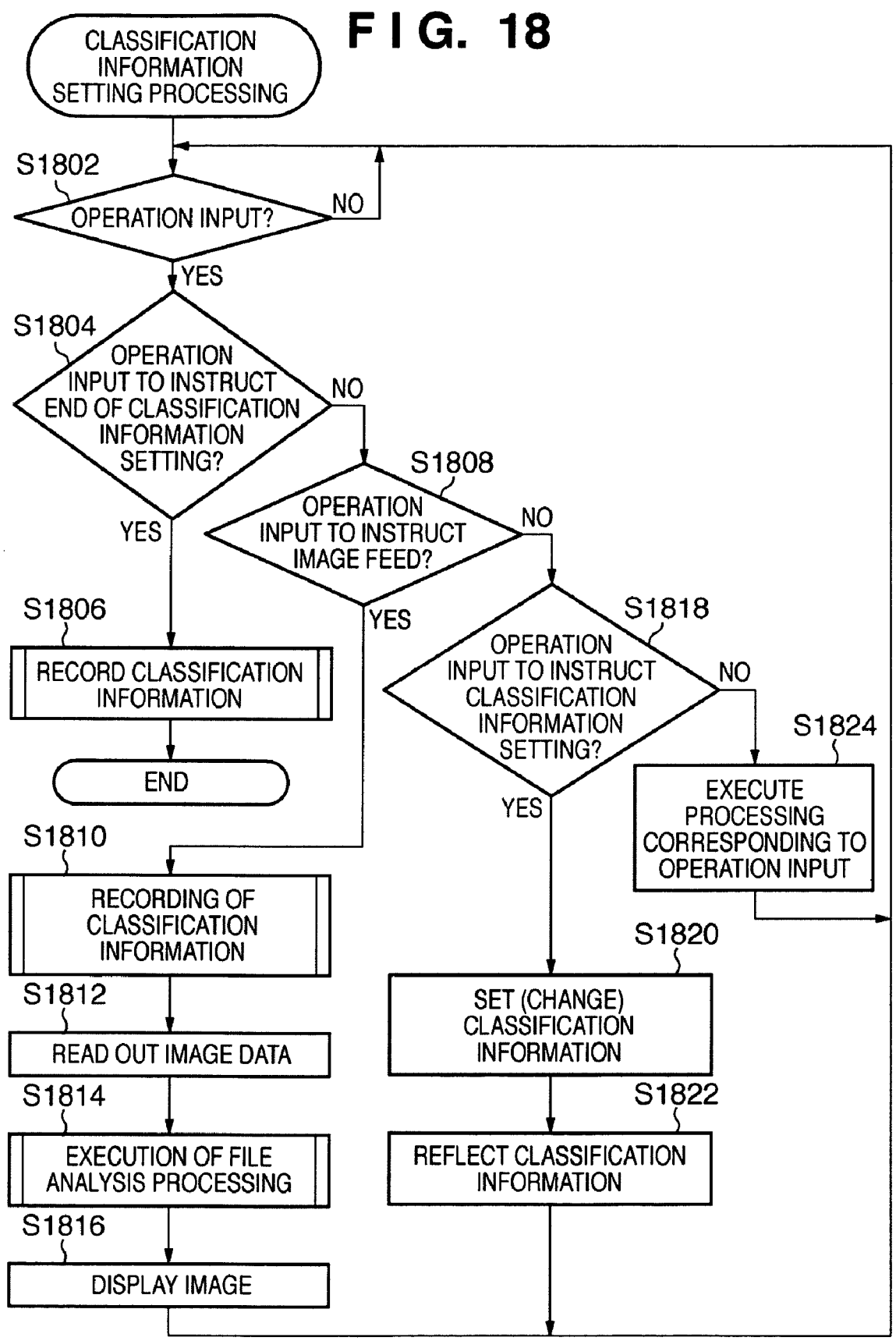
FIG. 18 is a flowchart for explaining classification information setting processing in step S1722 of FIG. 17A.

The classification information setting processing in step S1722 of FIG. 17A will be described with reference to FIG. 18. FIG. 18 is a flowchart for explaining the classification information setting processing in step S1722 of FIG. 17A.

In step S1802, the system control unit 132 determines whether an operation input is received. Operation inputs include, e.g., a user operation on the operation unit 142 and an event to notify a drop in the voltage of the power supply unit 148.

If it is determined that no operation input is received, step S1802 is repeated until an operation input is received.

If it is determined that an operation input is received, the system control unit 132 determines in step S1804 whether the operation input instructs an end of the classification information setting processing. Operation inputs to instruct an end of the classification information setting processing include an operation of ending the classification information setting processing on the operation unit 142, and an operation of powering off the image capturing apparatus 100 using the power switch 144. Operation inputs to instruct an end of the classification information setting processing also include an operation of changing the operation mode of the image capturing apparatus 100 from the playback mode to the still image capturing mode or the moving image capturing mode using the mode selection switch 138.

If it is determined that the operation input instructs an end of the classification information setting processing, the system control unit 132 records, in an image file in step S1806, the classification information of image data set (changed) in step S1820 (to be described later).

When the classification information of the image data is recorded in the image file, the classification information setting processing is ended.

If it is determined that the operation input does not instruct an end of classification information setting processing, the system control unit 132 determines in step S1808 whether the operation input instructs image feed.

If it is determined that the operation input instructs image feed, the system control unit 132 records, in an image file in step S1810, the classification information of image data set (changed) in step S1820 (to be described later).

In step S1812, the system control unit 132 reads out image data to be displayed next on the image display unit 122.

In step S1814, the system control unit 132 executes file analysis processing for the image data read out in step S1812 to acquire attribute information in the readout image data.

In step S1816, the system control unit 132 displays, on the image display unit 122, an image corresponding to the image data read out in step S1812, and the process returns to step S1802. At this time, the attribute information acquired by the file analysis processing in step S1814 is also displayed. If a failure in image data such as partial corruption of image data is detected by the file analysis processing in step S1814, it (error) is displayed.

The processing related to image feed in steps S1808 to S1816 is applicable to both single playback of displaying one image in one window of the image display unit 122 and multi-playback of displaying a plurality of images (for example, nine images) in one window of the image display unit 122. In multi-playback, however, the cursor sequentially moves in accordance with the image feed instruction, and the classification information of each image data is recorded in an image file as the cursor moves.

If it is determined that the operation input does not instruct image feed, the system control unit 132 determines in step S1818 whether the operation input instructs classification information setting.

If it is determined that the operation input instructs classification information setting, the system control unit 132 sets (changes), based on a user's operation, the classification information of the image data of the image displayed on the image display unit 122 in step S1820. In step S1820, the system control unit 132 stores the classification information set for the image data (or the changed classification information) in the memory 116, instead of recording it in an image file.

In step S1822, the system control unit 132 reflects the classification information set (changed) in step S1820 on the image data of the image displayed on the image display unit 122, and the process returns to step S1802.

If it is determined that the operation input does not instruct classification information setting, the system control unit 132 executes processing corresponding to the operation input in step S1824.

In this embodiment, classification information is recorded in an image file (step S1806) when switching the image data displayed on the image display unit 122 or ending the classification information setting processing. This reduces the number of times of access to the recording medium 200 and increases the operation speed.

[Selection Operation Processing]

Figure 19:
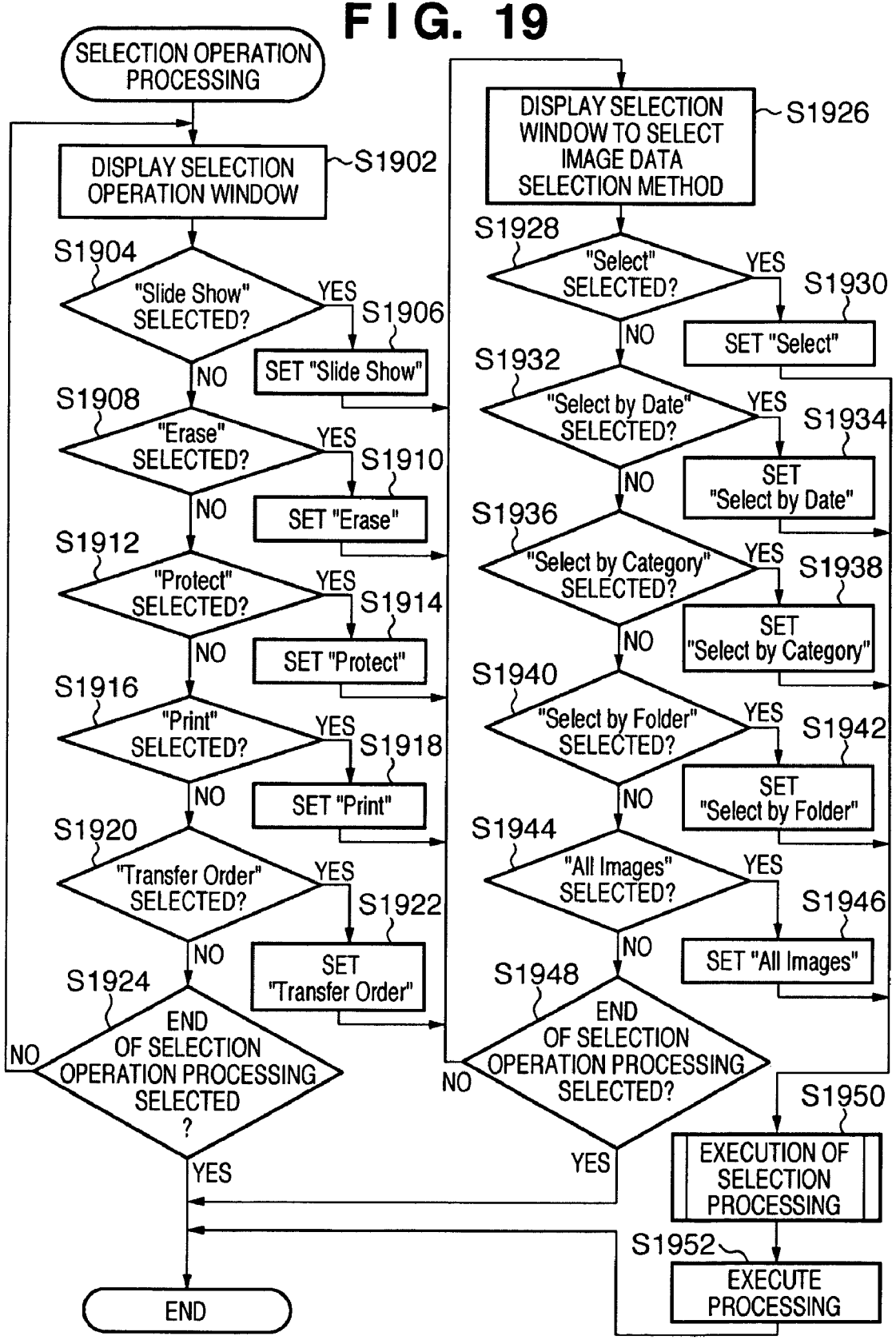
FIG. 19 is a flowchart for explaining selection operation processing in step S1742 of FIG. 17B.

The selection operation processing in step S1742 of FIG. 17B will be described with reference to FIG. 19. FIG. 19 is a flowchart for explaining the selection operation processing in step S1742 of FIG. 17B.

Figure 20:
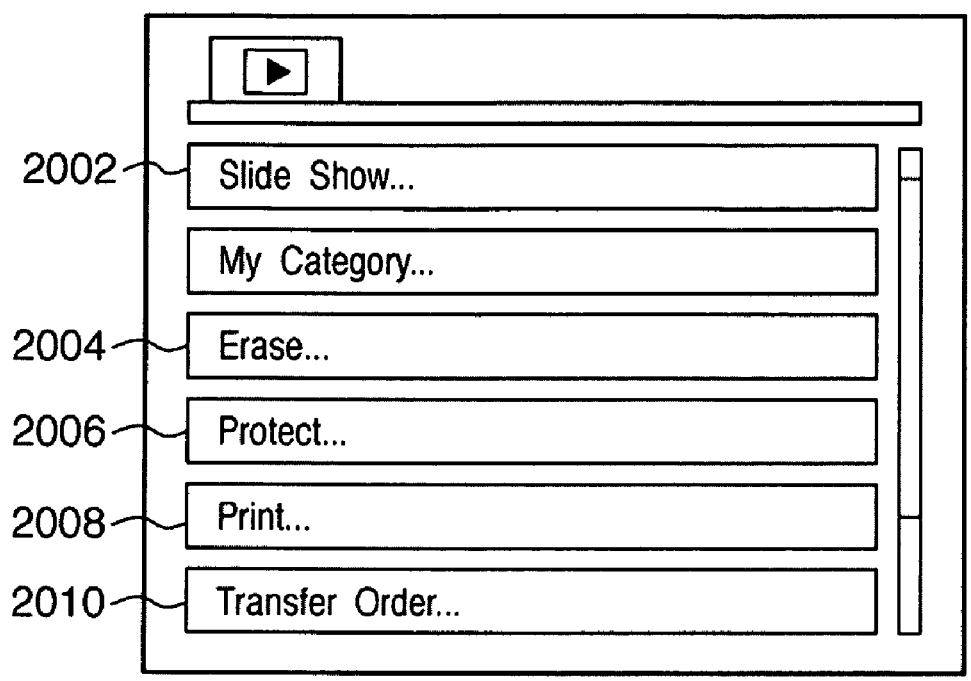
FIG. 20 is a view showing an example of a selection operation window displayed on an image display unit in step S1902 of FIG. 19.

In step S1902, the system control unit 132 displays a window for selection operation processing (selection operation window) on the image display unit 122. More specifically, the system control unit 132 displays a selection operation window shown in FIG. 20 on the image display unit 122. The user can select processing to be executed for image data (image file) by operating the selection operation window shown in FIG. 20. On the selection operation window shown in FIG. 20, the user can select "Slide Show" 2002, "Erase" 2004, and "Protect" 2006 as processing to be executed for image data. On the selection operation window shown in FIG. 20, the user can also select "Print" 2008 and "Transfer Order" 2010 as processing to be executed for image data. An end of the selection operation processing is also selectable, although not illustrated on the selection operation window shown in FIG. 20. FIG. 20 is a view showing an example of the selection operation window displayed on the image display unit 122 in step S1902.

Next, the system control unit 132 determines the processing to be executed for image data, which is selected on the selection operation window (FIG. 20) displayed in step S1902.

For example, in step S1904, the system control unit 132 determines whether "Slide Show" is selected as the processing to be executed for image data.

If it is determined that "Slide Show" is selected, the system control unit 132 sets "Slide Show" and stores it in the system memory 136 in step S1906 as the processing to be executed for image data.

If it is determined that "Slide Show" is not selected, the system control unit 132 determines in step S1908 whether "Erase" is selected as the processing to be executed for image data.

If it is determined that "Erase" is selected, the system control unit 132 sets "Erase" and stores it in the system memory 136 in step S1910 as the processing to be executed for image data.

If it is determined that "Erase" is not selected, the system control unit 132 determines in step S1912 whether "Protect" is selected as the processing to be executed for image data.

If it is determined that "Protect" is selected, the system control unit 132 sets "Protect" and stores it in the system memory 136 in step S1914 as the processing to be executed for image data.

If it is determined that "Protect" is not selected, the system control unit 132 determines in step S1916 whether "Print" is selected as the processing to be executed for image data.

If it is determined that "Print" is selected, the system control unit 132 sets "Print" and stores it in the system memory 136 in step S1918 as the processing to be executed for image data.

If it is determined that "Print" is not selected, the system control unit 132 determines in step S1920 whether "Transfer Order" is selected as the processing to be executed for image data.

If it is determined that "Transfer Order" is selected, the system control unit 132 sets "Transfer Order" and stores it in the system memory 136 in step S1922 as the processing to be executed for image data.

If it is determined that "Transfer Order" is not selected, the system control unit 132 determines in step S1924 whether an end of the selection operation processing is selected.

If it is determined that an end of the selection operation processing is selected, the selection operation processing is ended.

If it is determined that an end of the selection operation processing is not selected, the process returns to step S1904.

Figure 21:
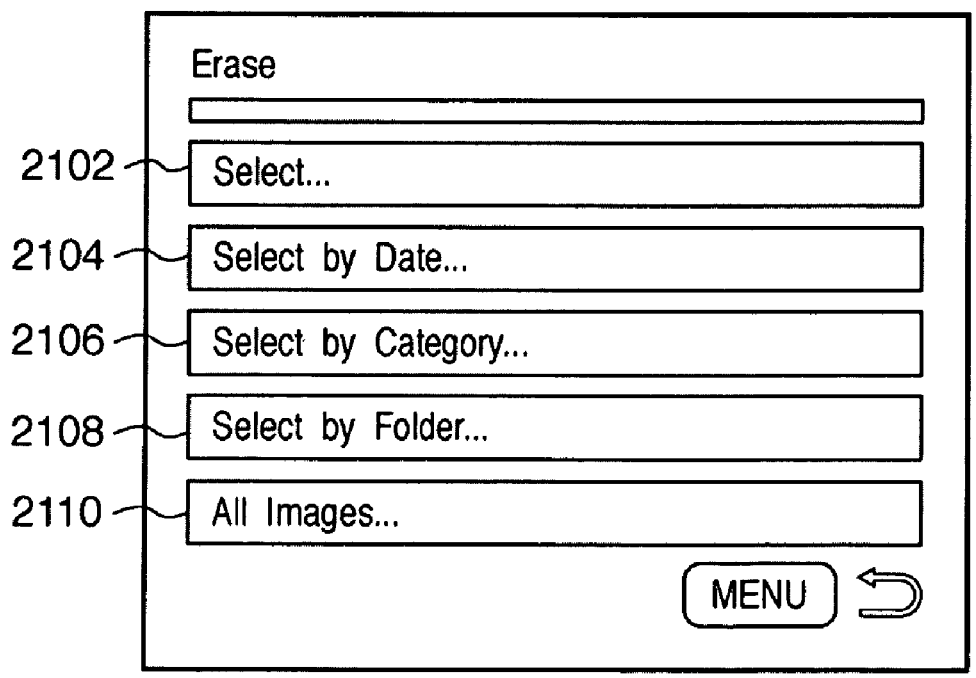
FIG. 21 is a view showing an example of a selection window displayed on the image display unit in step S1926 of FIG. 19.

When the processing to be executed for image data is selected and set (steps S1904 to S1922), the system control unit 132 displays, on the image display unit 122, a selection window to select a selection method of image data (image file) in step S1926. More specifically, the system control unit 132 displays a selection window shown in FIG. 21 on the image display unit 122. The user can select a method of selecting image data as a processing execution target by operating the selection window shown in FIG. 21. On the selection window shown in FIG. 21, the user can select "Select" 2102, "Select by Date" 2104, and "Select by Category" 2106 as the selection method. On the selection window shown in FIG. 21, the user can also select "Select by Folder" 2108 and "All images" 2110 as the selection method. "Select" 2102 is a selection method of selecting one or a plurality of image data from all image data. "Select by Date" 2104 is a selection method of selecting all image data corresponding to a specific date. "Select by Category" 2106 is a selection method of selecting all image data having specific classification information. "Select by Folder" 2108 is a selection method of selecting all images belonging to a specific folder. "All images" 2110 is a selection method of selecting all image data. An end of the selection operation processing is also selectable, although not illustrated on the selection window shown in FIG. 21. FIG. 21 is a view showing an example of the selection window displayed on the image display unit 122 in step S1926.

Next, the system control unit 132 determines the selection method selected on the selection window (FIG. 21) displayed in step S1926.

For example, in step S1928, the system control unit 132 determines whether "Select" is selected as the selection method.

If it is determined that "Select" is selected, the system control unit 132 sets "Select" and stores it in the system memory 136 in step S1930 as the selection method.

If it is determined that "Select" is not selected, the system control unit 132 determines in step S1932 whether "Select by Date" is selected as the selection method.

If it is determined that "Select by Date" is selected, the system control unit 132 sets "Select by Date" and stores it in the system memory 136 in step S1934 as the selection method.

If it is determined that "Select by Date" is not selected, the system control unit 132 determines in step S1936 whether "Select by Category" is selected as the selection method.

If it is determined that "Select by Category" is selected, the system control unit 132 sets "Select by Category" and stores it in the system memory 136 in step S1938 as the selection method.

If it is determined that "Select by Category" is not selected, the system control unit 132 determines in step S1940 whether "Select by Folder" is selected as the selection method.

If it is determined that "Select by Folder" is selected, the system control unit 132 sets "Select by Folder" and stores it in the system memory 136 in step S1942 as the selection method.

If it is determined that "Select by Folder" is not selected, the system control unit 132 determines in step S1944 whether "All images" is selected as the selection method.

If it is determined that "All images" is selected, the system control unit 132 sets "All images" and stores it in the system memory 136 in step S1946 as the selection method.

If it is determined that "All images" is not selected, the system control unit 132 determines in step S1948 whether an end of the selection operation processing is selected.

If it is determined that an end of the selection operation processing is selected, the selection operation processing is ended.

If it is determined that an end of the selection operation processing is not selected, the process returns to step S1926.

When the image data selection method is selected and set (steps S1928 to S1946), the system control unit 132 executes selection processing in step S1950. The selection processing in step S1950 will be described later in detail.

In step S1952, the system control unit 132 executes processing for the group of image data (image file group) selected by the selection processing in step S1950, and ends the selection operation processing.

[Selection Processing]

Figure 22A:
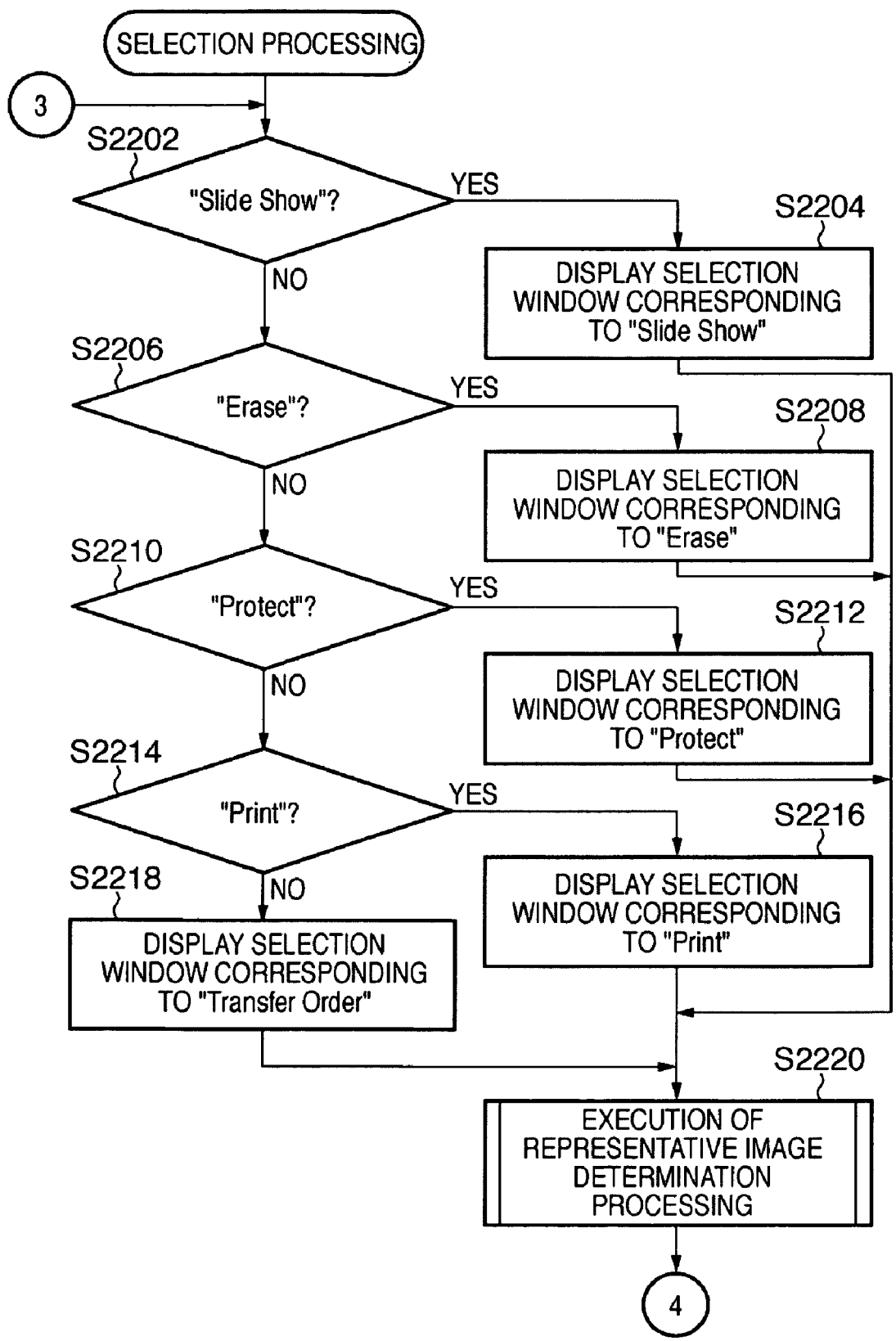
FIGS. 22A and 22B are flowcharts for explaining selection processing in step S1950 of FIG. 19.
Figure 22B:
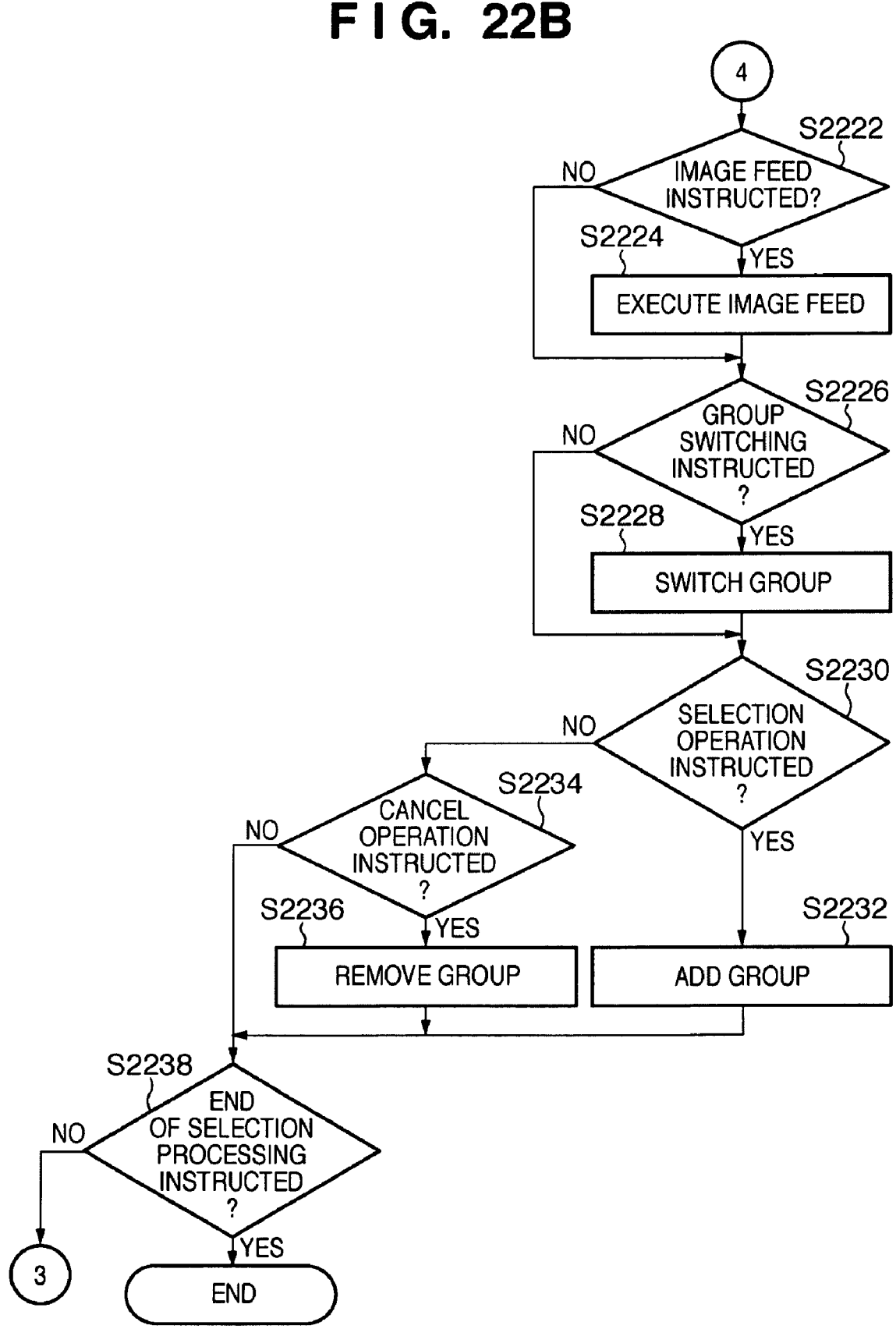

The selection processing in step S1950 of FIG. 19 will be described with reference to FIGS. 22A and 22B. FIG. 22A and 22B are flowcharts for explaining the selection processing in step S1950 of FIG. 19.

First, the system control unit 132 determines the processing to be executed for image data, which is stored in the system memory 136.

For example, in step S2202, the system control unit 132 determines whether the processing to be executed for image data is "Slide Show".

If it is determined that the processing to be executed for image data is "Slide Show", the system control unit 132 displays a selection window corresponding to "Slide Show" on the image display unit 122 in step S2204.

If it is determined that the processing to be executed for image data is not "Slide Show", the system control unit 132 determines in step S2206 whether the processing to be executed for image data is "Erase".

If it is determined that the processing to be executed for image data is "Erase", the system control unit 132 displays a selection window corresponding to "Erase" on the image display unit 122 in step S2208.

If it is determined that the processing to be executed for image data is not "Erase", the system control unit 132 determines in step S2210 whether the processing to be executed for image data is "Protect".

If it is determined that the processing to be executed for image data is "Protect", the system control unit 132 displays a selection window corresponding to "Protect" on the image display unit 122 in step S2212.

If it is determined that the processing to be executed for image data is not "Protect", the system control unit 132 determines in step S2214 whether the processing to be executed for image data is "Print".

If it is determined that the processing to be executed for image data is "Print", the system control unit 132 displays a selection window corresponding to "Print" on the image display unit 122 in step S2216.

If it is determined that the processing to be executed for image data is not "Print", the system control unit 132 determines that the processing to be executed for image data is "Transfer Order" and displays a selection window corresponding to "Transfer Order" on the image display unit 122 in step S2218.

In step S2220, the system control unit 132 executes representative image determination processing to determine and display the representative image of each group formed by classifying image data in accordance with the selection method set in steps S1928 to S1946 of FIG. 19.

In step S2222, the system control unit 132 determines whether image feed is instructed.

If it is determined that that image feed is instructed, the system control unit 132 executes image feed in step S2224. Note that the system control unit 132 executes image feed in the selected group (image file group), as will be described later.

If it is determined that image feed is not instructed, the process advances to step S2226.

In step S2226, the system control unit 132 determines whether switching of the process target group (image file group) is instructed.

If it is determined that switching of the process target group is instructed, the system control unit 132 switches the process target group (image file group) in step S2228.

If it is determined that switching of the process target group is not instructed, the process advances to step S2230.

In step S2230, the system control unit 132 determines whether a selection operation for a group (image file group) is instructed.

If it is determined that that a selection operation is instructed, the system control unit 132 adds, to the process target group, the group (image file group) as the target of the selection operation instruction in step S2232.

If it is determined that a selection operation is not instructed, the system control unit 132 determines in step S2234 whether a cancel operation for the process target group (image file group) is instructed.

If it is determined that a cancel operation is instructed, the system control unit 132 removes, from the process target group, the group (image file group) as the target of the cancel operation instruction in step S2236.

If it is determined that a cancel operation is not instructed, the system control unit 132 determines in step S2238 whether an end of the selection processing is instructed.

If it is determined that an end of the selection processing is instructed, the selection processing is ended.

If it is determined that an end of the selection processing is not instructed, the process returns to step S2202.

As described above, in the selection processing, a plurality of groups (image file groups) can be selected for each processing to be executed for image data.

Figures 23, 24:
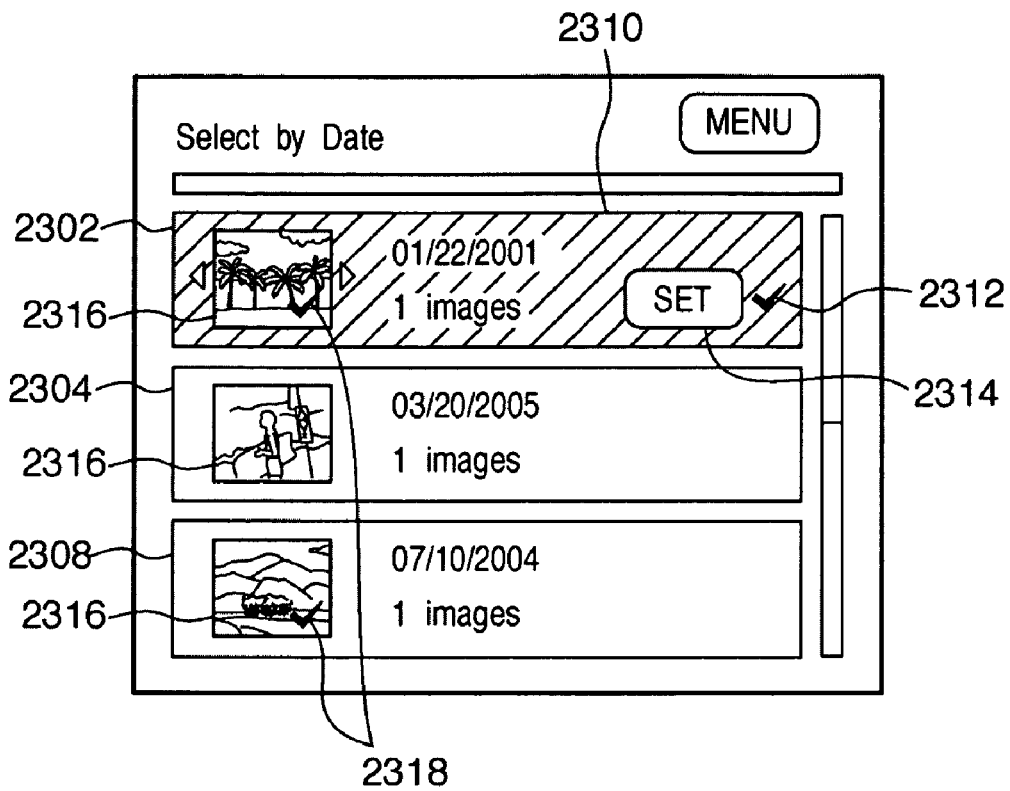
FIG. 23 is a view showing an example of a selection window displayed on the image display unit in step S2218 of FIG. 22A.
FIG. 24 is a view showing image data as the image feed target of each processing to be executed for image data.

FIG. 23 is a view showing an example of a selection window displayed on the image display unit 122 in step S2218. FIG. 23 shows a display screen when "Select by Date" is selected as the image data selection method. Referring to FIG. 23, reference numerals 2302, 2304, and 2308 denote a group (image file group) of Jan. 22, 2001, a group (image file group) of Mar. 20, 2005, and a group (image file group) of Jul. 10, 2004, respectively. Reference numeral 2310 indicates the number of image data valid as a process target included in each group (image file group). A cursor 2312 indicates a selected group (image file group). A selection instruction button 2314 moves together with the cursor 2312. An image data display portion 2316 displays the image data of each group (image file group). On the selection window shown in FIG. 23, the user can select a plurality of image data of each date.

In the image data display portion 2316 of the group (the group 2302 of Jan. 22, 2001) on which the cursor 2312 is located, image feed can be done in that group.

In this embodiment, for example, the user moves the cursor 2312 up and down by using the up and down buttons included in the operation unit 142, thereby selecting, as the process target, the group on which the cursor 2312 is located (steps S2226 and S2228). In other words, it is possible to switch the process target group by operating the up and down buttons. In the group on which the cursor 2312 is located, image feed can be executed using the left and right buttons included in the operation unit 142 (steps S2222 and S2224). In other words, it is possible to switch the image data displayed in the image data display portion 2316 by operating the left and right buttons. This allows the user to select the process target group while easily confirming the contents of each group (image file group) on the selection window. The image data as the image feed target will be described later in detail.

The user can select the process target group (image file group) by pressing the selection instruction button 2314 on an unselected group (image file group) on which the cursor 2312 is located (steps S2230 and S2232). On the other hand, when the user moves the cursor 2312 onto the group (image file group) selected as the process target and presses the selection instruction button 2314, the selected group can be removed from the process target group (steps S2234 and S2236). A check mark 2318 representing a selected state is displayed on each selected group (image file group). As described above, the user can select a plurality of groups (image file group), and the selected groups are processed together in step S1952.

In this embodiment, the display screen when "Select by Date" is selected as the image data selection method has been described. A similar selection window is displayed when another selection method (e.g., "Select by Category" or "Select by Folder") is selected, and a detailed description thereof will be omitted.

FIG. 24 is a view showing image data (i.e., image data valid as an image feed process target) as the image feed target of each processing to be executed for image data. The number 2310 of image data valid as a process target is the number of image data selectable as a process target in accordance with the view of FIG. 24.

Referring to FIG. 24, when the processing to be executed for image data is "Erase", image data having a protect attribute are excluded from the process target. For this reason, the number 2310 of image data valid as a process target does not include the number of image data having a protect attribute. In other words, the number of image data without a protect attribute is displayed as the number 2310 of image data valid as a process target.

When the number of image data valid as a process target in a group (image file group) is displayed on the selection window shown in FIG. 23 in the above-described way, the user can grasp the number of image data valid as a process target and properly select image data. At this time, the number of image data which are included in a group (image file group) but are not valid as a process target or the total number of image data included in a group may be displayed. The user may be notified that image data which are not valid as a process target are included in a group (image file group). This allows the user to more properly select a group (image file group).

In image feed in a group (image file group), only image data valid as a process target is displayed in the image data display portion 2316. Referring to FIG. 24, when the processing to be executed for image data is "Slide Show" or "Protect", the process target includes all image data. For this reason, the process target includes all image data in a group (image file group) without any restriction of selection disable conditions. When the processing to be executed for image data is "Erase", image data having a protect attribute are excluded from the process target. For this reason, the image feed process target includes only image data without a protect attribute.

When the processing to be executed for image data is "Erase", and all image data included in the group (image file group) on which the cursor 2312 is located have a protect attribute, no image data can be the process target. In this case, the user is preferably notified that the group (image file group) cannot be selected. The notification to the user can be done by, for example, deactivating the selection instruction button 2314.

When the processing to be executed for image data is "Print", the process target includes only still image data. For this reason, the image feed process target includes only still image data in the group (image file group). If all image data included in the group (image file group) on which the cursor 2312 is located are data (e.g., moving image data or voice data) except still image data, no image data can be the process target. Hence, the user is notified that the group cannot be selected, as described above.

When the processing to be executed for image data is "Transfer Order", the process target includes only transmitted image data. If all image data included in the group (image file group) on which the cursor 2312 is located are transmitted image data, no image data can be the process target. Hence, the user is notified that the group cannot be selected, as described above.

If no content exists at all, no process target is selectable in any processing, and the selection instruction button 2314 is deactivated.

As described above, in this embodiment, after processing to be executed for image data is selected, image data as a process target is selected. In other words, the number of image data valid as a process target is displayed in accordance with processing to be executed for image data. Then, the selection enable/disable state of each group (image file group) and image data as an image feed target are determined. This allows the user to properly select image data as a process target without selecting a group (image file group) containing no process target or displaying image data that is not a process target.

[Representative Image Determination Processing]

In this embodiment, assume that images (image data) as shown in FIG. 25 are recorded on the recording medium 200. Referring to FIG. 25, an image 2502 has a file name "IMG_0001.JPG" and classification attributes A, B, and C as attribute information. An image 2504 has a file name "IMG_0002.JPG" and the classification attributes B and C as attribute information. An image 2506 has a file name "IMG_0003.JPG" and the classification attribute B as attribute information. FIG. 25 is a view showing examples of images recorded on the recording medium 200.

FIG. 26 is a view showing a result obtained by putting the images 2502 to 2506 shown in FIG. 25 into groups based on the classification attributes. FIG. 27 is a view showing representative images determined using a conventional technique in the respective groups shown in FIG. 26. Referring to FIG. 27, since the conventional technique determines the first image data of the respective groups as representative images, the representative image overlaps between the groups. Hence, the advantage of a capability of easily searching for a group or an image included in a group by referring to a representative image is impaired.

Figure 28:
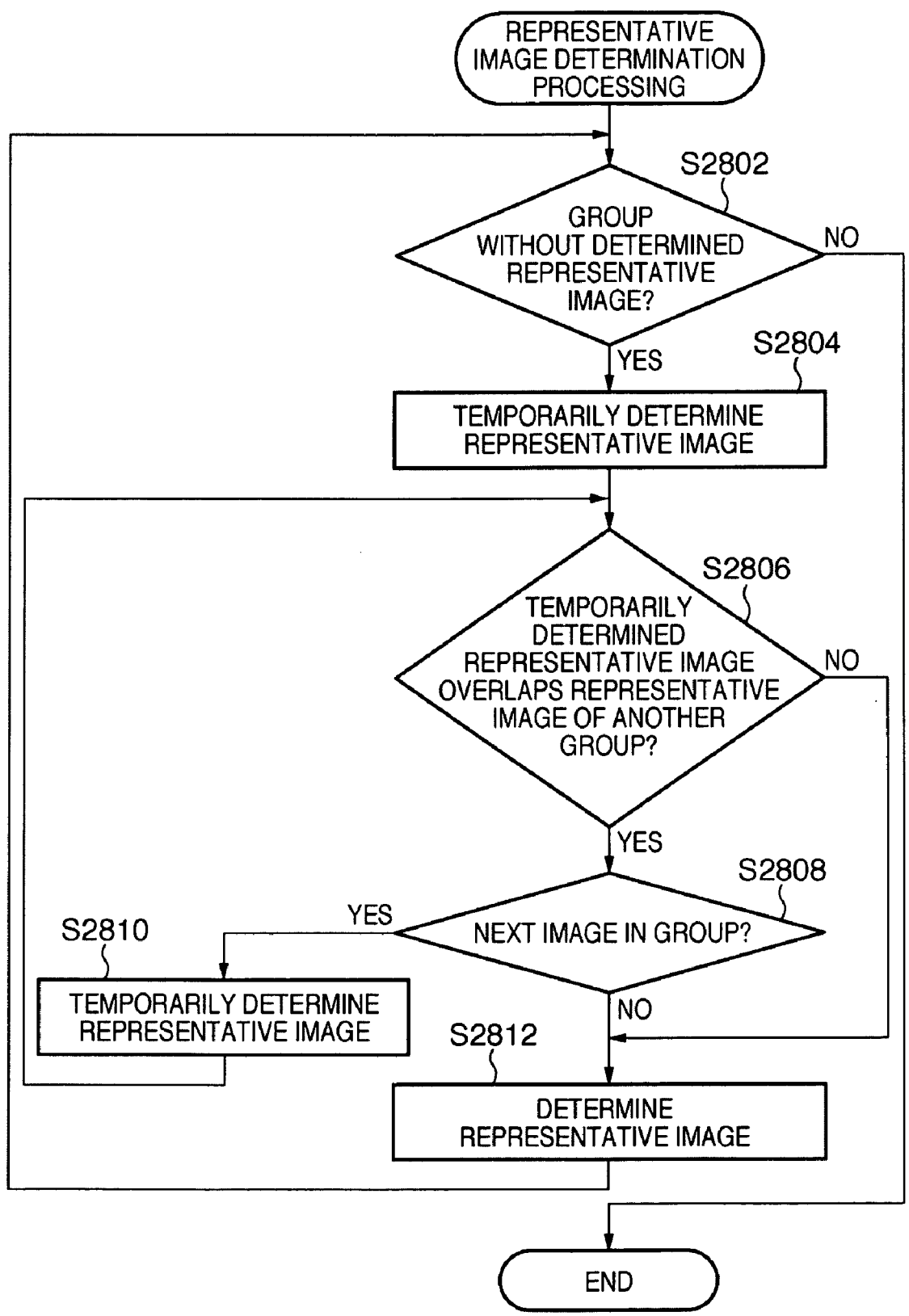
FIG. 28 is a flowchart for explaining an example of representative image determination processing in step S2220 of FIG. 22A.

The representative image determination processing in step S2220 of FIG. 22A will be described with reference to FIG. 28. FIG. 28 is a flowchart for explaining an example of the representative image determination processing in step S2220 of FIG. 22A.

In step S2802, the system control unit 132 determines whether a group without any determined representative image exists.

If it is determined that a group without any determined representative image does not exist, the representative image determination processing is ended.

If it is determined that a group without any determined representative image exists, the system control unit 132 temporarily determines, as the representative image, the first image of the group without any representative image in step S2804.

In step S2806, the system control unit 132 determines whether the representative image temporarily determined in step S2804 or S2810 to be described later overlaps that of another group. In step S2806, the temporarily determined representative image may be compared with not the representative images of all the remaining groups but only the representative images of groups displayed on the image display unit 122 or the representative image of the immediately preceding group to speed up the processing. Assume that representative images should be determined in the order of the group of classification attribute A, the group of classification attribute B, and the group of classification attribute C shown in FIG. 26. In this case, when determining the representative image of the group of classification attribute B, it is compared with the representative image of the group of classification attribute A.

If it is determined that the representative image temporarily determined in step S2804 does not overlap that of another group, the process advances to step S2812.

If it is determined that the representative image temporarily determined in step S2804 overlaps that of another group, the system control unit 132 determines in step S2808 whether the next image exists in the group.

If it is determined that the next image exists in the group, the system control unit 132 temporarily determines the next image as the representative image in step S2810, and the process returns to step S2806.

If it is determined that the next image does not exist in the group, the process advances to step S2812.

In step S2812, the system control unit 132 determines the representative image temporarily determined in step S2804 or S2810 as the representative image of the group, and the process returns to step S2802.

Figure 30:
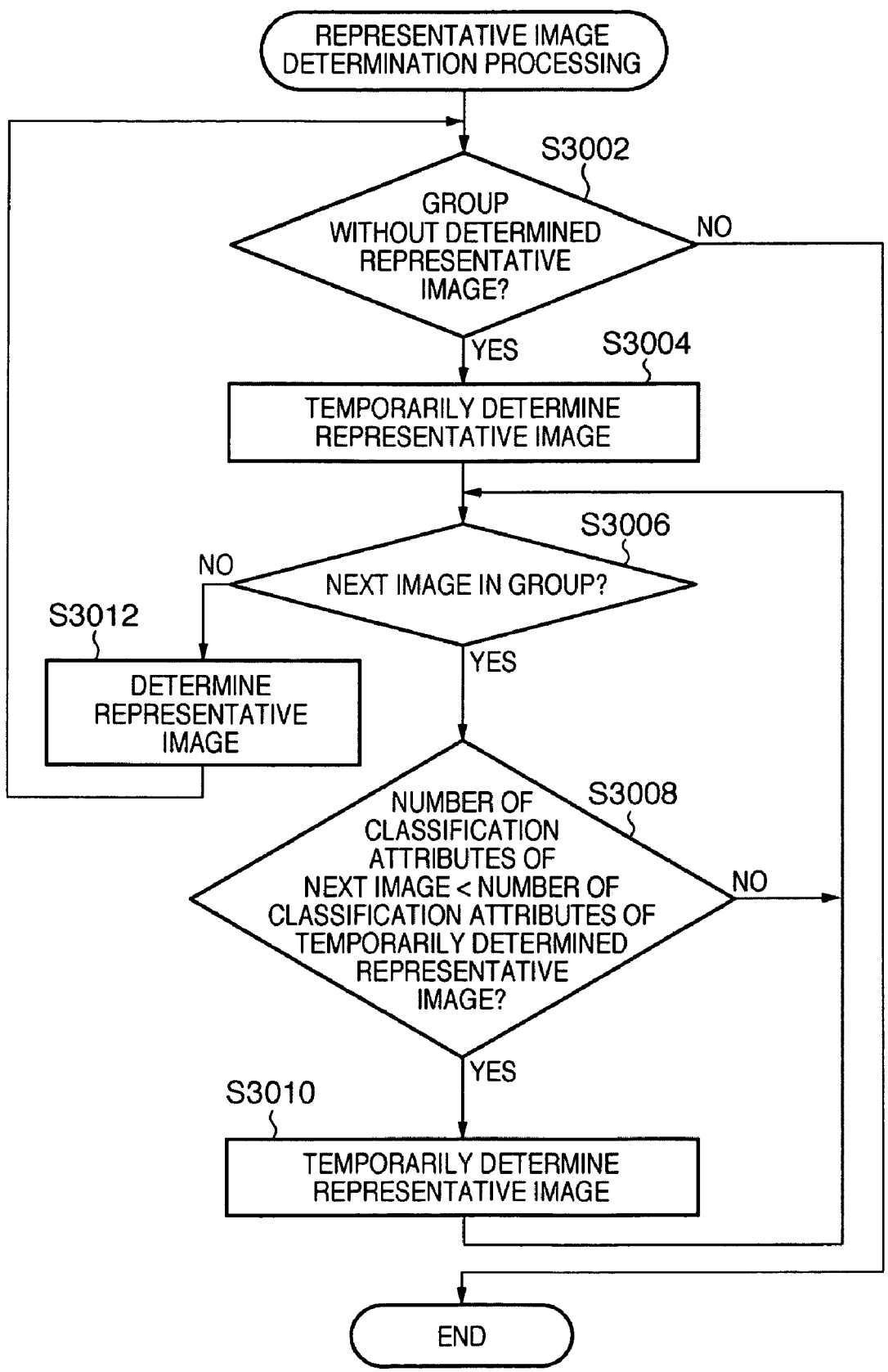
FIG. 30 is a flowchart for explaining another example of representative image determination processing in step S2220 of FIG. 22A.

FIG. 29 is a view showing representative images determined by executing the representative image determination processing shown in FIG. 28 in the groups shown in FIG. 26. As described above, in this embodiment, when determining the representative image of each group, it is determined whether the representative image of a group is identical to that of another group. Then, representative images which do not overlap between the groups (i.e., representative images that are different between the groups) are determined based on the determination result. The representative image determination processing of this embodiment can thus prevent impairment of the advantage of the capability of easily searching for a group or an image included in a group by referring to a representative image. Hence, according to this embodiment, convenience for the user can be improved by displaying an optimum representative image in each group including a plurality of images. However, in the example shown in FIG. 29, the images having the attribute C do not include an image different from the already determined representative images of attributes A and B. For this reason, the representative image of attribute C inevitably overlaps that of attribute B, though it is controlled not to overlap the representative image of classification A. The representative image determination processing in step S2220 of FIG. 22A may be that shown in FIG. 30. FIG. 30 is a flowchart for explaining another example of the representative image determination processing in step S2220 of FIG. 22A.

In step S3002, the system control unit 132 determines whether a group without any determined representative image exists.

If it is determined that a group without any determined representative image does not exist, the representative image determination processing is ended.

If it is determined that a group without any determined representative image exists, the system control unit 132 temporarily determines, as the representative image, the first image of the group without any representative image in step S3004.

In step S3006, the system control unit 132 determines whether the next image exists in the group.

If it is determined that the next image exists in the group, the system control unit 132 determines in step S3008 whether the number of classification attributes of the next image is smaller than the number of classification attributes of the representative image temporarily determined in step S3004 or S3010.

If it is determined that the number of classification attributes of the next image is smaller than the number of classification attributes of the temporarily determined representative image, the system control unit 132 temporarily determines the next image as the representative image in step S3010, and the process returns to step S3006. If it is determined that the number of classification attributes of the next image is equal to or larger than the number of classification attributes of the temporarily determined representative image, the process returns to step S3006.

If it is determined that the next image does not exist in the group, the system control unit 132 determines the representative image temporarily determined in step S3004 or S3010 as the representative image of the group in step S3012, and the process returns to step S3002.

FIG. 31 is a view showing representative images determined by executing the representative image determination processing shown in FIG. 30 in the groups shown in FIG. 26. As described above, in this embodiment, when determining the representative image of each group, the number of classification attributes of each of the images in a group is determined. Then, an image having the minimum number of classification attributes is determined as the representative image based on the determination result. The representative image determination processing of this embodiment can thus prevent impairment of the advantage of the capability of easily searching for a group or an image included in a group by referring to a representative image. Hence, according to this embodiment, convenience for the user can be improved by displaying an optimum representative image in each group including a plurality of images.

The representative images may be determined by combining the representative image determination processing shown in FIG. 28 and that shown in FIG. 30. More specifically, when determining a representative image, the representative image determination processing shown in FIG. 30 is executed to acquire images having the minimum number of classification attributes. Out of the images, an image which is not the representative image of any other group (i.e., an image which does not overlap the representative images of the remaining groups) is determined as the representative image.

As shown in FIG. 32, a plurality of representative images may be determined for each of the groups shown in FIG. 26. FIG. 32 is a view showing a case in which representative images determined by executing the representative image determination processing shown in FIG. 30 and the first images of the respective groups are determined as representative images.

Note that if the image classification method can specify a unique group corresponding to an image (e.g., the image capturing date and time), representative image selection considering other groups, as described above, need not be performed.

[File Management Processing]

Figure 33:
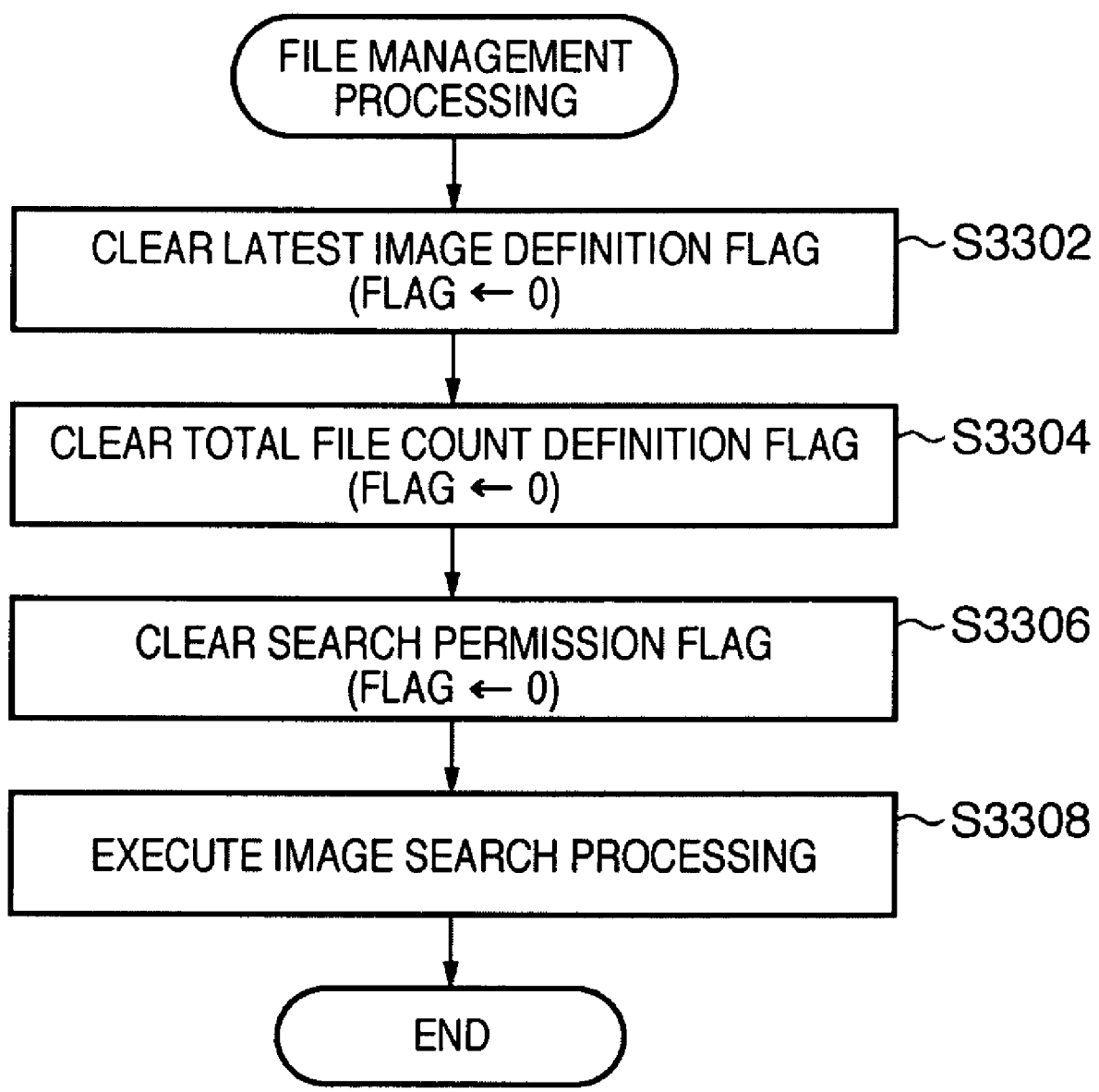
FIG. 33 is a flowchart for explaining file management processing in step S304 of FIG. 3.

The file management processing in step S304 of FIG. 3 will be described with reference to FIG. 33. FIG. 33 is a flowchart for explaining the file management processing in step S304 of FIG. 3.

In step S3302, the system control unit 132 clears a latest image definition flag stored in the system memory 136. More specifically, the system control unit 132 sets the latest image definition flag to 0.

In step S3304, the system control unit 132 clears a total file count definition flag stored in the system memory 136. More specifically, the system control unit 132 sets the total file count definition flag to 0.

In step S3306, the system control unit 132 clears a search permission flag stored in the system memory 136. More specifically, the system control unit 132 sets the search permission flag to 0.

In step S3308, the system control unit 132 executes image search processing, and ends the file management processing.

[Image Search Processing]

Figure 34B:
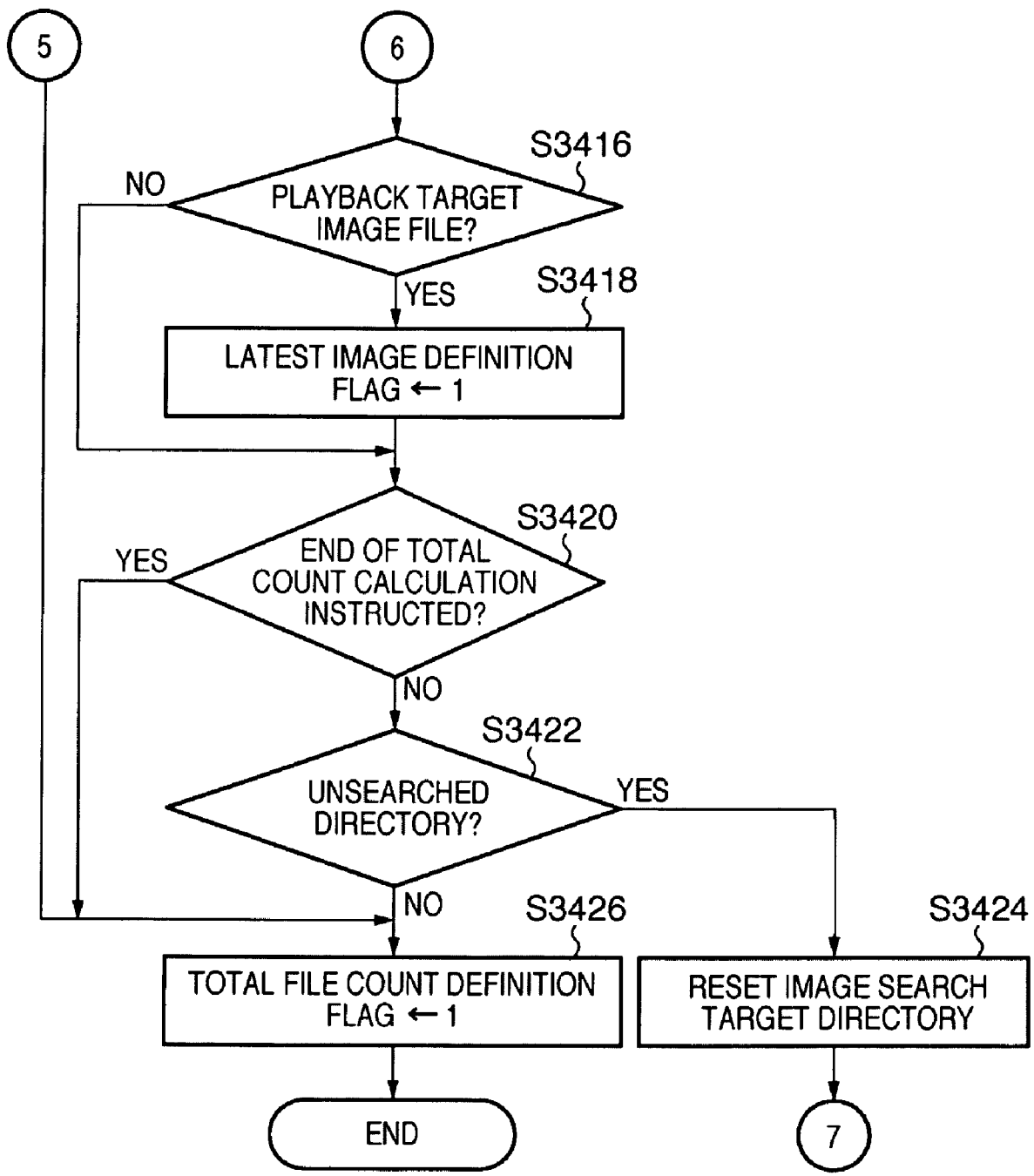

The image search processing in step S3308 of FIG. 33 will be described with reference to FIGS. 34A and 34B. FIGS. 34A and 34B are flowcharts for explaining the image search processing in step S3308 of FIG. 33.

In step S3402, the system control unit 132 determines whether a start of the image search processing is instructed.

If it is determined that a start of the image search processing is not instructed, step S3402 is repeated until a start of the image search processing is instructed.

If it is determined that a start of the image search processing is instructed, the system control unit 132 generates a playback target directory list in step S3404. For example, to perform playback complying with the DCF standard, the system control unit 132 searches for DCF directories by analyzing the directory entries of a DCF root directory and adds them to the playback target directory list.

In step S3406, the system control unit 132 determines whether a playback target directory exists.

If it is determined that no playback target directory exists (i.e., if there is neither directory nor file processable by the image capturing apparatus 100), the system control unit 132 sets the total file count to 0 in step S3408, and the process advances to step S3426.

If it is determined that a playback target directory exists, the system control unit 132 initializes an image search target directory in step S3410. For example, to perform playback complying with the DCF standard, the system control unit 132 sets a DCF directory having the maximum number as the image search target directory by the initialization.

In step S3412, the system control unit 132 calculates the total number of images in the directory set as the image search target by analyzing the directory entry, and adds the total number of images in the directory to the total image count recorded on the recording medium 200.

In step S3414, the system control unit 132 acquires file information described in the directory entry of the DCF root directory. More specifically, the system control unit 132 acquires the minimum file number, maximum file number, sum of file numbers, sum of time stamps, sum of file sizes, total number of files, and the like. The file information is stored in the system memory 136 as directory entry information.

In step S3416, the system control unit 132 determines whether a playback target image file (i.e., a file processable by the image capturing apparatus 100) exists.

If it is determined that no playback target image file exists, the process advances to step S3420.

If it is determined that a playback target image file exists, the system control unit 132 determines the latest image and sets the latest image definition flag to 1 in step S3418, and the process advances to step S3420.

In step S3420, the system control unit 132 determines whether an end of total image data count calculation is instructed.

If it is determined that an end of total image data count calculation is instructed, the process advances to step S3426.

If it is determined that an end of total image data count calculation is not instructed, the system control unit 132 determines in step S3422 whether an unsearched (unprocessed) directory exists.

If it is determined that an unsearched directory exists, in step S3424, the system control unit 132 sets the unsearched directory as the image search target directory (image search target directory resetting), and the process returns to step S3412. In this way, the processing in steps S2314 to S3418 is executed for all directories which exist in the playback target directory list generated in step S3404.

If it is determined that no unsearched directory exists, the process advances to step S3426.

In step S3426, the system control unit 132 outputs a latest image definition notification of, calculates the total image count, sets the total file count definition flag to 1, and ends the image search processing.

If a playback target directory exists, and no playback target image file exists in the directory, the system control unit 132 sets the total file count definition flag with the total image count "0", and ends the image search processing.

[Search List Generation Processing]

Figure 35A:
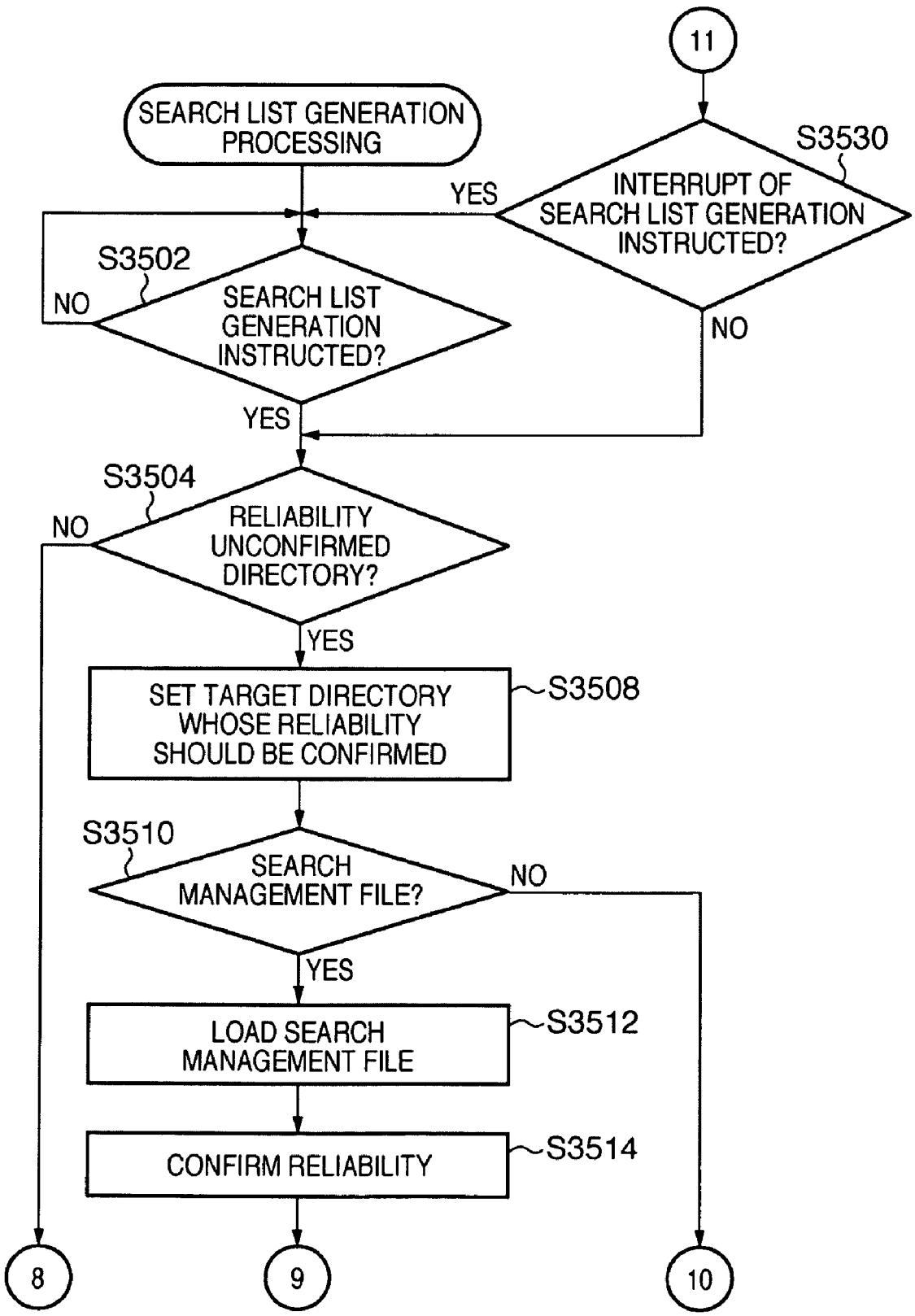
FIGS. 35A and 35B are flowcharts for explaining search list generation processing in step S1516 of FIG. 15.
Figure 35B:
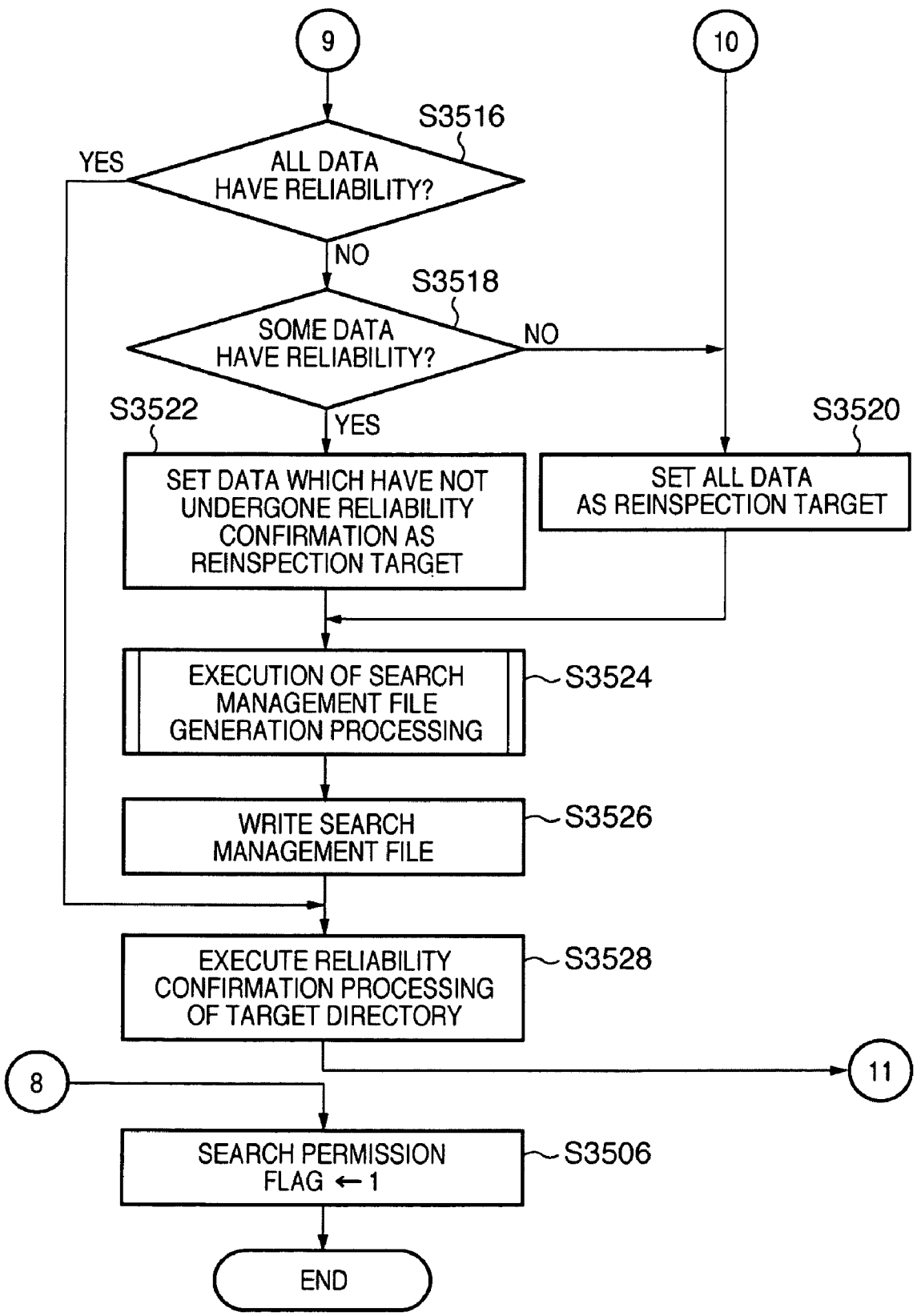

The search list generation (search list generation processing) in step S1516 of FIG. 15 will be described with reference to FIGS. 35A and 35B. FIGS. 35A and 35B are flowcharts for explaining the search list generation processing in step S1516 of FIG. 15.

In step S3502, the system control unit 132 determines whether a search list generation instruction is received.

If it is determined that no search list generation instruction is received, step S3502 is repeated until a search list generation instruction is received.

If it is determined that a search list generation instruction is received, the system control unit 132 determines in step S3504 whether a reliability unconfirmed directory exists.

If it is determined that no reliability unconfirmed directory exists, the system control unit 132 sets 1 to the search permission flag in step S3506, and ends the search list generation processing.

If it is determined that a reliability unconfirmed directory exists, the system control unit 132 sets the reliability unconfirmed directory as the target directory whose reliability should be confirmed in step S3508.

In step S3510, the system control unit 132 determines whether a search management file corresponding to the target directory set in step S3508 exists on the recording medium 200.

If it is determined that no search management file exists, the process advances to step S3520.

If it is determined that a search management file exists, the system control unit 132 loads the search management file corresponding to the target directory set in step S3508 to the system memory 136 in step S3512.

In step S3514, the system control unit 132 confirms the reliability of the search management file loaded in step S3512. The search management file reliability is confirmed by, for example, collating the directory entry information stored in step S3414 of the above-described image search processing with reliability confirmation information described in the search management file.

In step S3516, the system control unit 132 determines whether all data are reliable.

If it is determined that all data are reliable, the system control unit 132 executes reliability confirmation processing of the target directory in step S3518, and the process advances to step S3530.

In step S3530, the system control unit 132 determines whether an interrupt of the search list generation is instructed.

If it is determined that an interrupt of the search list generation is instructed, the process returns to step S3502. Step S3502 is repeated until search list generation is instructed.

If it is determined that an interrupt of the search list generation is not instructed, the process returns to step S3504 to continue the processing until no reliability unconfirmed directory is detected.

If it is determined that not all data are reliable, the system control unit 132 determines whether some data are reliable in step S3518.

If it is determined that none of the data is reliable, the process advances to step S3520.

In step S3520, the system control unit 132 sets all data in the directory as a reinspection target, and the process advances to step S3524.

If it is determined that some data are reliable, the system control unit 132 sets data which have not yet undergone reliability confirmation as a reinspection target in step S3522, and the process advances to step S3524.

In step S3524, the system control unit 132 executes search management file generation processing for the file set as the reinspection target in step S3520 or S3522.

In step S3526, the system control unit 132 writes the search management file generated in step S3524 in the recording medium 200, and the process advances to step S3528. For example, a directory (XXXMSC) to store the search management file is generated, and generated search management files (M100.CTG and M101.CTG) are stored in the directory, as shown in FIG. 9. In this embodiment, a search management file is generated and stored in correspondence with each directory, as shown in FIG. 9. For example, "M100.CTG" is the search management file of the directory "100XYZ", and "M101.CTG" is the search management file of the directory "101XYZ".

In step S3528, the system control unit 132 executes a reliability confirmation processing of target directory, and the process advances to step S3530.

When the processing is thus ended for all target directories, the system control unit 132 sets 1 to the search permission flag in step S3506, and ends the search list generation processing.

[Search Management File Generation Processing]

Figure 36:
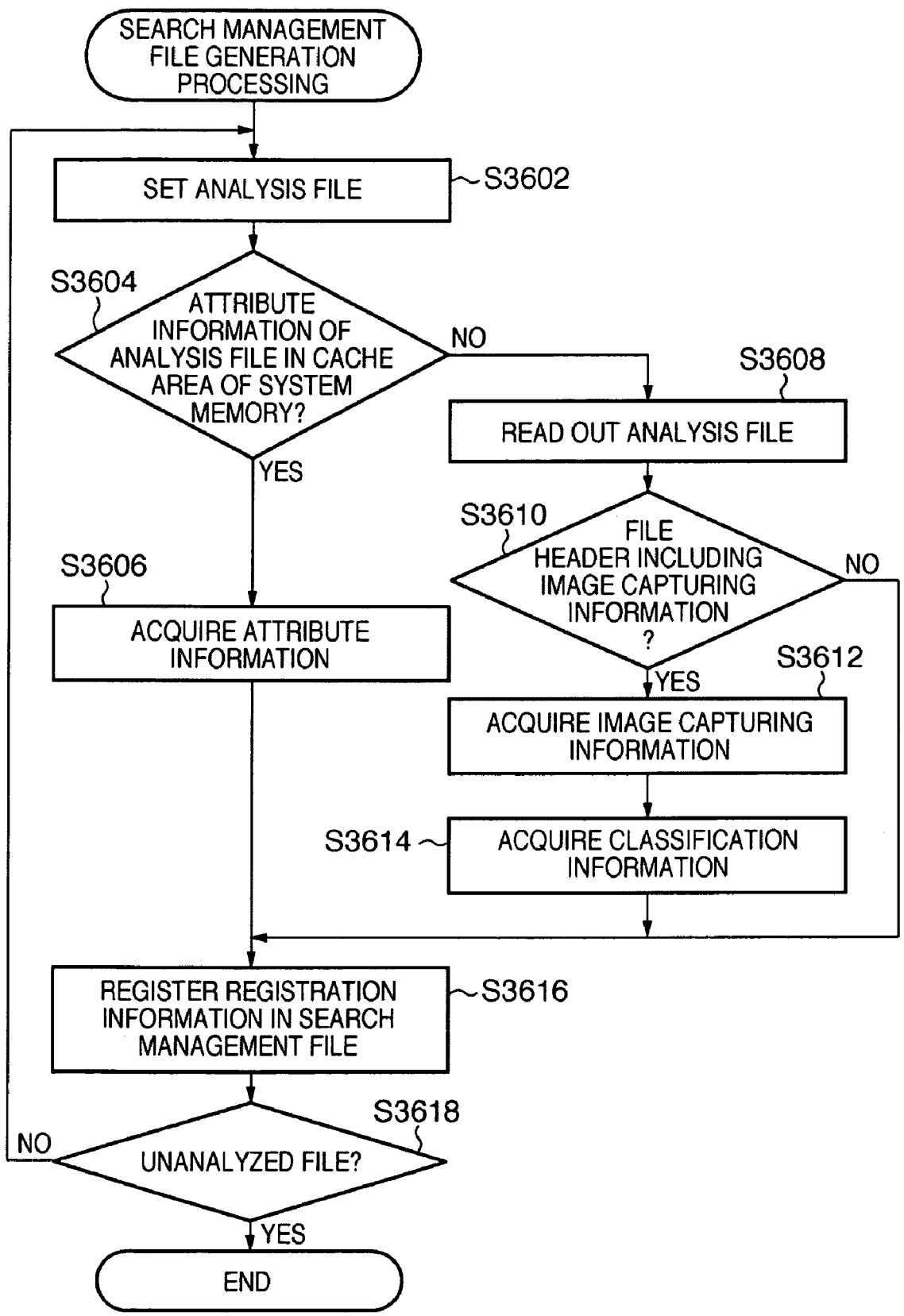
FIG. 36 is a flowchart for explaining search management file generation processing in step S3524 of FIG. 35B.

The search management file generation processing in step S3524 of FIG. 35B will be described with reference to FIGS. 36 and 37. FIG. 36 is a flowchart for explaining the search management file generation processing in step S3524 of FIG. 35B. FIG. 37 is a view showing an example of a search management file.

In step S3602, the system control unit 132 sets an analysis file. The analysis file is a file that has not yet undergone analysis in this processing out of all files in the directories set in the above-described search list generation processing (FIGS. 35A and 35B) or some files whose reliability could not be confirmed.

In step S3604, the system control unit 132 determines whether the attribute information of the analysis file set in step S3602 exists in the cache area of the system memory 136.

If it is determined that the attribute information exists, the system control unit 132 acquires the attribute information from the cache area of the system memory 136 in step S3606, and the process advances to step S3616.

If it is determined that the attribute information does not exist, the system control unit 132 reads out the analysis file from the recording medium 200 in step S3608.

In step S3610, the system control unit 132 determines whether a file header including attribute information exists in the analysis file read out in step S3608.

If it is determined that no file header including attribute information exists, the process advances to step S3616.

If it is determined that a file header including attribute information exists, the system control unit 132 acquires image capturing information from the file header in step S3612.

In step S3614, the system control unit 132 acquires classification information from the file header, and the process advances to step S3616.

In step S3616, the system control unit 132 generates, on the basis of the attribute information acquired is step S3606 or S3614, registration information to be registered in the search management file, and registers the registration information in the search management file. If it is determined in step S3610 that no file header exists, the system control unit 132 registers information representing it in the search management file. The registration information is minimum file information as shown in FIG. 37. In this embodiment, the registration information includes classification information, image capturing information, object information, and the like and is registered in association with information that specifies a file. As the information to specify the file, the file name, file number, and the like may be described in the list. The information may be associated with the file based on the arrangement order in the list.

In step S3618, the system control unit 132 determines whether an unanalyzed file exists.

If it is determined that an unanalyzed file exists, the process returns to step S3602 to set the unanalyzed file as the analysis file.

If it is determined that no unanalyzed file exists, the search management file generation processing is ended.

As described above, in this embodiment, if attribute information exists in the cache area of the system memory 136, it is unnecessary to read out a file from the recording medium 200 and analyze it. This makes it possible to generate a search management file in a short time.

[File Analysis Processing]

Figure 38:
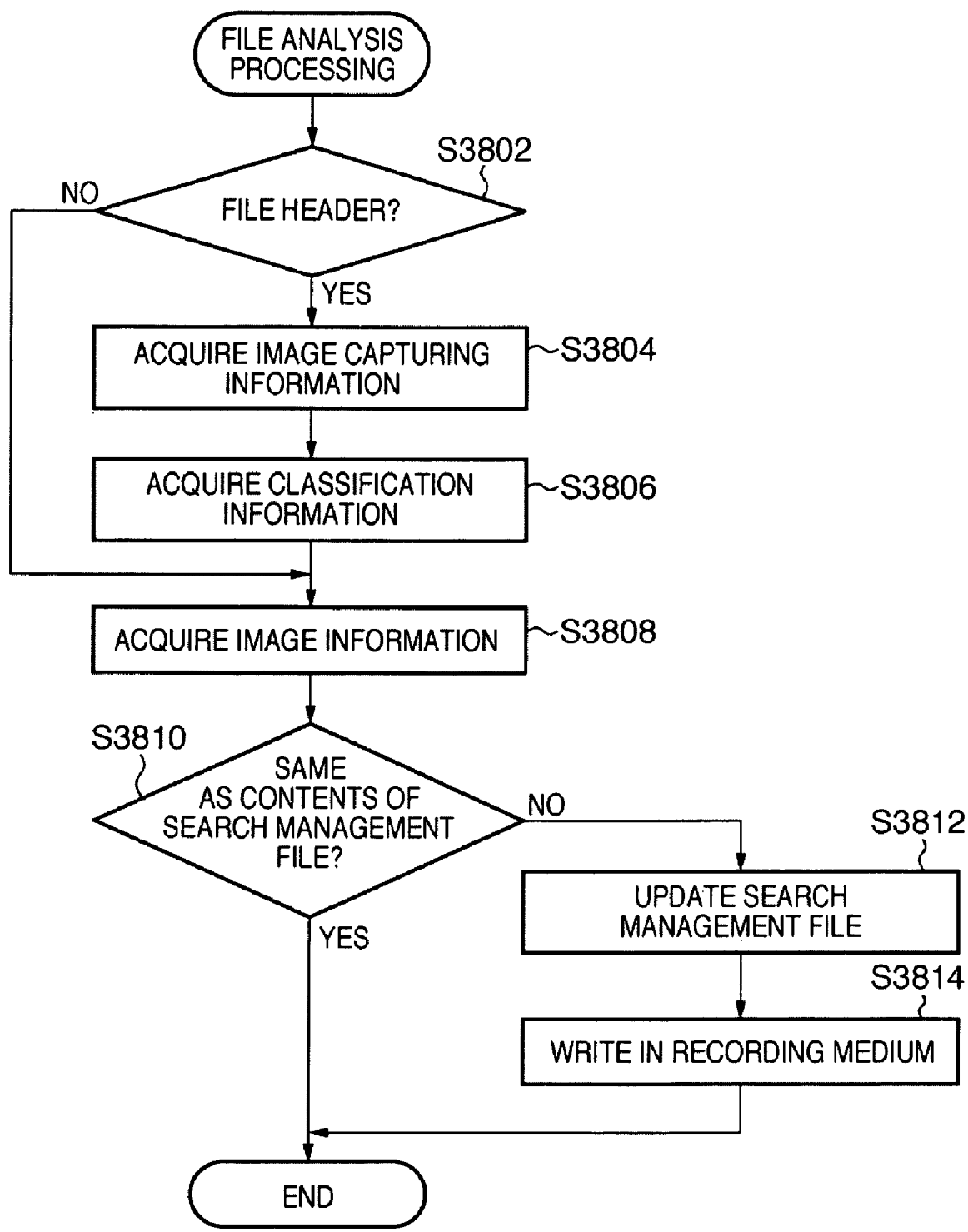
FIG. 38 is a flowchart for explaining file analysis processing in step S1510 of FIG. 15, steps S1708 and S1734 of FIGS. 17A and 17B, and step S1814 of FIG. 18.

The file analysis processing in step S1510 of FIG. 15, steps S1708 and S1734 of FIGS. 17A and 17B, and step S1814 of FIG. 18 will be described with reference to FIG. 38. FIG. 38 is a flowchart for explaining the file analysis processing in step S1510 of FIG. 15, steps S1708 and S1734 of FIGS. 17A and 17B, and step S1814 of FIG. 18.

In step S3802, the system control unit 132 determines whether a file header including attribute information such as image capturing information or classification information exists in the analysis target file.

If it is determined that a file header exists, the system control unit 132 acquires the image capturing information from the file header in step S3804.

In step S3806, the system control unit 132 acquires the classification information from the file header.

If it is determined that no file header exists, the process advances to step S3808.

In step S3808, the system control unit 132 acquires image information such as an image compression method.

In step S3810, the system control unit 132 determines whether the image capturing information, classification information, and image information match the contents of the search management file. Note that if it is determined that no file header exists, the system control unit 132 determines whether the image information matches the contents of the search management file.

If it is determined that all pieces of information match the contents of the search management file, the file analysis processing is ended.

If it is determined that any one of the pieces of information does not match the contents of the search management file, the system control unit 132 updates corresponding file information in the search management file in step S3812.

In step S3814, the system control unit 132 writes the search management file in the recording medium 200, and ends the file analysis processing.

As described above, when a file header is analyzed for image playback, collation of each search management file is executed simultaneously. This allows specifically collating and updating the search management file without requiring a new process time. In addition, even when alteration of the search management file or change of the management target file cannot be detected, it is possible to update the search management file to a correct value.

According to the image capturing apparatus 100 of this embodiment, it is possible to improve convenience for the user by displaying an optimum representative image in each group including a plurality of images.

The above-described embodiment can also be implemented as software using the computer (e.g., CPU or MPU) of a system or an apparatus.

Hence, a computer program itself, which is supplied to the computer to implement the above-described embodiment by the computer, also implements the present invention. In other words, the present invention also incorporates the computer program itself for implementing the functions of the above-described embodiment.

The computer program for implementing the above-described embodiment can take any form if it is computer-readable. Examples are an object code, a program to be executed by an interpreter, or script data to be supplied to the OS. However, the present invention is not limited to those.

The computer program for implementing the above-described embodiment is supplied to the computer via a recording medium or wired/wireless communication. Examples of the recording medium to supply the program are magnetic recording media such as a flexible disk, hard disk, and magnetic tape, optical/magnetooptical media such as an MO, CD, and DVD, and a nonvolatile semiconductor memory.

To supply the computer program using wired/wireless communication, a server on a computer network can be used. In this case, a data file (program file) serving as the computer program of the present invention is stored in the server. The program file can include either an executable code or a source code.

The program file is downloaded to a client computer which has accessed the server and thus supplied. In this case, it is also possible to divide the program file into a plurality of segment files and distribute them to different servers.

That is, the server apparatus which provides the program file for implementing the above-described embodiment also constitutes one aspect of the present invention.

The computer program of the above-described embodiment may be encrypted, stored in a storage medium, and distributed. Key information to be used for decryption is supplied to any user who satisfies predetermined conditions to allow the user to install the program in his/her computer. The key information can be supplied by, for example, causing the user to download it from a homepage via the Internet.

The computer program for implementing the above-described embodiment may use the function of the OS (Operating System) running on the computer.

The computer program for implementing the above-described embodiment may be partially formed from firmware on, e.g., an expansion board inserted into the computer or executed by the CPU of the expansion board.

The present invention is not limited to an image capturing apparatus such as a digital camera and is also applicable to an apparatus such as a portable telephone or a portable terminal which can play back an image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-326582 filed on Dec. 18, 2007, which is hereby incorporated by reference herein in its entirety.

What is claimed is:

1. A display control apparatus comprising:
a read out unit configured to read out an image from a recording medium;
a classification unit configured to classify a plurality of images into a plurality of groups in accordance with attribute information of each image;
a display control unit configured to control to display a representative image which represents each of the plurality of groups; and
a determination unit configured to determine one of images included in one of the plurality of groups classified by the classification unit as a representative image of the one group, the image having the minimum number of attribute information used for classification by the classification unit.

2. The apparatus according to claim 1, further comprising a comparison unit configured to compare the images, which are included in one of the plurality of groups classified by the classification unit, having the minimum number of attribute information used for classification by the classification unit with an image included in another group,
wherein the determination unit determines one of images having the minimum number of attribute information used for classification by the classification unit as the representative image of the one group based on comparison by the comparison unit, the image do not overlap a representative image of the other group.

3. The apparatus according to claim 2, wherein the comparison unit compares the image included in the one group with the representative image of the other group.

4. The apparatus according to claim 2, wherein the determination unit determines one of images which do not overlap the representative image of the other group as the representative image of the one group, the image having a minimum file number added in a generated order of the images.

5. The apparatus according to claim 2, further comprising an image capturing unit configured to capture an object,
wherein the recording medium records an image captured by the image capturing unit.

6. A display control method comprising:
a read out step for reading out an image from a recording medium;
a classification step for classifying a plurality of images into a plurality of groups in accordance with attribute information of each image;
a display control step for controlling to display a representative image which represents each of the plurality of groups;
a determination step for determining one of images included in one of the plurality of groups classified in the classification step as a representative image of the one group, the image having the minimum number of attribute information used for classification in the classification step; and
a control step for controlling a display device so that the display device displays the representative image determined in the determination step.

7. A non-transitory computer readable recording medium which records a program for causing a computer to execute a display control method, the program causing the computer to execute:
a read out step for reading out an image from a recording medium;
a classification step for classifying a plurality of images into a plurality of groups in accordance with attribute information of each image;
a display control step for controlling to display a representative image which represents each of the plurality of groups; and
a determination step for determining one of images included in one of the plurality of groups classified in the classification step as a representative image of the one group, the image having the minimum number of attribute information used for classification in the classification step.

* * * * *